United States Patent [19]

Colley et al.

[11] Patent Number: 5,113,523

[45] Date of Patent: May 12, 1992

[54] HIGH PERFORMANCE COMPUTER SYSTEM

[75] Inventors: Stephen R. Colley, Salinas, Calif.; David W. Jurasek, Banks, Oreg.; John F. Palmer, Tempe, Ariz.; William S. Richardson; Doran K. Wilde, both of Beaverton, Oreg.

[73] Assignee: NCUBE Corporation, Belmont, Calif.

[21] Appl. No.: 731,170

[22] Filed: May 6, 1985

[51] Int. Cl.⁵ .............................................. G06F 9/28
[52] U.S. Cl. .......................... 395/800; 364/DIG. 1; 364/270; 364/270.5; 364/736
[58] Field of Search ... 364/200 MS File, 900 MS File

[56] References Cited

U.S. PATENT DOCUMENTS

| | | | |
|---|---|---|---|
| 4,168,469 | 9/1979 | Parikh et al. | 364/900 |
| 4,247,892 | 1/1981 | Lawrence | 364/200 |
| 4,493,048 | 1/1985 | Kuny et al. | 364/754 |
| 4,514,807 | 4/1985 | Nogi | 364/200 |
| 4,523,273 | 6/1985 | Adam, III et al. | 364/200 |
| 4,543,642 | 9/1985 | Hansen | 364/900 |
| 4,553,203 | 11/1985 | Ran et al. | 364/200 |
| 4,598,400 | 7/1986 | Hillis | 370/60 |
| 4,639,857 | 1/1987 | McCanny et al. | 364/200 |
| 4,644,496 | 2/1987 | Andrews | 364/900 |

FOREIGN PATENT DOCUMENTS 0132926 2/1985 European Pat. Off.
0206580 12/1986 European Pat. Off.

OTHER PUBLICATIONS

Seitz, "The Cosmic Cube" Communications Of The Assoc. Of Computing Machinery, vol. 28 #1, Jan. 1985, pp. 22-23.
Mokoff, "Concurrent Computers Make Scientific Computing Affordable" Computer Design, vol. 24 #4, Apr. 1985, pp. 59-60.
Schone, "Schnelle Koppeleinheit fur Mikrorechner K 1520" Nachrichtentechnik Elektronik, vol. 30##4, 1980, pp. 141-143.
McMillen, "Performance and implementation of 4×4 switching nodes in an interconnection network for PASM".
IEEE International Conference On Parallel Processing, Aug. 1981, pp. 229-233.
Bhuyan, "Generalized hypercube and hyperbus structures for a computer network" IEEE Transactions On Computers vol. C-33 #4, Apr. 1984.
Aupperle et al., "Umnet—a campus computer network" IEEE, Compcon 82, Computer Networks, Sep. 20th-23rd, 1982, pp 319-328.
Mudge, "Vision algorithms for hypercube machines" IEEE Computer Architecture, Nov. 18th-20th, 1985, pp. 225-230.

(List continued on next page.)

Primary Examiner—Thomas C. Lee
Assistant Examiner—Mehmet Gechil
Attorney, Agent, or Firm—Owen L. Lamb

[57] ABSTRACT

A parallel processor comprised of a plurality of processing nodes (10), each node including a processor (100-114) and a memory (116). Each processor includes means (100, 102) for executing instructions, logic means (114) connected to the memory for interfacing the processor with the memory and means (112) for internode communication. The internode communication means (112) connect the nodes to form a first array (8) of order n having a hypercube topology. A second array (21) of order n having nodes (22) connected together in a hypercube topology is interconnected with the first array to form an order n+1 array. The order n+1 array is made up of the first and second arrays of order n, such that a parallel processor system may be structured with any number of processors that is a power of two. A set of I/O processors (24) are connected to the nodes of the arrays (8, 21) by means of I/O channels (106). The means for internode communication (112) comprises a serial data channel driven by a clock that is common to all of the nodes.

12 Claims, 17 Drawing Sheets

OTHER PUBLICATIONS

Barhen, "The hypercube in Robotics and Machine Intelligence" Computers in Mechanical Engineering, Mar.-1986.

Hayes, "A Microprocessor-based Hypercube Supercomputer" IEEE Micro. Oct. 1986.

Squire et al. "Physical and Logical Design of a Highly Parallel Computer", tech. note, Dept of E.E., U. of Michigan, Oct. 1962.

Squire et al. "Programming and Design Consideration for a Highly Parallel Computer", AFIPS Conf. Proc., vol. 23, 1963, SJCC, pp. 395-400.

Sullivan et al. "A Large Scale, Homogeneous, Fully Distributed Parallel Machine, I", Proc. 4th Ann. Symp on Computer Architecture, 1977, pp. 105-117.

Sullivan et al. "A Large Scale, Homogeneous, Fully Distributed Parallel Machine, II", Proc. 4th Ann. Symp. on Computer Architecture, 1977, pp. 118-124.

Fox "The Performance of the Caltech Hypercube in Scientific Calculations", Report CALT-68-1298, C.I.T., Pasadena, CA Apr. 1985.

Peterson et al. "The Mark III Hypercube—Ensemble Concurrent Processor", Proc. Int'l. Conf. on Parallel Processing, Aug. 1985, pp. 71-73.

Curnon et al. "A Synthetic Benchmark", Computer J., vol. 19, Feb. 1976, pp. 43-49.

Weicker, "Dhrystone: A Synthetic Systems Programming Benchmark", Comm. ACM. vol. 27, No. 10, Oct. 1984, pp. 1013-1030.

"Report off the Summer Workshop on Parallel Algorithms and Architectures for the Supercomputing Research Center", Aug. 1985.

Valiant, "A Scheme for Parallel Communication", SIAM J. Computer, vol. 11, May 1982, pp. 350-361.

C. L. Seitz, "The Cosmic Cube", Comm. ACM, vol. 28, No. 1, Jan. 1985, pp. 22-33.

M. C. Pease, "The Indirect Binary n-Cube Microprocessor Array", IEEE Trans. Computers, vol. C-26, No. 5, May 1977, pp. 458-473.

Preparata et al. "The Cube-Connected Cycles: A Versatile Network for Parallel Computation", Comm. ACM. vol. 24, No. 5, May 1981, pp. 300-309.

Colley et al. "A Microprocessor-based Hypercube Supercomputer", IEEE Micro. Oct. 1986, pp. 6-17.

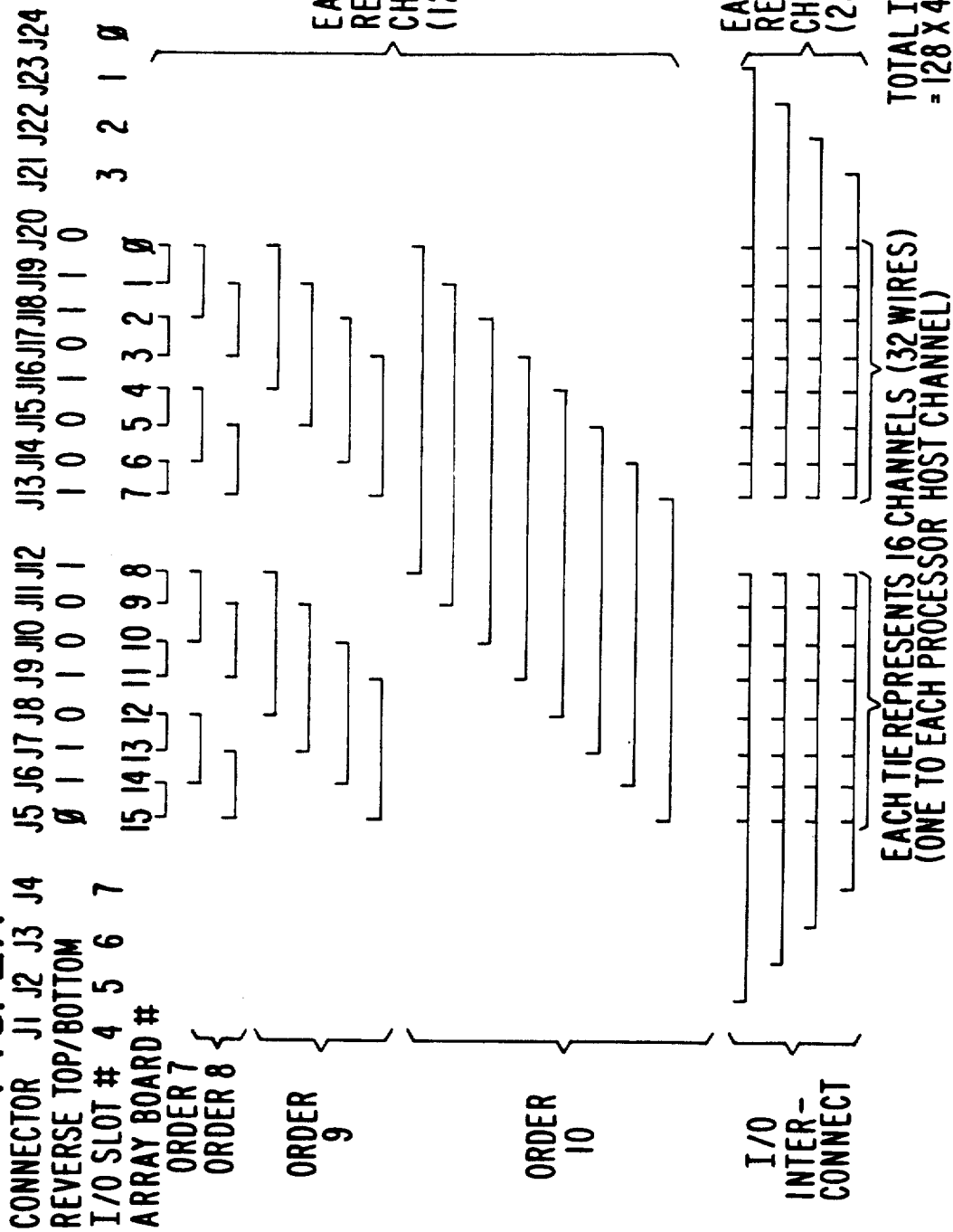

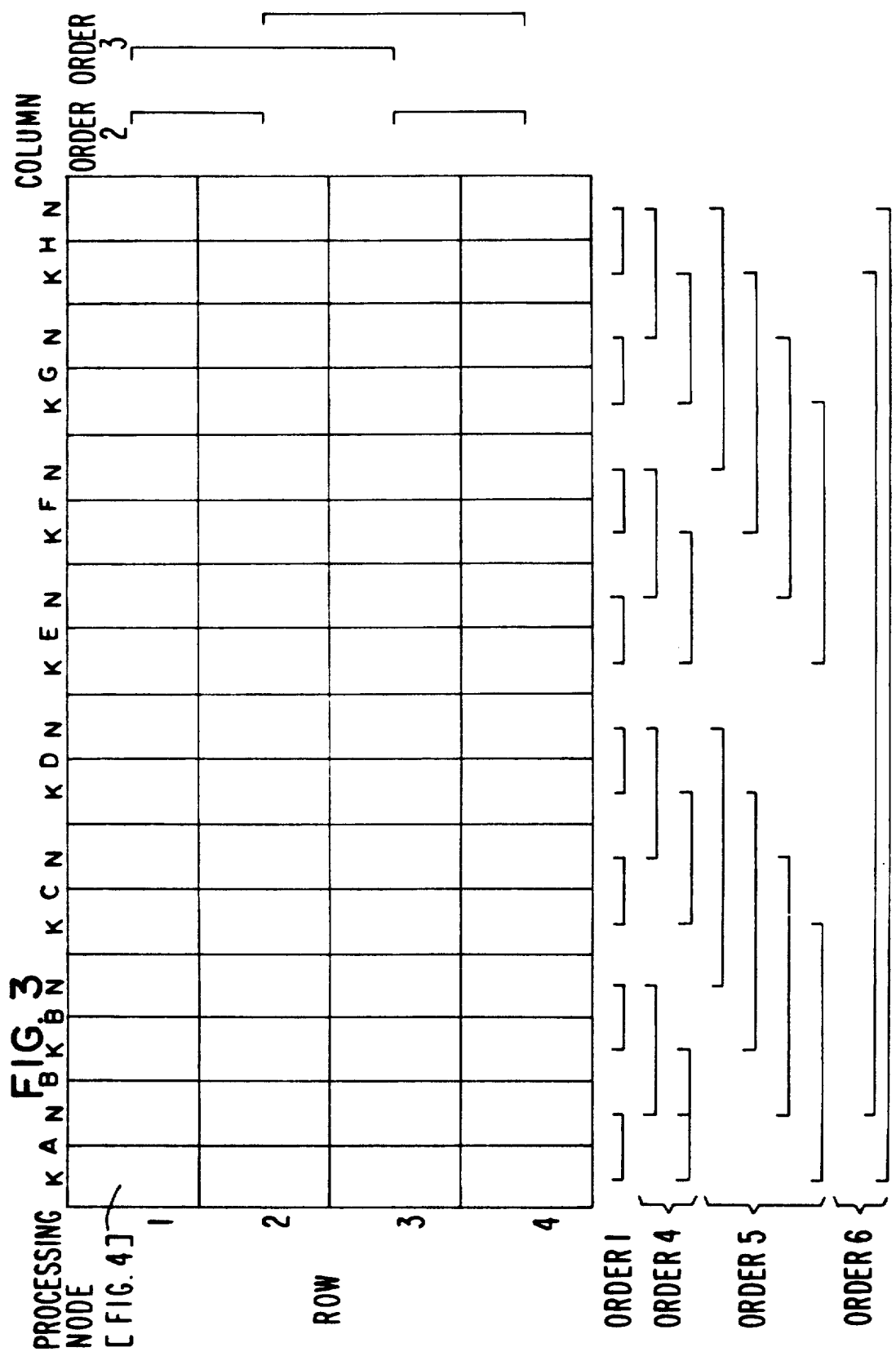

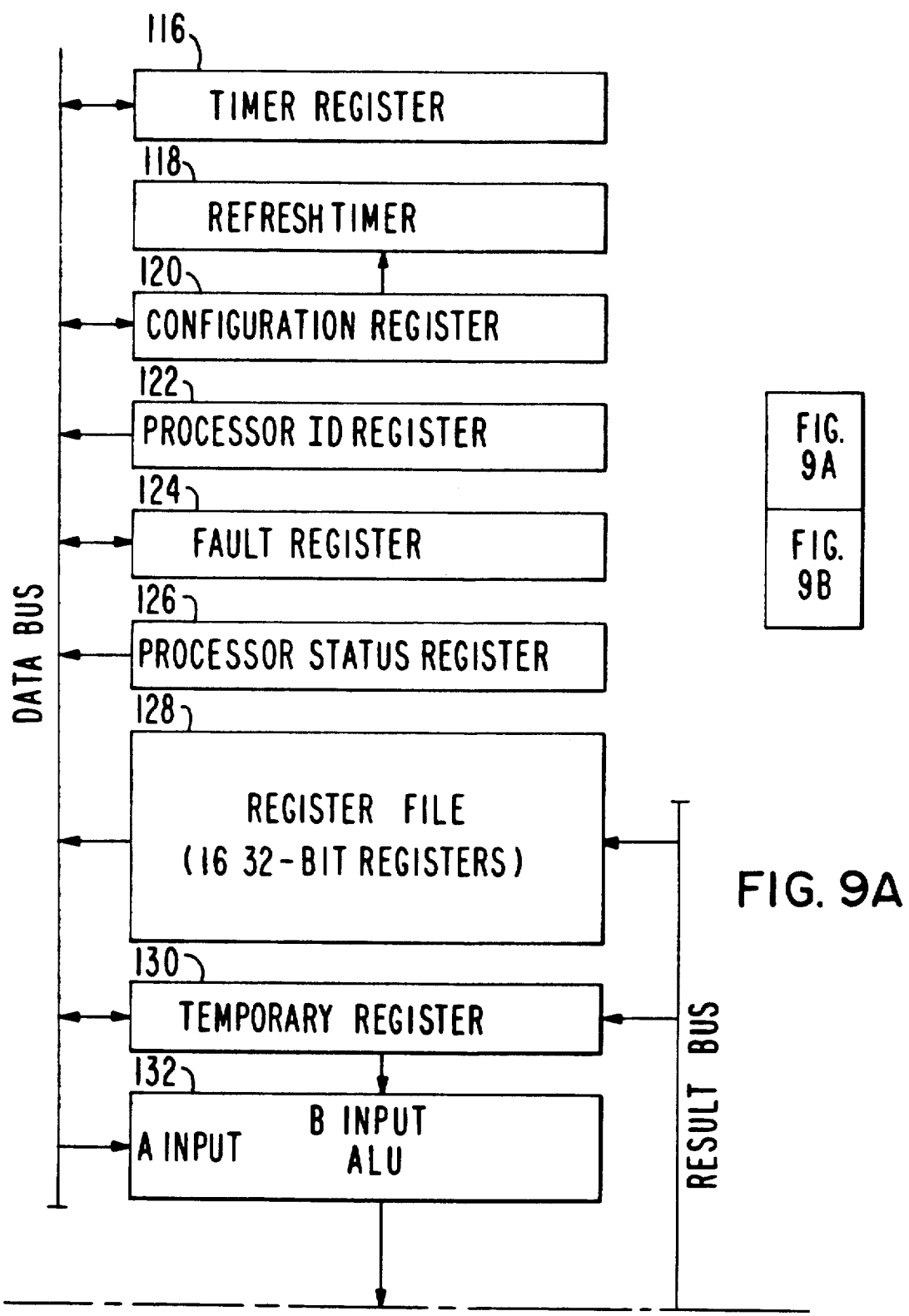

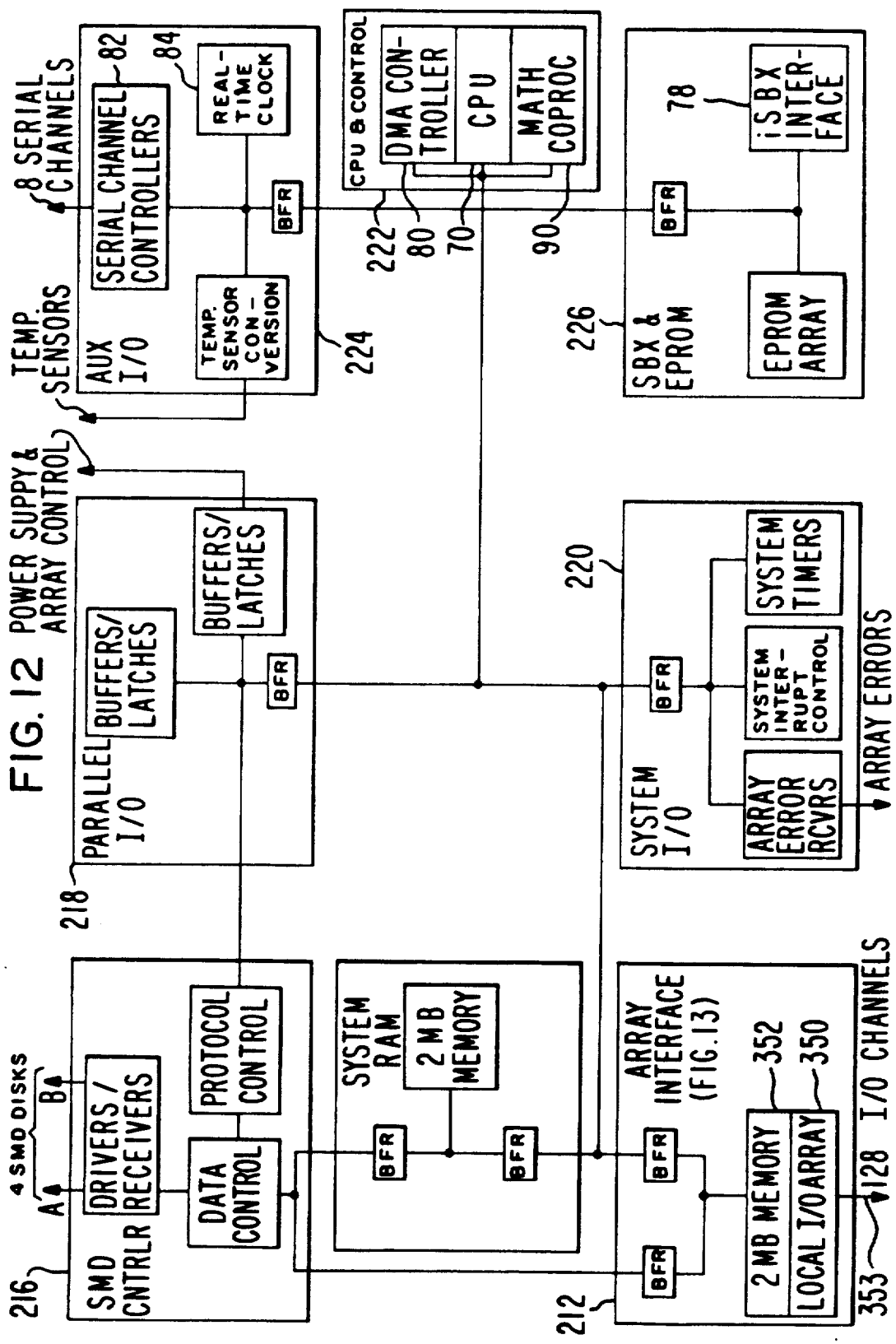

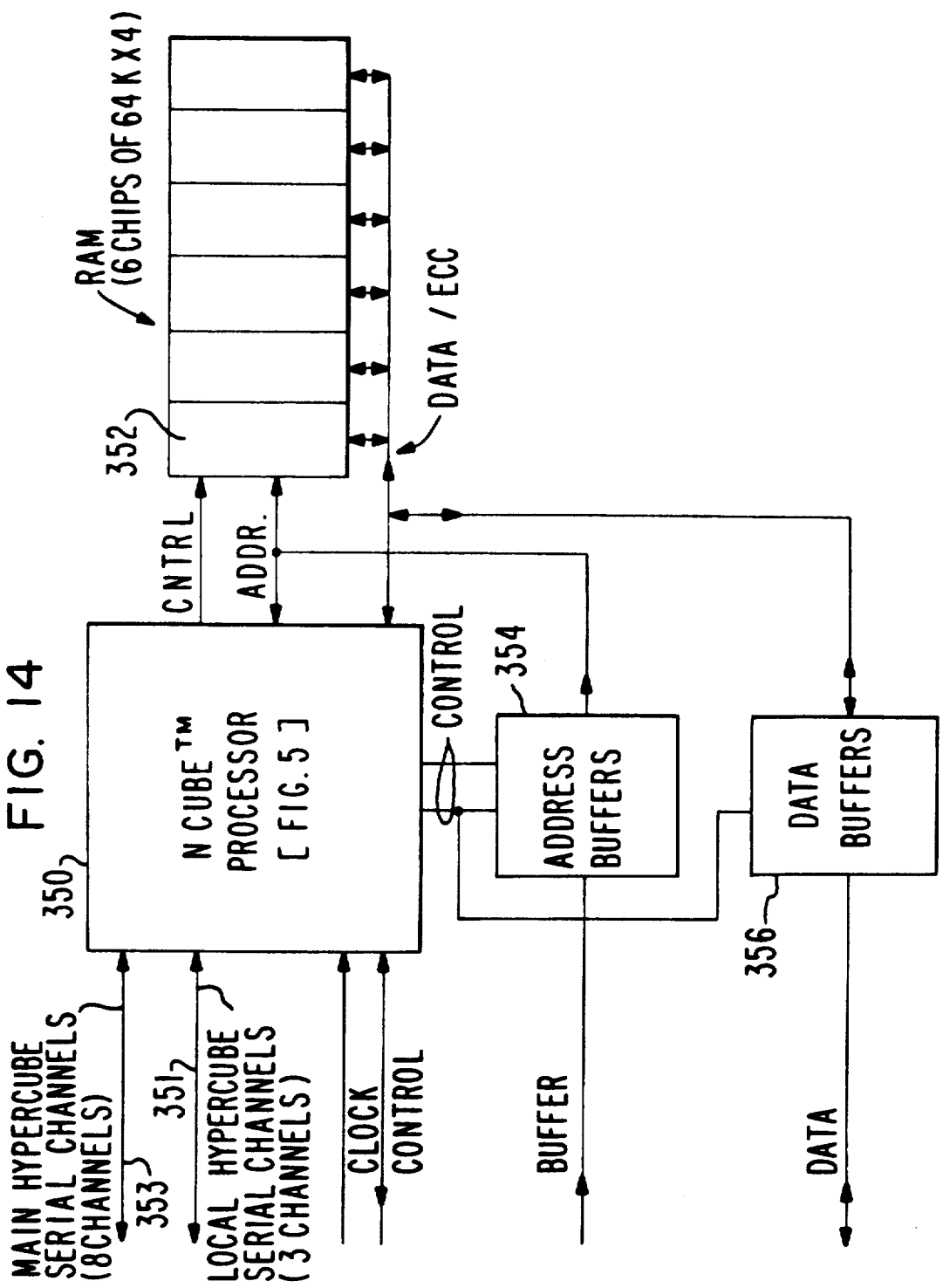

HIGH PERFORMANCE COMPUTER SYSTEM

BACKGROUND OF THE INVENTION

1. Field of the Invention

The invention relates to data-processing systems, and more particularly, to a high-performance, parallel-processing system.

2. Description of the Prior Art

In the past, data-processing systems utilizing parallel processing have met with limited commercial success. Consider, for example, the Illiac IV, designed by Burroughs Corporation. The Illiac IV utilizes an array of 64 processors, each with a local memory, operating in parallel with each processor executing the same instruction. This is known as a single-instruction-stream multiple data stream (SIMD) system. The Illiac IV is a very powerful computer and has been used to solve difficult scientific problems such as those involving fluid flow. The Illiac IV system is difficult to program because of the SIMD architecture. A more important disadvantage, however, is that the system lacks reliability. The mean time to failure is measured in hours.

Other parallel systems have been built for specific applications and would not be useful in more general, scientific applications. The high-performance data-processing systems that have been successful fall within one of two categories. The first category are those that are very high-speed uniprocessors that are heavily pipelined. The second category are special-purpose, inexpensive array processors that off-load data from a general processor for scientific processing. The Cray 1 and Cyber 205 fall within the first category, and the Floating-Point Systems' AP-120 falls within the second category.

These prior systems have several disadvantages. For example, the Cray 1 system approaches the limits imposed by physical constants. Wires must be kept short and the processor must be tuned to get full performance. Programs must be vectorized to take advantage of the pipeline structure. If this is not done, the Cray 1 will run much slower than its maximum speed. Finally, because of its size and sensitivity, the Cray 1 requires expensive, special handling such as reinforced floors, liquid cooling, and hand tuning.

The second category of prior systems (array-processors) is also subject to the physical limits imposed by the speed of the single or small number of processors that make up the array.

Current attempts to utilize the multiple-instruction stream, multiple-data-stream (MIMD) approach to parallel processing runs into two significant problems. The first is that by using standard ECL circuits, the size of the system is limited by reliability constraints, and therefore such a system would not be operable with tens or hundreds of processors. The second problem is that current systems use a single memory shared by all the processors. This has the advantage of allowing a programmer to keep all of the data in one memory, but has a major disadvantage of limiting the system performance to the bandwidth of a single computer system.

It is a primary object of the present invention to provide a new data-processing architecture and apparatus utilizing parallel processing, with a system performance that is above the level of modern supercomputers, but is within the price range of a small mainframe computer.

BRIEF SUMMARY OF THE INVENTION

Briefly, the above object is accomplished in accordance with an embodiment of the present invention as follows. A data-processing architecture and implementation thereof is provided in which an array of processors having local memory are interconnected in a hypercube topology. Each of the processors includes means for executing instructions, logic means for interfacing the processor with its local memory, and means for communicating with other processors in the array.

By fabricating on a single chip serial communication channels, memory interfacing logic, and all CPU functions including high-speed, double-precision floating-point arithmetic, the component count is reduced to a minimum, thus reducing size and increasing the reliability of the system.

By using arrays of processors with local memory, physical limits imposed on a single processor, or single memory system, are avoided and performance can thus the increased by simply adding processing nodes.

A unique advantage flows from utilizing the hypercube topology, which consists of interconnecting all corners of an N-dimensional cube. Since the number of interconnections per processor grows as Log 2 (N), the distance across an array only grows as Log 2 (N). The number of interconnections in a prior art array grows as SQRT (N). Thus, random communication between nodes is much faster on a hypercube than on any array using a fixed number of interconnections per node.

The hypercube is a recursive array since an (N+1)-dimensional array is constructed by interconnecting two N-dimensional arrays. This makes it easy to partition a large array into smaller arrays for multitasking. Furthermore, since a small array is logically equivalent to a larger one, software can be written to run on any size array. This allows for very effective multitasking without programming overhead for task switching. This also results in highly reliable systems that gracefully degrade in the event of processor failures.

Almost all high-performance systems suffer from being I/O bound; that is, they compute so fast that moving data into and out of the system causes a bottleneck. In the present invention, the I/O bind is alleviated by including an extra serial channel on each processor to handle system I/O. Tis structure results in a very high I/O bandwidth and improved fault-tolerance. Since each node is accessible through the I/O system, even if several processors fail the remaining processors can be logically reconfigured into an operational array.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein:

FIG. 2a is a detailed diagram of the arrangement of the serial communications interconnect on the backplane of the multiprocessing system shown in FIG. 1;

FIG. 3 is a detailed diagram of the arrangement of processing nodes and serial communications interconnect on the processor array board shown in FIG. 1;

FIGS. 9a and 9b together is a detailed block diagram of the integer execution unit shown in FIG. 5;

FIG. 12 is a detailed block diagram of the system control board shown in FIG. 1;

TABLE OF CONTENTS

Figure 1:
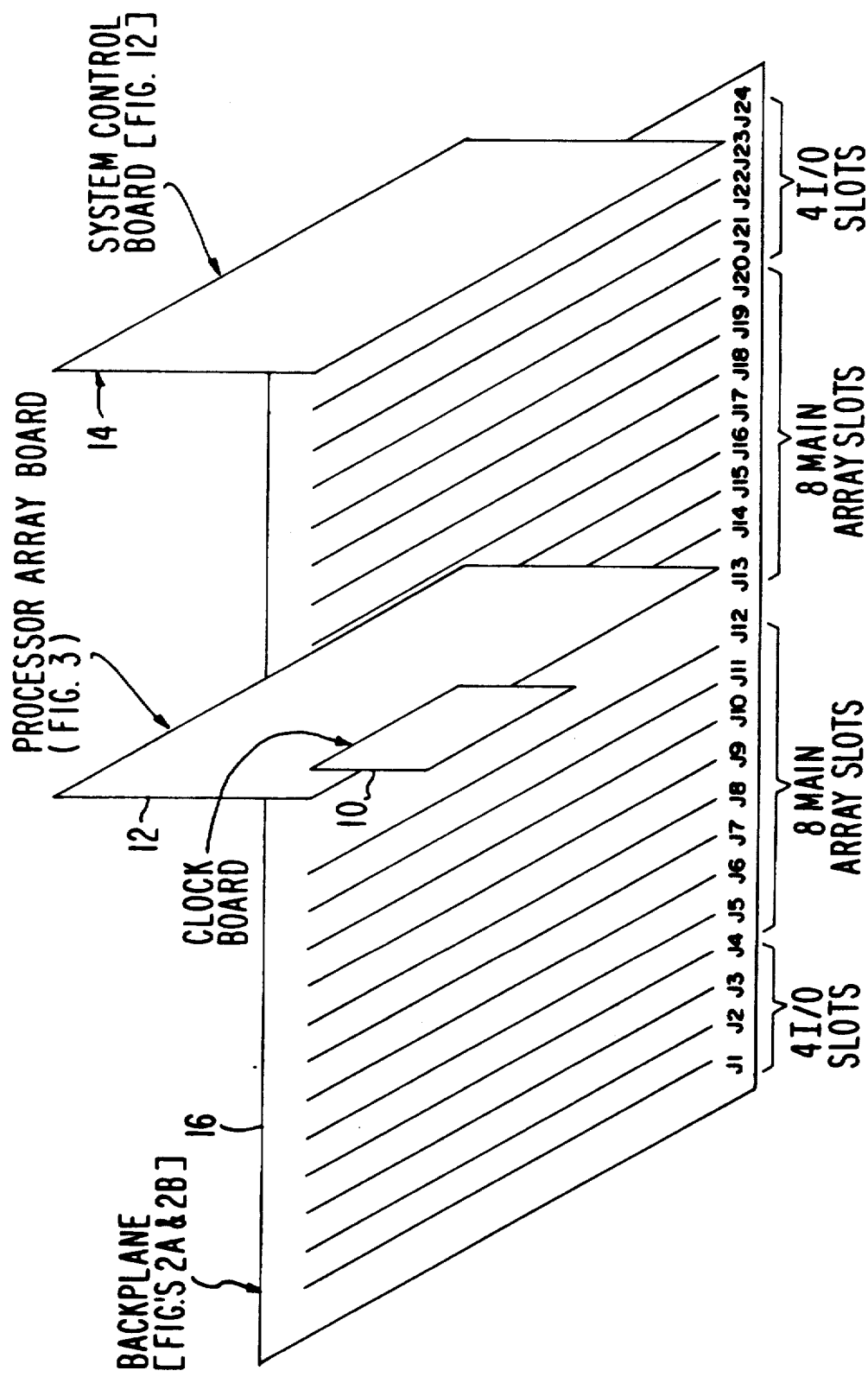
FIG. 1 is a block diagram of a multiprocessing system in which the present invention is embodied.

Background of the invention
Field of the Invention
Description of the prior art
Brief Summary of the Invention
Brief Description of the Drawings
Table of Contents
Introductory Description of the Invention

PART I. DATA PROCESSOR ARCHITECTURE

1. References and Definition of terms
2. Introduction
3. The System
4. The Processor
    4.1 Introduction
    4.2 Architecture Overview
        4.2.1 Data Representation
        4.2.2 Registers, Interrupts and Communication
    4.3 Data Representation
        4.3.1 Integers
        4.3.2 Reals
    4.4 Registers
        4.4.1 General Registers
        4.4.2 Input/Output Registers
        4.4.3 Processor Registers
    4.5 Interrupts and Exceptions
        4.5.1 Interrupt Definitions
        4.5.2 Error Flag
    4.6 Communication
    4.7 Instruction Formats and Addressing Modes
        4.7.1 Opcode Formats
        4.7.2 Addressing Modes
    4.8 Instruction Set
        4.8.1 Instruction Set Details
        4.8.2 Instruction Definitions
    4.9 Processor Initialization
5. The Software
    5.1 Introduction
    5.2 The Monitor
        5.2.1 Introduction
        5.2.2 Monitor Diagnostics
        5.2.3 ROM Monitor Commands
        5.2.4 RAM Monitor Commands
    5.3 The Operating System
        5.3.1 Overview
        5.3.2 File System
        5.3.3 Editing
        5.3.4 Memory Management
        5.3.5 Process Management
        5.3.6 Device Management
        5.3.7 Initialization
        5.3.8 Operating System Commands
        5.3.9 File Formats and Conventions
    5.4 Node Nucleus
        5.4.1 Communication and Synchronization
        5.4.2 Debugging
        5.4.3 Program Loading and Scheduling
        5.4.4 Nucleus System Calls
6. System Management
7. Using the System
    7.1 Introduction
    7.2 Hypercube Mappings
    7.3 Computational Example (User Programming)

PART II. DATA PROCESSOR IMPLEMENTATION 8.0. Major Components
    8.1 Processor Array Board
    8.2 Backplane Interconnections
    8.3 Floating Point Unit
    8.4 Address Unit and Instruction Cache
    8.5 Instruction Decoder
    8.6 Integer Execution Unit
    8.7 I/O Ports
    8.8 Memory Interface
    8.9 System Control Board
    8.10 System Communications
    8.11 System Node and Board Addressing
    8.12 Variable Meanings in Claims
Claims

PART I. DATA PROCESSOR ARCHITECTURE

1. References and Definition of Terms

For background information see "The Extension of Object-Oriented Languages to a Homogeneous. Concurrent Architecture", Thesis by Charles Richard Lang, Jr., Computer Science Department Technical Report Number 5014, California Institute of Technology, Pasadena, Calif., May 24, 1982.

The terms, syntax notation, etc., used in this specification conform to IEEE standards.

Information about Ncube TM products referred to in this specification can be obtained by writing to Ncube Corporation, 1815 NW 169th Place, Suite 2030, Beaverton, Or. 97006.

Information about Intel products referred to in this specification can be obtained by writing to Intel Corporation, 3065 Bowers Ave., Santa Clara, Calif. 95051.

2. INTRODUCTION

The architecture of the system in which the present invention is embodied uses up to 1024 identical high speed processors (processing nodes) connected in an array to work on a single problem. Each node is a general purpose processor with 128K bytes of local ECC memory. There are 8 I/O channels providing input to and output from the processing array.

When a processing node fails the system can continue operation on a subset of the array with reduced performance thus providing fault tolerance through graceful degradation in addition to reliability.

The array is interconnected in a recursive topology called a hypercub (see Section 3.2) that can be divided into subarrays of 64, 128, 256, or 512 processors. The software can easily adjust to the number of processors in the system. One job can run on the entire array or several jobs can run at once on subsets of the array. This space sharing avoids the constant swapping overhead that occurs in conventional time sharing systems.

The modularity of this design enhances extensibility. Simply by rewiring the backplane, the architecture can support a larger array. Also by connecting systems together with an interprocessor Link it is possible to use multiple systems in parallel or as a very powerful pipeline.

3. THE SYSTEM

3.1 System Overview

One embodiment of a system in which the principles of the present invention are practiced is described in detail in Part II of this specification. Briefly, it consists of an air cooled enclosure containing a backplane with up to 24 boards, a disk/tape subsystem and power supplies. The backplane (16) shown in FIG. 1 uses 16 slots to support a processor array of up to 1024 processors, each with 128K bytes of local memory. The other 8 slots are used for I/O. Each I/O slot is connected to a different subset of 128 processors in the array.

Each processor node in the processing array has a ½ Megaflop (floating point operations) or 2 MIP (integer operations) processor. Thus a fully loaded system with 1024 processors has a potential performance of 500 Megaflops or 2000 MIPS. Each I/O bus into the array consists of two unidirectional data paths (one inbound, one outbound) that operate independently and in parallel. Each path can transfer data at up to 140 Megabytes/sec.

3.2 Hypercube Array Description

The processing array consists of processors with local memory interconnected in a topology called a hypercube. One way to describe a hypercube is graphically. Hypercubes of low order can be illustrated as shown below (circles are nodes and lines are communication links):

| ORDER | HYPERCUBE GRAPH |
|---|---|
| N = 0 | o |
| N = 1 | o—o |
| N = 2 | o—o<br>\|  \|<br>o—o |

Another way to describe the hypercube is by a recursive definition. Each processor has a label that is a binary number. Two processors are connected if their labels differ in only one place. The low order hypercubes are listed below:

| ORDER | PROCESSOR LABELS |
|---|---|
| N = 0 | 0 |
| N = 1 | 0<br>1 |
| N = 2 | 00<br>01<br>10<br>11 |

From an order (N−1) hypercube it is very simple to define an order N cube. The (N−1) hypercube will have nodes labeled as shown:

$0xx \ldots xx$ $(N-1)$

First another (N−1) hypercube is constructed with nodes labeled:

$1xx \ldots xx$ $(N-1)$

And then all (N−1) connections between the two (N−1) hypercubes are made so that every pair of node labels that differ only in their most significant bit are connected (e.g. 010 ... 01 must be connected to 110 ... 01).

This formulation of the hypercube illustrates two of its most important properties:

1. The number of interconnections per node grows as the Log2 of the number of processors which allows for more direct interconnections than most array schemes have.

2. An order N hypercube is made of 2 order (N−1) hypercubes. This allows for several beneficial features a) the system can be modular since a large array is logically equivalent to a small one;

b) software can be written for a generic hypercube independently of its order—the program will simply run faster on a larger array;

c) a large system can be partitioned by the Operating System among multiple users so that each has a smaller hypercube to run user software.

These advantages are not available in a typical toroidal grid (lattice) type of interconnection scheme. But since two and three dimensional grids are very useful in many applications, it is important to note that a hypercube can be mapped onto either grid simply by ignoring some of the available communication links.

3.2.1 System Control Board

At least one System Clock board (14), shown in FIG. 1, must be installed in the every system and there can be up to 8 per system. Its primary purpose is to run the operating system described in section 5.3, including the cross compilers, assembler and linker and to control a wide range of peripherals. It uses an Intel 80286 with 4 Megabyte of memory for the operating software. There are also four sockets for an EPROM that contains the monitor and diagnostics software described in section 5.2.

In addition to the main Intel 80286 processor running the operating system, the System Control board has eight RS-232 serial ports and one high speed printer port. It has the logic to control up to 4 SMD disk drives and three Intel iSBX multimodule connectors. These multimodule connectors support options such as tape drive controllers, ethernet interfaces and interboard buses (for I/O boards). This bus allows for users attached to different System Control boards to access a common file system that is spread across several disk drives controlled by different controllers. A block diagram of the System Control board is shown in FIG. 12, and is described in detail in section 8.9.

The sections below describe the architecture of the System Control in more detail.

3.2.1.1 Central Processor

The central processor of the System Control is an Intel 80286. This is a high performance 16 bit processor that has a compatibility mode with the Intel 8086. In addition it can address 16 megabytes of memory and has memory management and protection built into the chip. It is the host for a multitasking/multiuser operating system. For more details on programming the Intel 80286 see Intel's iAPX 286 Programmer's Reference Manual, which can be obtained from Intel Corporation, 3065 Bowers Ave., Santa Clara, Calif. 95051.

3.2.1.2 System Programmable Read-Only Memory (PROM)

The System Control has 8 sockets for PROM (72) which may be loaded with devices from Intel 2764's up to Intel 27512's. The PROM resides at location F80000 to FFFFFF in the Intel 80286 memory space. Since these are byte wide devices they are arranged in 2 banks with the following addresses.

| CHIP | BANK 1 (top) | BANK 0 |
|------|--------------|--------|
| 2764 | FFC000-FFFFFF | FF8000-FFBFFF |
| 27128 | FF8000-FFFFFF | FF0000-FF7FFF |
| 27256 | FF0000-FFFFFF | FE0000-FEFFFF |
| 27512 | FE0000-FFFFFF | FC000-FDFFFF |

The PROM's are programmed by and contain a monitor described in section 5.2, that includes the following functions:
1) a bootstrap loader
2) a debugger
3) a diagnostic package
4) an offline system backup/restore facility

3.2.1.3 Global Random Access Memory (RAM)

There are 2 megabytes of global dual ported memory (214) on the System Control Board shown in FIG. 12. This memory can be directly accessed by both the Intel 80286 (block 222) and the SMD disk controller (216) and resides at location 0 to 1FFFF in the system memory space.

3.2.1.4 Local I/O Array

There is a local array interface (212) of 16 processing nodes on the System Control Board. Each node consists of a processor and 128 Kbytes of RAM. This memory is triple ported since it can be directly accessed by the local processor, the Intel 80286 and the SMD disk controller. All Intel 80286 and disk controller accesses to these local memories are 16 bits only. The main purpose of this array (214) is to provide communication (an I/O bus) with the main Processing Array. Thus, 8 of the 11 channels on each node are dedicated to providing communication between the Processing Array and the System Control. The nodes on the System Control board are numbered 0,1,...,15 and their local memory resides in the Intel 80286 address space according to the table below.

| Processor Number | Address |
|------------------|---------|
| 0 | 200000 to 21FFFF |
| 1 | 220000 to 23FFFF |
| 2 | 240000 to 25FFFF |
| 3 | 260000 to 27FFFF |
| 4 | 280000 to 29FFFF |
| 5 | 2A0000 to 2BFFFF |
| 6 | 2C0000 to 2DFFFF |
| 7 | 2E0000 to 2FFFFF |
| 8 | 300000 to 31FFFF |
| 9 | 320000 to 33FFFF |
| 10 | 340000 to 35FFFF |
| 11 | 360000 to 37FFFF |
| 12 | 380000 to 39FFFF |
| 13 | 3A0000 to 3BFFFF |
| 14 | 3C0000 to 3DFFFF |
| 15 | 3E0000 to 3FFFFF |

Since the local processing nodes on the System Control each have 3 communication channels uncommitted to I/O, they are interconnected in the two order-3 hypercubes. That is, nodes numbered 0,1,...,7 form one hypercube and nodes numbered 8,9,...,15 form another hypercube. This allows users to test their programs on the small hypercubes on the system control board before loading them into the main array, thus offloading most debugging tasks. It may appear that since the two hypercubes are not directly interconnected it would be difficult to move data from a node in one cube to a node in the other. However, since all the memory is in the Intel 80286 memory space, it is simple and fast to use the central processor or the DMA processor to move the data.

3.2.1.5 SBX Connectors

There are three Intel iSBX ™ connectors (78) on the system control board. Intel and other companies make a wide range of small boards for the SBX I/O bus. There are boards for high speed math, graphics, tape drive controllers, floppy disk controllers, network controllers, etc. If a system contains more than one System Control then one of the SBX connectors on each board is reserved for implementing a local bus so that the operating system, and particularly the file system, can be spread over the disk drives controlled by all the System Controls. Thus a user need not be concerned to which board a terminal is attached.

The devices that are inserted into the SBX connectors appear to a programmer as locations in the 80286 I/O space that can be read from and written into. They can also be controlled by the Intel 82258 ADMA (Advanced Direct Memory Access) chip. The boards can generate interrupts to the Intel 80286 (for details on interrupts see section 3.3.2.1.10). The data that is read or written can be either Byte or Halfword and each SBX connector has 32 reserved I/O addresses (3 bits of address and 2 bits of chip select) as shown below.

| SBX Connector | I/O Address | Interrupt Vector |
|---------------|-------------|------------------|
| 1 | A0 to AF and B0 to BF | # 82 at 148 |
| 2 | 80 to 8F and 90 to 9F | # 81 at 144 |
| 3 | 60 to 6F and 70 to 7F | # 80 at 140 |

There are two types of SBX devices, 8 bit and 16 bit, but both boards have the equivalent of two 8 bit registers that are activated by the chip select bits (MCS0, MCS1). The following table contains the data transfer details. The Device and Data columns refer to the number of bits in the device and in the data to be transferred respectively.

|   | Device | Data | Registers | Addresses |
|---|--------|------|-----------|-----------|
| 1 | 16 | 16 | MCS1,MCS0 | A0,A2,A4,A6,A8,AA,AC,AE |
|   | 8,16 | 8 | MCS0 | A0,A2,A4,A6,A8,AA,AC,AE |
|   | 16 | 8 | MCS1 | A1,A3,A5,A7,A9,AB,AD,AF |
|   | 8 | 8 | MCS1 | B0,B2,B4,B6,B8,BA,BC,BE |
| 2 | 16 | 16 | MCS1,MCS0 | 80,82,84,86,88,8A,8C,8E |
|   | 8,16 | 8 | MCS0 | 80,82,84,86,88,8A,8C,8E |
|   | 16 | 8 | MCS1 | 81,83,85,87,89,8B,8D,8F |
|   | 8 | 8 | MCS1 | 90,92,94,96,98,9A,9C,9E |
| 3 | 16 | 16 | MCS1,MCS0 | 60,62,64,66,68,6A,6C,6E |
|   | 8,16 | 8 | MCS0 | 60,62,64,66,68,6A,6C,6E |
|   | 16 | 8 | MCS1 | 61,63,65,67,69,6B,6D,6F |
|   | 8 | 8 | MCS1 | 70,72,74,76,78,7A,7C,7E |

3.2.1.6 Printer (Centronics) Port

There is one high speed printer I/O port on the System Control Board. It supports the Centronics protocol with 8 bits of data and 4 bits of status. It is intended for a high speed peripheral such as a printer or plotter. It is in the I/O space of the Intel 80286 at location 14 and also has DMA capability since it can be controlled by the Intel 82258 ADMA device (80). When accessing this address the system performs the following functions. (When Reading, bits 12 to 15 yield general system status, not printer status.)

|   | Write I/O Address 14 |
|---|---|
| bits 0-7 | printer data |
| bits 8-15 | centronics control signals |
|   | Read I/O Address 14 |
| bits 0-7 | printer data |
| bit 8 | 1 = printer select |
| bit 9 | 1 = printer paper error |
| bit 10 | 1 = printer fault |
| bit 11 | 1 = printer busy |
| bit 12 | 1 = diagnostic mode, 0 = normal mode |
| bit 13 | reserved |
| bit 14 | reserved |
| bit 15 | 1 = main power (-5) good |

3.2.1.7 Direct Memory Access (DMA) Controller

The System Control Board has an Intel 82258 ADMA device (80) that controls the Direct Memory Access in the system. It is specifically intended to control the 3 SBX connectors and the Centronics parallel port. However, it is a very powerful processor and can control other DMA functions in the system including moving blocks of data in memory. Refer to Intel's 82258 Manual for details.

The Intel 82258 has 4 DMA channels and each channel has a set of registers associated with it. Also there is a set of global registers. All of these registers are in the Intel 80286 I/O address space as shown in the table below.

| Global Register | Bits | I/O Addr | Global Register | Bits | I/O Addr |
|---|---|---|---|---|---|
| Command (GCR) | 16 | 100 | Burst (GBR) | 8 | 106 |
| Status (GSR) | 16 | 102 | Delay (GDR) | 8 | 108 |
| Mode (GMR) | 16 | 104 | | | |

I/O Addresses

-continued

| Channel Register | Bits | DMA0 | DMA1 | DMA2 | DMA3 |
|---|---|---|---|---|---|
| Command Pointer (CPR) | 24 | 10A | 12E | 152 | 176 |
| Source Pointer (SPR) | 24 | 10E | 132 | 156 | 17A |
| Destination Pointer (DPR) | 24 | 112 | 136 | 15A | 17E |
| Translate Table Pointer (TTPR) | 24 | 116 | 13A | 15E | 182 |
| List Pointer (LPR) | 24 | 11A | 13E | 162 | 186 |
| Byte Count (BCR) | 24 | 11E | 142 | 166 | 18A |
| Channel Command (CCR) | 24 | 122 | 146 | 16A | 18E |
| Mask (MASKR) | 16 | 126 | 14A | 16E | 192 |
| Compare (COMPR) | 16 | 128 | 14C | 170 | 194 |
| Assembly (DAR) | 16 | 12A | 14E | 172 | 196 |
| Channel Status (CSR) | 8 | 12C | 150 | 174 | 198 |

The Channel Registers can be written by setting the Command Pointer to point to a command block in memory and then giving the Intel 82258 a START CHANNEL command from the Intel 80286. The format of the command block in memory is shown below:

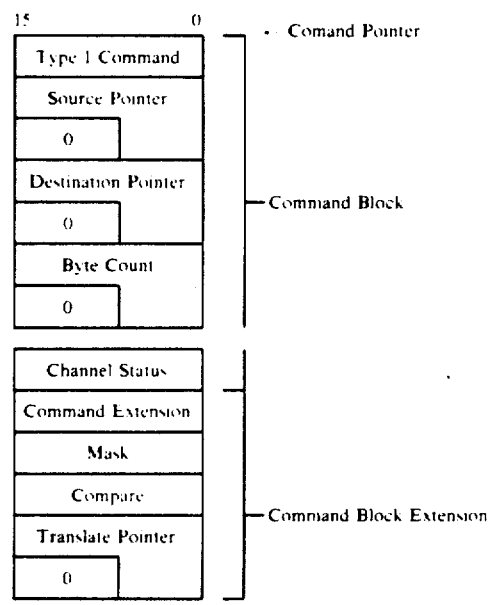

3.2.1.8 Serial Channels

The System Control Board shown in FIG. 12 has 8 serial channels that are controlled by four Intel 8530 Serial Communications Controllers (82), each device handling 2 channels. Each 953- also has two baud rate generators and interrupt generation logic. There are a set of control (Write) registers and a set of status (Read) registers for each channel. The registers are all 8 bits and all accesses are byte only. A summary of the register functions is listed below (unless noted two copies of each register exist, one for each channel):

READ REGISTER FUNCTIONS

RR0: Transmit/Receive buffer status and External status
RR1: Special Receive Condition status
RR2: Interrupt Vector
  Even channels = Unmodified; Odd channels = Modified RR10: Receive buffer (Data)
RR12: Lower byte of baud rate generator time constant
RR13: Upper byte of baud rate generator time constant
RR15: External/Status interrupt information

WRITE REGISTER FUNCTIONS

WR0: Initialization commands for addressing, modes, CRC
WR1: Transmit/Receive interrupt and data transfer mode definition
WR2: Interrupt Vector (accessed through either channel) Only one WR2 per 8350
WR3: Receive parameters and control
WR4: Transmit/Receive miscellaneous parameters and modes
WR5: Transmit parameters and controls
WR6: Sync characters of SDLC address field
WR7: Sync character or SDLC flag
WR8: Transmit buffer (Data)
WR9: Master interrupt control and reset (accessed through either channel) Only one WR9 per 8350
WR10: Miscellaneous transmitter/receiver control bits
WR11: Clock mode control
WR12: Lower byte of baud rate generator time constant
WR13: Upper byte of baud rate generator time constant
WR14: Miscellaneous control bits
WR15: External/Status interrupt control The only registers that can be directly addressed in the I/O space of the Intel 80286 are the two Data registers (RR8 and WR8) and RR0 and WR0. In order to read or write any other register requires two steps: (1) write the appropriate code into WR0 then (2) perform the read or write operation.

After doing this, bits 0 through 4 of WR0 are automatically cleared so that WR0 points to WR0 or RR0 again. The I/O addresses corresponding to the 8530 devices and the I/O channels are listed in the table below. Each channel can generate four interrupts to indicate the conditions: Tx empty, Status Change, Rx Ready and Special Rx. The interrupt vector addresses (assuming the given vector bases are used) are also listed below. (To obtain the interrupt numbers divide the vector address by four.)

| Device | SSC 0 | | SSC 1 | | SSC 2 | | SSC 3 | |
|---|---|---|---|---|---|---|---|---|
| Channels | 0 | 1 | 2 | 3 | 4 | 5 | 6 | 7 |
| I/O Addresses | | | | | | | | |
| Status RR0 & WR0 | D4 | D0 | DC | D8 | E4 | E0 | EC | E8 |
| Data RR8 & WR8 | D6 | D2 | DE | DA | E6 | E2 | EE | EA |
| Vector Address: | | | | | | | | |
| Vector Base | 28 | | 30 | | 38 | | 40 | |
| Tx Empty | A0 | B0 | C0 | D0 | E0 | F0 | 100 | 110 |
| Status Change | A4 | B4 | C4 | D4 | E4 | F4 | 104 | 114 |
| Rx Ready | A8 | B8 | C8 | D8 | E8 | F8 | 108 | 118 |
| Special Rx | AC | BC | CC | DC | EC | FC | 10C | 11C |

Each Serial Channel Controller (82) has an integrated baud rate generator that depends on the setting of a Time Constant, supplied by real-time clock (84). The equation and a baud rate table are given below.

| Clock Rate: | 1.8432 Mhz | |
|---|---|---|
| Equation: | Time Constant = (57600 / baud rate) − 2 | |
| Table: | Baud Rate | Time Constant |
| | 19200 | 1 |
| | 9600 | 4 |

-continued

| | |
|---|---|
| 4800 | 10 |
| 3600 | 14 |
| 2400 | 22 |
| 2000 | 27 |
| 1800 | 30 |
| 1200 | 46 |
| 600 | 94 |
| 300 | 190 |
| 150 | 382 |
| 134.5 | 426 |
| 110 | 522 |
| 75 | 766 |
| 50 | 1150 |

3.2.1.9 SMD Disk Controller

The System Control has an SMD disk controller unit (216). It is capable of controlling up to four standard SMD disks drives. Data is accessed in blocks of 1024 bytes at a rate of 1 Megabyte per second. The disk controller unit consists of 6 registers in the I/O address space which are described below.

1) Command/Status Register
   I/O Address: 00
   Write: Command
   bit 0 ─┐
   bit 2 ─┤ ┌─ 000 = Seek & Read Sector
   bit 3 ─┤ │  001 = Reset Disk Fault & Recalibrate
          │ │  010 = Seek & Write Sector
          │ │  011 = Seek & Format Sector
          │ │  100 = Read Sector & No Checking
          │ │  101 = Seek to Specified Sector
          │ │  110 = Reserved
          │ └─ 111 = Seek & Format Sector from Memory
   bit 15 ─┘
           └─ Do Not Care Read: Status
   bit 0: Command bit 0
   bit 1: Command bit 1
   bit 2: Command bit 2
   bit 3: 1 = Header Sync Error
   bit 4: 1 = Header Address Error
   bit 5: 1 = Header CRC Error
   bit 6: 1 = Data Sync Error
   bit 7: 1 = Data CRC Error
   bit 8: 1 = Data Overrun/Underrun Error
   bit 9: 1 = Illegal Memory Access
   bit 10: 1 = Controller Ready
   bit 11: 1 = Disk Ready
   bit 12: 1 = Disk Selected
   bit 13: 1 = Seek Error
   bit 14: 1 = Write Error
   bit 15: 1 = Disk Fault 2) Control
   I/O Address: 02
   Read and Write bit 0: ⎫
   bit 1: ⎭ Unit Select
   bit 2: Reserved (must be 0)
   bit 3: Reserved (must be 0)
   bit 4: 1 = Servo Offset +
   bit 5: 1 = Servo Offset −
   bit 6: 1 = Data Strobe Early
   bit 7: 1 = Data Strobe Late 3) Low Memory Address
   I/O Address: 04
   Read and Write (Read may not be valid if controller is busy)

bit 0  ⎫
   .      ⎬ Low order part of memory address
   bit 15 ⎭

4) High Memory Address

-continued

```
I/O Address: 06
Write
  bit 0  ⎫
         ⎬ High order part of memory address
  bit 7  ⎭
  bit 8  ⎫
         ⎬ Do Not Care
  bit 15 ⎭
Read
  bit 0  ⎫
         ⎬ High order part of memory address
  bit 7  ⎭
  bit 8   0 = Disk 0 Connected
  bit 9   0 = Disk 1 Connected
  bit 10  0 = Disk 2 Connected
  bit 11  0 = Disk 3 Connected
  bit 12  Reserved
  bit 13  Reserved
  bit 14  Reserved
  bit 15  Reserved
5) Head/Sector
  I/O Address: 08
  Read and Write
  bit 0  ⎫
         ⎬ Sector Selector
  bit 5  ⎭
  bit 6  Reserved
  bit 7  Reserved
  bit 8  ⎫
         ⎬ Head Selector
  bit 11 ⎭
  bit 12 Reserved
  bit 13 Reserved
  bit 14 Reserved
  bit 15 Reserved
6) Cylinder
  I/O Address: 0A
  Read and Write
  bit 0  ⎫
         ⎬ Cylinder Selector
  bit 11 ⎭
  bit 12 Reserved
  bit 13 Reserved
  bit 14 Reserved
  bit 15 Reserved
```

In addition to the registers listed above there are two more I/O addresses and an interrupt associated with the disk controller. Writing to the I/O addresses causes the disk controller to be enabled or disabled. Reading from these addresses yields a system ID (see 3.3.1.10). The interrupt indicates that a disk access has completed. The addresses and interrupt number are given below.
1) Write 18: Disable disk controller
2) Write 1A: Enable disk controller
3) Interrupt 83 (vector address 14C): Disk access complete

3.2.1.10 System Control

There is a set of I/O addresses associated with various aspects of system control. The controls include power supply monitoring and sequencing, error sensing and signaling, and board resets. All of the addresses and controls are described below:

```
1) Array Reset
   I/O Address: 10
   Read and Write (Write causes reset)
      for k = 0,1,...15
         bit k: Resets Board k in Connector Jn, n = 20 - k
2) Control
   I/O Address: 12
   Read and Write
      bit 0   0 = Enable system memory error
                  correction
      bit 1   0 = System memory check bit write
                  enable
      bit 2   1 = Front panel light indicator # 1
      bit 3   1 = Front panel light indicator # 2
      bit 4   0 = Reset reserved memory error
                  (attempt to access locations between
                  PROM and RAM)--bit must be 1 and
                  NMI enabled to latch error
      bit 5   0 = Reset front panel interrupt--bit must
                  be 1 and NMI enabled to latch error
      bit 6   1 = Enable Nonmaskable Interrupt (NMI)
      bit 7   1 = Turn off -5 power supplies
      bit 8   1 = Turn on -24 power supply
      bit 9   1 = Turn on -12 disk power supply
      bit 10  1 = Turn on -5 disk power supply
      bit 11  1 = Turn on -12 power supply
      bit 12  1 = Turn on -5 and -12 power supplies
      bit 13  1 = Turn on -12 disk power supply
      bit 14  0 = Reset local hypercubes
      bit 15  0 = Fans on (1 = Fans off)
3) Reset/Status
   I/O Address: 16
   Write--Reset
      Reset local array ECC error (data = do not care)
   Read--Status
      bit 0   1 = #1 +5 power good
      bit 1   1 = #2 +5 power good
      bit 2   1 = #3 +5 power good
      bit 3   1 = #4 +5 power good
      bit 4   1 = Main -12 power good
      bit 5   1 = Main -12 power good
      bit 6   1 = Disk -24 power good
      bit 7   1 = Disk +12 power good
      bit 8   1 = Disk +5 power good
      bit 9   1 = Disk -12 power good
      bits 10-15  Nonmaskable Interrupt (NMI)
      bit 10  0 = Illegal memory access interrupt
      bit 11  0 = System memory ECC interrupt
      bit 12  0 = Local array memory ECC interrupt
      bit 13  0 = Front panel interrupt
      bit 14  0 = Watch dog timer interrupt
      bit 15  0 = Power fail interrupt
4) Disk Disable/System ID
   I/O Address: 18
   Write--Disable
      Disable disk controller (data = do not care)
   Read--System ID
      bits 0 to 2:   I/O slot number
      bits 3 to 15:  Low order part of system ID
5) Disk Enable/System ID
   I/O Address: 1A
   Write--Enable
      Enable disk controller (data = do not care)
   Read--System ID
      bits 0 to 7:   High order part of system ID
6) Reset/ECC
   I/O Address: 1C
   Write--Reset
      Reset system memory ECC error (data = do not care)
   Read--ECC
      ECC syndrome--the table below indicates the
      interpretation of the syndrome.
         Syndrome Decoding
```

-continued

| bits | | | | 1) bits 7,6 = Memory Bank  2) bits 5,4,3,2,1,0 = Table | | | | | | |
|---|---|---|---|---|---|---|---|---|---|---|
| | | | | 0 | 0 | 1 | 0 | 1 | 0 | 1 |
| | | | | 1 | 0 | 0 | 1 | 1 | 0 | 0 | 1 | 1 |
| 5 | 4 | 3 | 2 | 0 | 0 | 0 | 0 | 1 | 1 | 1 | 1 |
| 0 | 0 | 0 | N | CB0 | CB1 | D | CB2 | D | D | — |
| 0 | 0 | 1 | CB3 | D | D | 0 | D | 1 | 2 | D |
| 0 | 1 | 0 | CB4 | D | D | 5 | D | 6 | 7 | D |
| 0 | 1 | 1 | D | 3 | — | D | 4 | D | D | — |
| 1 | 0 | 0 | CB5 | D | D | 11 | D | — | 12 | D |
| 1 | 0 | 1 | D | 8 | 9 | D | 10 | D | D | — |
| 1 | 1 | 0 | D | 13 | 14 | D | 15 | D | D | — |
| 1 | 1 | 1 | — | D | D | — | D | — | — | D |

N = No error
CBX = Error in Check Bit X
X = Error in bit X
D = Double bit error

3.2.1.11 Temperature Sensors

The system contains sixteen temperature sensing devices located throughout the enclosure. They are used to prevent system damage caused by over heating. In order to trigger a sensor and take a measurement, software must perform the following steps:
1) Write to one of I/O addresses 38,3A,3C or 3E
   bits 0 to 3: Select one of 16 sensors
   bits 4 to 15: Do not care
2) Write to the same address with the same data at lest 2 microseconds later (the sensor multiplexor requires a settling time). After the temperature has been sensed an interrupt is generated:
   Interrupt #86 (vector at memory address 158)
3) Read from same address
   bits 0 to 7: Measured temperature
   bits 8 to 15: Reserved

3.2.1.12 Real Time Clock

The System Control board has a real time clock (84) that is controlled and sensed by writing and reading the following I/O addresses.

```
1) Control Status
   I/O Address  40
   Write--Control
      bit 0: 0 = Interrupt run; 1 = Interrupt stop
      bit 1: 0 = Select clock set register  ⎫
             1 = Select interrupt register  ⎭  see (2)
      bit 2: 0 = Clock run; 1 = Clock stop
      bit 3: 0 = Normal mode; 1 = Test mode
      bits 4 to 15: Do not care
   Read--Status
      bit 0: Interrupt flag (same as Write)
      bit 1: 0
      bit 2: 0
      bit 3: Data changed flag
      bits 4 to 15: Reserved
2) Set/Interrupt
   I/O Address: 5E
   Read and Write
   If Control/Status (40) bit 0 = 0
      bit 0: 0 = 12 hour mode; 1 = 24 hour mode
      bit 1: 0 = AM, 1 = PM (0 in 24 hour mode)
      bit 2 ⎫
      bit 3 ⎭  Leap year counter (00 = Leap year)
   If Control/Status (40) bit 0 = 1
      bit 0 ⎫
      bit 1 ⎬  Interrupt period (see table below)
      bit 2 ⎭
      bit 3: 0 = Single
interrupt
             1 = Repeated interrupt
```

-continued

| Interrupt Period | bits 2,1,0 |
|---|---|
| No Interrupt | 000 |
| 0.1 Seconds | 001 |
| 0.5 Seconds | 010 |
| 1.0 Seconds | 011 |
| 5.0 Seconds | 100 |
| 10.0 Seconds | 101 |
| 30.0 Seconds | 110 |
| 60.0 Seconds | 111 |

3) Time Set/Read
   Write (Set) and Read (Sense)

| I/O Address | Function |
|---|---|
| 42 | Tenths of seconds (Read only) |
| 44 | Seconds |
| 46 | Tens of seconds |
| 48 | Minutes |
| 4A | Tens of minutes |
| 4C | Hours |
| 4E | Tens of hours |
| 50 | Days |
| 52 | Tens of days |
| 54 | Months |
| 56 | Tens of months |
| 58 | Years |
| 5A | Tens of years |
| 5C | Day of week (Modulo 7 counter) |

The interrupt associated with the Real Time Clock is:
Interrupt #72 (Vector at memory address 120)

3.2.1.13 Timer

The System Control has two timers in addition to the Real Time Clock. They are provided by an Intel 8254 that has 4 I/O addresses associated with it. The two timers are called the Watchdog timer and the Schedule timer. They both use the same prescaler but the Watchdog generates a Non Maskable interrupt (NMI) while the Schedule timer generates interrupt 32. Their addresses are listed below. The Timer is set up by writing to the Control register. The time base is also given below.

| Unit | I/O Address | Interrupt | |
|---|---|---|---|
| Prescaler | 0F0 | | |
| Watchdog | 0F2 | NMI(2) | 8 |
| Schedule | 0F4 | 32 | 80 |
| Control (Write Only) | 0F6 | | |

Time Base = $5.425 * 10^{**} - 5$

3.2.1.14 Interrupt Controllers

The System Control provides a full range of interrupts for various system control functions. These interrupts are handled by five Intel 8259A Interrupt Controllers. One of these devices is designated the Master Controller and it has two Slave Controllers (Slave 0 and Slave 1) connected to it. The last two 8259As are used to signal error conditions in the main array and are connected to Slave 0. The Main Array Error Controllers must be used in polled mode. The following table lists the controllers, their addresses, and defines the interrupts they handle. Section 3.3.2.1.14 lists the interrupts and vector addresses that are generated by these controllers. Programming details for the 8259A can be found in Intel's Data Catalogue.
1) Master Interrupt Controller
   I/O Addresses:
      C0: ICW1,OCW2,OCW3 (byte access only)
      C2: ICW2-4, Mask Register (byte access only)
   Connected Interrupts:

0: Schedule Timer
1: Serial Channel Controller 0
2: Serial Channel Controller 1
3: Serial Channel Controller 2
4: Serial Channel Controller 3
5: Slave Interrupt Controller 0
6: Slave Interrupt Controller 1
7: Reserved (grounded)
2) Slave Interrupt Controller 0
  I/O Addresses:
    CB: ICW1,OCW2,OCW3 (byte access only)
    CA: ICW2-4, Mask Register (byte access only)
  Connected Interrupts:
    0: Real Time Clock
    1: Local Array Error
    2: Main Array Error (see 4 below)
    3: DMA Channel 0 (end of DMA)
    4: DMA Channel 1 (end of DMA)
    5: DMA Channel 2 (end of DMA)
    6: DMA Channel 3 (end of DMA)
    7: Reserved (grounded)
3) Slave Interrupt Controller 1
  I/O Addresses:
    CC: ICW1,OCW2,OCW3 (byte access only)
    CE: ICW2-4, Mask Register (byte access only)
  Connected Interrupts:
    0: SBX 3 Interrupt
    1: SBX 2 Interrupt
    2: SBX 1 Interrupt
    3: Disk Controller Interrupt
    4: Power Down Interrupt
    5: Printer Interrupt
    6: Temperature Sense Ready Interrupt
    7: Reserved (grounded)
4) Main Array Interrupt Controller
  I/O Addresses:
    C4: ICW1,OCW2,OCW3 (16 bit access only)
    C6: ICW2-4, Mask Register (16 bit access only)
  Connected Interrupts:

| Level | Low Data Byte | High Data Byte |
|---|---|---|
| 0 | Board 0 (J20) | Board 8 (J12) |
| 1 | Board 1 (J19) | Board 9 (J11) |
| 2 | Board 2 (J18) | Board 10 (J10) |
| 3 | Board 3 (J17) | Board 11 (J9) |
| 4 | Board 4 (J16) | Board 12 (J8) |
| 5 | Board 5 (J15) | Board 13 (J7) |
| 6 | Board 6 (J14) | Board 14 (J6) |
| 7 | Board 7 (J13) | Board 15 (J5) |

3.2.1.15 Interrupts

The System Control generates and handles a complete set of interrupts for managing the system. The interrupts are defined in the table below.

| Vector # | Address | Function |
|---|---|---|
| 0 | 00 | Divide Error |
| 1 | 04 | Single Step |
| 2 | 08 | Non Maskable Interrupt (NMI) |
| 3 | 0C | Breakpoint |
| 4 | 10 | Overflow (detected by INTO instruction) |
| 5 | 14 | Range Bound Exceeded |
| 6 | 18 | Invalid Opcode |
| 7 | 1C | Processor Extension Not Available |
| 8 | 20 | Interrupt Table Too Small |
| 9 | 24 | Processor Extension Segment Overrun |
| 10-12 | 28-30 | Reserved |
| 13 | 34 | Segment Overrun |

-continued

| Vector # | Address | Function |
|---|---|---|
| 14-15 | 38-3C | Reserved |
| 16 | 40 | Processor Extension Error |
| 17-31 | 44-7C | Reserved |
| 32 | 80 | Schedule Timer (using vector base 20H) |
| 33-39 | 84-9C | Reserved |
| 40 | A0 | Serial Channel 0 Tx Empty |
| 41 | A4 | Serial Channel 0 Status Change |
| 42 | A8 | Serial Channel 0 Rx Ready |
| 43 | AC | Serial Channel 0 Special Rx |
| 44 | B0 | Serial Channel 1 Tx Empty |
| 45 | B4 | Serial Channel 1 Status Change |
| 46 | B8 | Serial Channel 1 Rx Ready |
| 47 | BC | Serial Channel 1 Special Rx |
| 48 | C0 | Serial Channel 2 Tx Empty |
| 49 | C4 | Serial Channel 2 Status Change |
| 50 | C8 | Serial Channel 2 Rx Ready |
| 51 | CC | Serial Channel 2 Special Rx |
| 52 | D0 | Serial Channel 3 Tx Empty |
| 53 | D4 | Serial Channel 3 Status Change |
| 54 | D8 | Serial Channel 3 Rx Ready |
| 55 | DC | Serial Channel 3 Special Rx |
| 56 | E0 | Serial Channel 4 Tx Empty |
| 57 | E4 | Serial Channel 4 Status Change |
| 58 | E8 | Serial Channel 4 Rx Ready |
| 59 | EC | Serial Channel 4 Special Rx |
| 60 | F0 | Serial Channel 5 Tx Empty |
| 61 | F4 | Serial Channel 5 Status Change |
| 62 | F8 | Serial Channel 5 Rx Ready |
| 63 | FC | Serial Channel 5 Special Rx |
| 64 | 100 | Serial Channel 6 Tx Empty |
| 65 | 104 | Serial Channel 6 Status Change |
| 66 | 108 | Serial Channel 6 Rx Ready |
| 67 | 10C | Serial Channel 6 Special Rx |
| 68 | 110 | Serial Channel 7 Tx Empty |
| 69 | 114 | Serial Channel 7 Status Change |
| 70 | 118 | Serial Channel 7 Rx Ready |
| 71 | 11C | Serial Channel 7 Special Rx |
| 72 | 120 | Real Time Clock |
| 73 | 124 | Local Array Error |
| 74 | 128 | Main Array Error |
| 75 | 12C | DMA Channel 0 (end of DMA) |
| 76 | 130 | DMA Channel 1 (end of DMA) |
| 77 | 134 | DMA Channel 2 (end of DMA) |
| 78 | 138 | DMA Channel 3 (end of DMA) |
| 79 | 13C | Reserved |
| 80 | 140 | SBX 3 Interrupt |
| 81 | 144 | SBX 2 Interrupt |
| 82 | 148 | SBX 1 Interrupt |
| 83 | 14C | Disk Controller Interrupt |
| 84 | 150 | Power Down Interrupt |
| 85 | 154 | Printer Interrupt |
| 86 | 158 | Temperature Sense Ready Interrupt |
| 87 | 15C | Reserved |

3.2.1.16 Interrupts

The System Control Board supports the Intel 80287 Math Coprocessor (90) as an option. The I/O addresses listed below are activated by invoking the Intel 80286 Escape opcodes used by the Intel 80287. The details on the 80287 are in Intel's Microprocessor Manual.
80287 I/O Addresses: F8 to FF

3.2.1.17 Initial State

The System Control Board is initialized on system reset.

3.2.1.18 System Summary

The following tables summarize the memory and I/O address space of the System Control.

| Memory Space | |
|---|---|
| System Memory (RAM) | 000000 to 1FFFFF |
| Local Array Memory (RAM) | 200000 to 3FFFFF |

-continued

| | |
|---|---|
| Reserved (8026) | 40000 to F7FFFF |
| Reserved (Disk Controller) | 40000 to FFFFFF |
| Read Only Memory (EPROM) | F8000 to FFFFFF |
| I/O Space | |
| Parallel I/O Section | 000 to 01F |
| Reserved | 020 to 037 |
| Temperature Sense | 038 to 03F |
| Real Time Clock | 040 to 05F |
| SBX 3 | 060 to 07F |
| SBX 2 | 080 to 09F |
| SBX 1 | 0A0 to 0BF |
| Interrupt Controllers | 0C0 to 0CF |
| Serial Channel Controllers | 0D0 to 0EF |
| Timer | 0F0 to 0F7 |
| Math Coprocessor | 0F8 to 0FF |
| DMA Controller | ??? to ??? |

3.2.2 Graphics Processor

A Graphics Processor is used to control a raster scan CRT display. This provides a very effective way for displaying and dealing with the very large amount of data that can be computed and output by the system.

The graphics system consists of up to 2 megabytes of RAM organized as a 768 by 1024 by 8 bit frame buffer, 16 processing nodes to handle local display processing, a color lookup table, and the logic to handle display refresh and panning. The output of the graphics system is standard RS-343 RGB video data that can be connected to any high performance (40 mHz) color CRT monitor.

The I/O channel bandwidth allows the main processor to output a new frame of display data in excess of 60 times a second (faster than the display refresh rate). This makes the system ideal for a wide range of graphics applications.

3.2.3 Interprocessor Link

Two or more systems are interconnected through an I/O channel (an order 7 subcube) in each system. This permits the implementation of arbitrary graphs of systems including pipelining of multiple systems where the outputs of one machine feeds the input of the next and the last system drives the displays.

4 THE PROCESSOR

4.1 Introduction

The processor array is made up of $2^N$ nodes where N is 6,7,8,9 or 10. Each processing node (FIG. 4) consists of a general purpose 32 bit processor (including 32 and 64 bit floating point instructions), 128K bytes of ECC memory and 11 communication channels to support the hypercube interconnection scheme and the 8 system I/O channels.

4.2 Architecture Overview

4.2.1 Data Representation

The processor recognizes two main classes of data: integers and reals. Integers are represented in standard 2's complement form and come in three types: byte (B-8 bits), halfword (H-16 bits) and word (W-32 bits). There two types of reals. The 32 bit format, called real (R), has an 8 bit exponent and 24 bits of significance. The longreal (L) format is 64 bits with 11 in the exponent and 53 in the significand. The longreal format is used for computations that need high accuracy and for intermediate computations with real variables when the computation is particular sensitive to roundoff error. Both of these formats conform to the IEEE Binary Floating Point Standard (P754).

In addition to the various data formats, the processor recognizes and manipulates addresses. Addresses are simply 32 bit unsigned values that point to individual bytes in a linear address space.

4.2.2 Registers, Interrupts and Communication

The processor's instructions operate on data in main memory (as described above) or on data in 32 bit registers. The processor contains three types of registers: the general registers, the processor registers and the communication control registers. The 16 general registers are 32 bits long and are used for both operands and addresses. Since they are general they can be used interchangeably in all operations and addressing modes.

Figure 7:
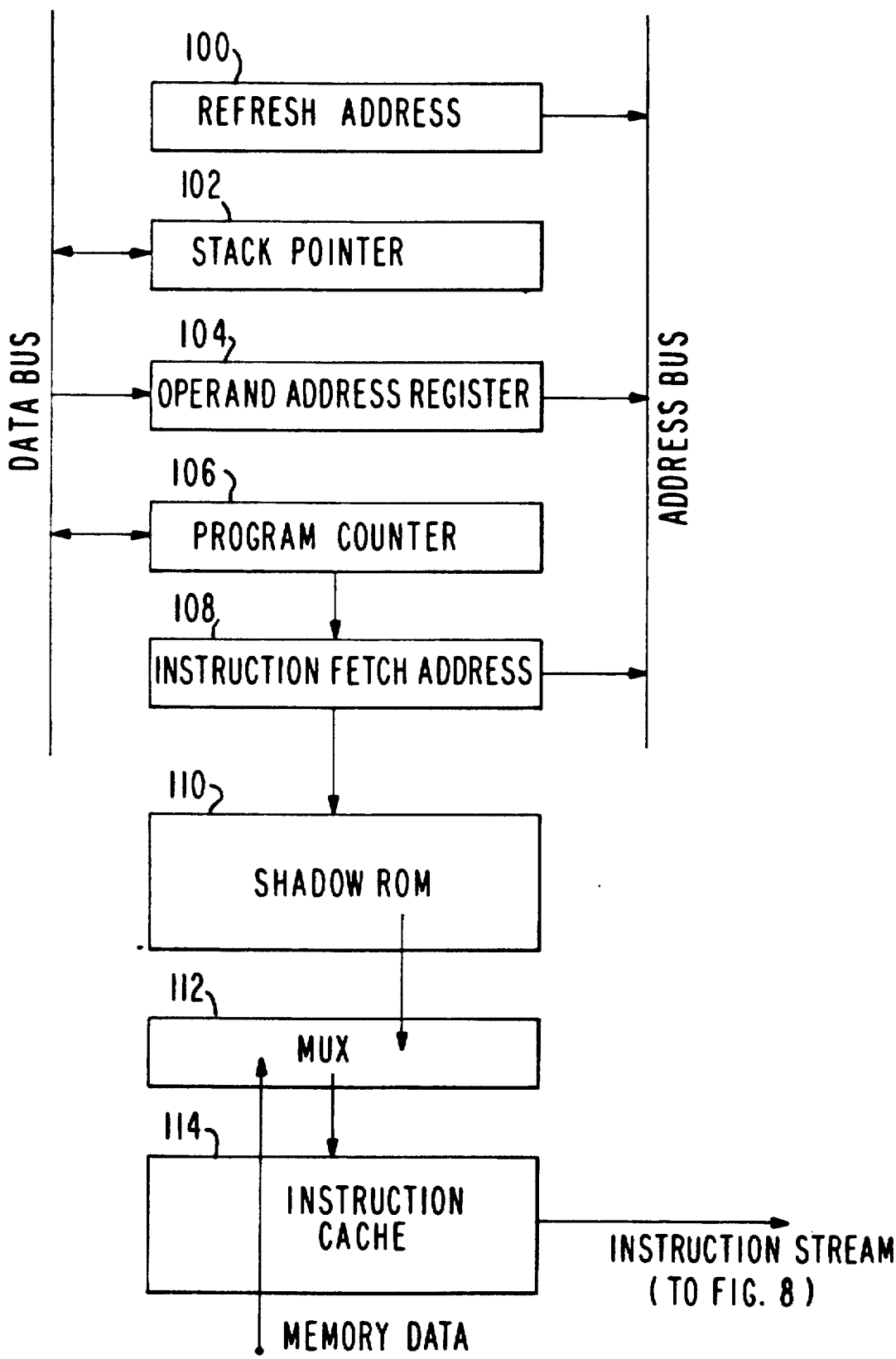
FIG. 7 is a detailed block diagram of the address unit and instruction cache shown in FIG. 5.
Figure 9B:
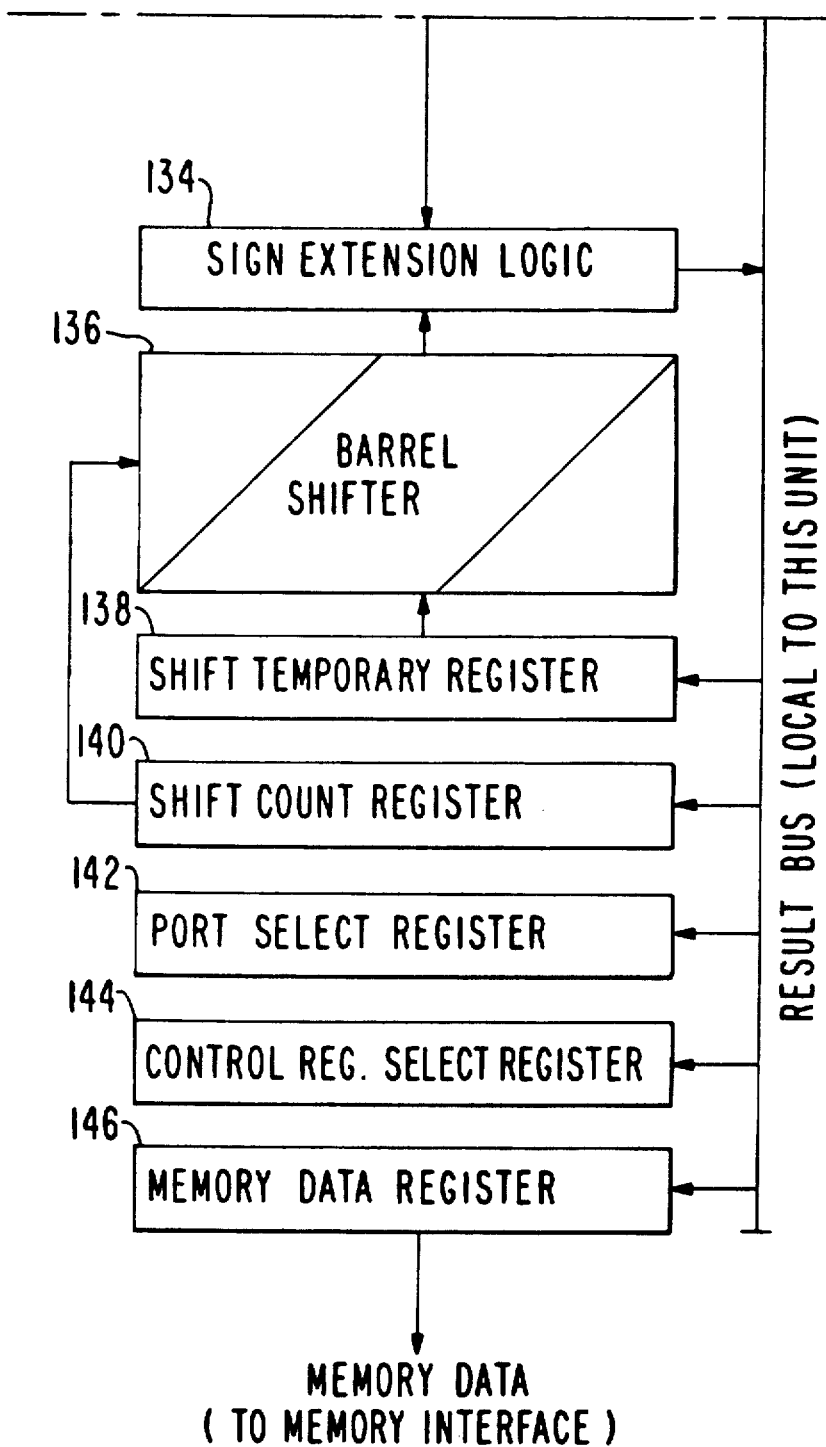

The processor registers are special purpose and can only be read from or written onto by Load Processor register (LDPR) and Store processor Register (STPR) instructions respectively. The exact formats and detailed descriptions of these registers are given in section 4.4.3. The processor registers are shown in FIGS. 7, 9A and 9B and include:

0. Stack Pointer (SP)—points to the top of the stack
1. Program Status (PS)—contains flags, interrupt controls and other status information
2. Fault Register (FR)—the fault codes are stored here
3. Configuration Register (CR)—the model number (read only) and memory interface parameters are stored here
4. Processor Identification(PI)—contains a number that identifies the processor's location in the array
5. Time Out (TO—contains a counter that is decremented approximately every 100 microseconds and generates an interrupt (if enabled) when it reaches zero Processor registers 6 through 12 are used to signal "ready" and error conditions for the I/O channels.

The I/O ports on the processor are unidirectional Direct Memory Access (DMA) channels and each channel has two 32 bit write only registers: an address register for the buffer location and a count register indicating the number of bytes left to send or receive. Communication is performed by setting the registers of the desired channel to the appropriate address and data length and then the DMA channel takes over and communicates a message without processor intervention. Interrupts can be used to signal when a channel is available (i.e. when the count reaches zero the channel is "ready"). A separate interrupt vector is provided to indicate to a receiver that an error occurred during the data transmission.

In addition to communication synchronization and error reporting the processor uses vectored interrupts for:

1. hardware errors (e.g. multibit memory errors)
2. program exceptions (e.g. real overflow)
3. software facilities (e.g. trace, timeout)

When an interrupt occurs the current program status (PS) and program counter (PC) are pushed on the stack. Then PS and PC are loaded with new values from the appropriated entry (indexed by the interrupt number) in the interrupt vector table in low memory.

4.2.3 Instruction Formats and Addressing Modes

An instruction consists of an operation code followed by zero and one or two data references:

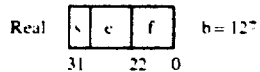

low address                high address

All instruction operation codes (opcodes) in the processor are one byte long. The first four bits indicate the operation and number of operands (e.g. ADD: 2 operands, BRANCH: 1 operand) while the other four bits denote the operand size and type (e.g. Halfword (integer), Real (floating point). This symmetry makes an opcode map easy to read and code generation easier for a compiler.

All of the standard instructions are available for each data type including arithmetic, logical, conversion, comparison, branch, call and trap instructions. Instructions can be preceded by a REPEAT prefix that causes them to be executed repeatedly until a termination condition is satisfied. This is a very powerful facility for vector and string operations. Repeats can also be used with both branches and calls in order to execute a block of code repeatedly, (i.e. a REPEAT BRANCH is equivalent to a loop instruction). And for future extension each operand type has a reserved "excap" code.

A few instructions have no operands (e.g. BREAKPOINT) and some have only one (e.g. CALL) but most have two address fields. All address fields begin with a one byte mode selector. For all modes involving the general registers the first four bits indicate the mode and the remaining four determine which register to use. If there is an offset indicated it follows the mode selector. Some of the modes provided are literal, immediate, direct and indirect with no registers involved; and register direct, register indirect with and without offset, autoincrement and autodecrement and offset addressing with both the program counter (PC) and the stack pointer (SP). As with instructions there is a reserved "escape" code defined for the mode selector field.

4.3 Data Representation

The processor recognizes two classes of data: integers and reals (floating point number). There are three types of integers and two types of reals.

4.3.1 Integers

The three integer data types are all represented in standard 2's complement. They are called Byte (B), Halfword (H) and Word (W) and are 8, 16 and 32 bits long respectively. The ranges for the three integer formats are specified as follows:
Byte (B): −128 to 127
Halfward (H): −32,768 to 32,767
Word (W): −2,147,483,648 to 2,147,483,647

Most instructions treat integers as signed numbers but the logical operations (e.g. AND, OR) view their operands as unsigned quantities. Addresses are also treated by the processor as unsigned values. The address space is logically a linear set of bytes from address 0 to $2^{**}32-1$; thus addresses are unsigned 32 bit integers (Words).

4.3.2 Reals

The floating point implementation in the processor conforms to the IEEE Binary Floating Point Standard (P754). With the floating point arithmetic not only are the rounded results as accurate as possible but it is feasible to compute guaranteed bounds on the errors using the special directed rounding modes. Also because to the high accuracy of Real (32 bits) computations and the availability of Longreal (64 bits) to back them up at crucial points, it will be possible to run many more programs in Real precision instead of automatically using Longreal everywhere.

The representations for the two floating point type are illustrated below including the formulas for the value represented. In the formulas "s" is the sign, "e" is the exponent, "f" is the fraction and "b" is the bias in the exponent.

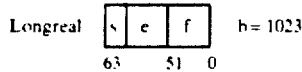

VALVE (V)
1) e = 0 V = (−1)**s*(0.f)*2**(1−b)
2) 0 < e < 2*b−1 V = (−1)**s*(1.f)*2**(e−b)
3) e = 2*b−1, f = 0 V = (−1)**s*(INFINITY)
4) 3 = 2*b−1, F ≠ 0 V = Not-a-number (Nan)

The two formats are closely related; the distinguishing characteristics being the exponent range (defined by the parameter b) and the fraction precision. The Real format has 24 bits of precision (about 7 digits) with a range of approximately $10^{}(-38)$ to $10^{}(38)$. The Longreal format has a much wider range—about $10^{}(-308)$ to $10^{}(308)$—and more than twice the precision of Real at 53 bits or about 15 digits. Thus Longreal, besides being a powerful standalone computational format, makes an excellent backup facility for Real calculations at points in a program where the results are very sensitive to roundoff error.

This implementation conforms to the IEEE Floating Point Standard which was carefully designed to provide accurate and reliable arithmetic. The following properties are a result of the standard.

1) Denormalized numbers (e=0) fill the space between zero and the smallest normalized number. They provide a far superior way of dealing with underflow than the typical "flush to zero" response.

2) The implicit bit yields the greatest possible accuracy and is one of the two reasons for choosing radix 2. The other is speed; for a given amount of hardware binary will always be fastest.

3) The offset (b) was chosen to ensure that all normalized numbers have representable reciprocals.

4) The format was organized to permit very fast comparisons.

5) Infinities (e=11 . . . 1, f=0) were explicitly represented to allow for handling zero divide and overflow exceptions.

6) When e=11 . . . 1 and f<>0 the representation is treated as Not a Number (Nan) and instead of producing a numeric result when used as an operand the processor generates an exception. Nan's were provided to allow for software extensions including runtime diagnostics like "uninitialized variable" and to permit potentially flawed computation like 0/0 to continue in order to observe the effect, if any, on the final results.

7) Longreal has greater range and more than double the precision of Real to permit exact Real multiply with no threat of overflow or underflow and generally to allow for Longreal accumulations of Real computations.

The floating point architecture of the processor implemented in accordance with the principles of the present invention includes much more than the data representations. All of the IEEE Standard requirements are either met in the hardware or are facilitated in software. Among these requirements is the provision of rounding modes. In the Program Status (PS) register are two bits that control the rounding mode in effect. The modes are:

- 00) Round to Nearest Even: in this mode the closest possible result is returned. If there are two then the even one is generated. This removes the bias that exists in the more typical "round up in the half case" rounding.
- 01) Round Up: the larger of the two numbers that bracket the exact result is returned.
- 10) Round Down: this returns the smaller of the two possibilities.
- 11) Round Toward Zero: the result is the one that is the smaller in magnitude.

Another important facility in the floating point architecture is exception handling. The following required faults are recognized 1) Inexact Result: when the result of an operation is not exact but must be rounded.

2) Underflow: the result is nonzero and less in magnitude than the smallest normalized number.

3) Zero Divide: the denominator is zero while the numerator is nonzero.

4) Overflow: the rounded result is larger in magnitude than the largest representable number.

5) Invalid Operation: this includes indeterminate operations like 0/0, 0*INFINITY, etc. and the use of a Nan as an operand.

All of these exceptions have an associated flag (and Inexact has an interrupt enable) in the PS register. If an exception occurs and its interrupt is enabled, the processor produces enough information for recovery. If the interrupt is disabled the flag is set and the processor takes predefined action:

1) Inexact Result: store the rounded result and continue (In this implementation only Inexact Result may be disabled.) The exceptions and responses are defined in detail in Section 4.5.

The floating point architecture also provides all the standard instructions for all formats: add, subtract, multiply, divide, compare and conversion. But in addition there are some unusual but crucial instructions. Square root is correctly rounded and as fast as divided. Remainder is an exact operation and permits argument reduction for periodic functions with no roundoff error.

4.4 Registers

The following sections describe three types of registers in the processor: the General registers, the Input/Output registers and the Processor registers.

4.4.1 General Registers

The 16 General registers (128), shown in FIG. 9A, are labeled R0 to R15. They are 32 bits wide and are used for data and addresses. They are consistently symmetrical with no special designations or uses for any of them. When integer data shorter than 32 bits is moved to a General register it is sign-extended to 32 bits. When data longer than 32 bits are stored in the registers, the low order part of the data goes in the designated register, Ri, and the high order part resides in Ri−1. The numbers "wrap around" so that if a Longreal is moved to R15 the high order section is found in R0.

4.4.2 Input/Output Registers

Figure 5:
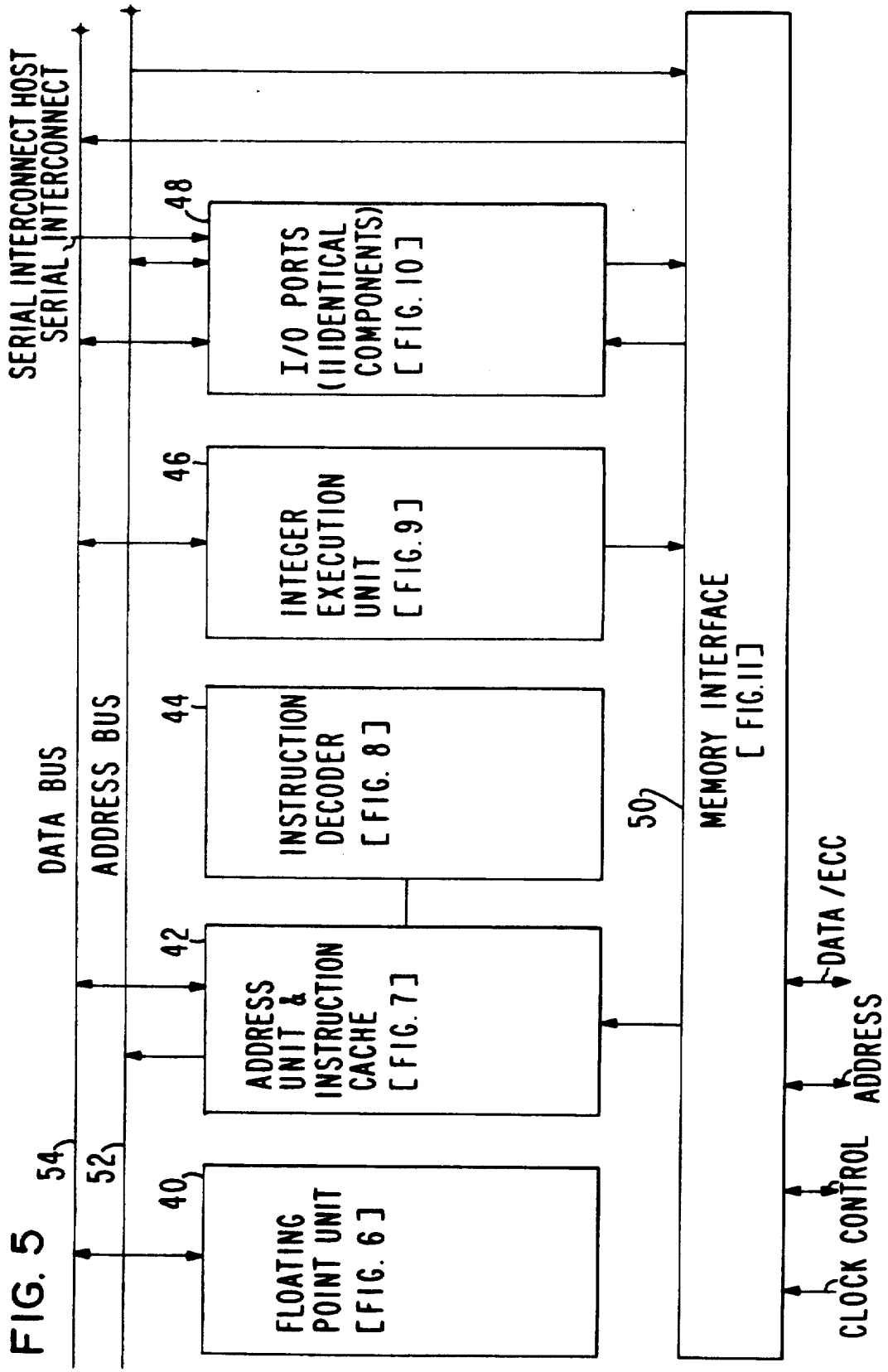
FIG. 5 is a detailed block diagram of the Ncub TM processor integrated circuit shown in FIG. 4.

In a processor, each of the 11 input and output ports (48), shown in FIG. 5, is an independent Direct Memory Access (DMA) channel and has two 32 bit registers: an address register and a count register. The address register contains a pointer to the least significant byte of the next halfword to be transferred. If it is an output port the data is moved from memory out to the port. If it is an input port the data is moved to memory that has been received from the output port of the sending processor. In both cases the count register is set to indicate the number of bytes to be sent or received. As data is sent or received, the appropriate address and count registers are incremented and decremented respectively by the number of bytes transferred. When the count reaches zero the ready flag in the Input or Output Status register (see below) is set and an interrupt is generated if an interrupt has been enabled.

The DMA channels operate independently of instruction processing. They being functioning whenever a count register is set to a nonzero value. All of the ports are general except one input and one output port are designated "host" (H) and are normally used to communicate over the I/O bus to the System Control Boards.

4.4.3 Processor Registers

The Processor registers are the third type of register in the processor. All Processor registers are 32 bits wide. They contain all the special purpose and miscellaneous information and can only be loaded or stored by the Load Processor Register (LDPR) and Store Processor Register (STPR) instructions, respectively. These registers are labeled P0 to P11 but they also have unique names that denote their purpose:

0) Stack Pointer (P0, SP): the SP contains a pointer to the current top of stack. The stack grows toward low memory.

1) Program Status (P1, PS): This register contains the information that defines the current state of a program. The format of the PS is shown below:

| REP | REP REG | RC | R R T IE IO II TO CE |
|-----|---------|-----|----------------------|
| 31  | 29      | 26  | 24                 16 |

| IV R R R R IIX IN OF FZ UF IX U N Z V C |
|------------------------------------------|
| 15                                     0 |

All of the fields are one bit except REP (2 bits), REP REG (4 bits), and RDC (2 bits). The meanings of the fields are defined below (R is "Reserved"):

FLAGS

C—Carry is set on integer operations when there is a carry out of the most significant position. It is also set by floating point instructions and integer multiply and divide to indicate that the result is negative. This allows the use of the Unsigned Branches to implement the "unordered" branches required by the IEEE Floating Point Standard.

V—Integer Overflow is set when the integer result is too large in magnitude for the format.

Z—The Zero flag is set when the integer or floating point result is zero.

N—Negative is set when the integer or floating point result is negative. If there is an Integer Overflow the Negative flag will not agree with the sign bit of the stored result because the Negative flag is set according to the actual result before Overflow is determined.

U—The Not Comparable flag is set when floating point values are compared and one or both of the operands is Not-a-number (Nan).

FLOATING POINT EXCEPTIONS

The indicated flag is set when the associated exception occurs and if not disabled the corresponding interrupt is generated. (In present embodiment of the invention only the Inexact Result interrupt can be disabled. The exceptions are defined in Section 4.5.

IX—Inexact Result
UF—Underflow
FZ—Floating Zero Divide
OF—Overflow
IN—Invalid Operation

INTERRUPT ENABLE FLAGS

If a flag is set and the associated exception or event occurs an interrupt is generated. If the bit is zero the interrupt is suppressed until the interrupt condition is cleared or the interrupt is enabled. The floating point interrupt conditions are cleared as soon as the subsequent instruction begins execution.

IIX—Inexact Result Enable
R—Reserved for Underflow Enable
R—Reserved for Zero Divide Enable
R—Reserved for Invalid Operation Enable
IV—Integer Overflow Enable
CE—Correctable ECC (when a memory error is corrected by the processor's ECC logic and this flag is set an interrupt is generated; this permits logging the number of memory errors.)
TO—Timeout Enable (if this flag is zero the interrupt that would be generated by a zero value in the Timeout Register is suppressed.)
II—Input Enable (if this flag is zero any interrupt associated with an input channel is suppressed.)
IO—Output Enable (if this flag is zero all output channel interrupts are suppressed.)
IE—Interrupt Enable (if this flag is zero then all interrupts that can be disabled by other flags are disabled)
T—Trace (this flag, if set to one, causes an interrupt as soon as the current instruction finishes; this is used for "single step" debugging.)

CONTROL FIELDS

RC—Round Control (this field controls the rounding mode for real operations.)
00) Round to Nearest Even
01) Round Up
10) Round Down
11) Round Toward Zero REP—Repeat Mode (this field indicates the repeat mode in effect for the instruction following one of the REPEAT operation codes.)
00) No Repeat
01) Repeat while REG is not zero
10) Repeat while REG is not zero and the Z flap is one.
11) Repeat while REG is not zero and the Z flag is zero.

REP REG—Repeat Register (if the repeat mode is not 00 then every time the instruction the following repeat-type operation code is executed the value in REG is decremented; REG can be any of the General registers.)

2) Fault Register (P2, FR): When the processor takes an interrupt generated by an exception this register contains information to aid recovery. The format of the Fault Register is shown below.

| R R R R R R R R R R R R R R R R |
|---|
| 31                            20 |

| R R R R R S2 I2 E2 F2 S1 I1 E1 F1 GR RS RU |
|---|
| 15                                        0 |

RU — Round up (1 means result rounded up)
RS — Round OR sticky bit
GR — Guard bit F1 — Fraction (F1 = 1 means fraction = 0)  ⎤
E1 — Exponent (E1 = 1 means exponent = 0)   ⎥ First
I1 — Invalid (I1 = 1 means exponent = 11 . . 1)  ⎥ Operand
S1 — Sign (S1 = sign of first operand)       ⎦

F2 — Fraction (F2 = 1 means fraction = 0)  ⎤
E2 — Exponent (E2 = 1 means exponent = 0)   ⎥ Second
I2 — Invalid (I2 = 1 means exponent = 11 . . 1)  ⎥ Operand
S2 — Sign (S2 = sign of second operand)      ⎦

R — Reserved

The Guard, Round and Sticky bits are the hardware bits that are used for rounding in floating point operations as defined in the IEEE Binary Floating Point Standard. The Fraction, Exponent, Invalid and Sign bits for each operand allow an interrupt handler to determine if the operand is Nan, infinity, denormal, zero or "ordinary" (valid, nonzero) and its sign without decoding the instruction.

3) Configuration Register (P3, CR): This register is used to set various configuration parameters including the Model Number which is a Read-Only field. The format of the CR is:

| MODEL NUMBER | RESERVED |
|---|---|
| 31            24         16 |

| RESERVED | TYPE | CYC | REFR |
|---|---|---|---|
| 15       | 12   | 11 10 | 9 8 7   0 |

REFR — Indicates the refresh rate. With a processor
cycle time of 10 Megahertz:
rate = (REFR)*(0.8 microseconds)
The typical refresh rate is about 15.625
microseconds which requires that REFR = 19
REFR is set to 4 by the initialization
microcode).

-continued

TYPE — This allows for different memory types
  00) 64K RAM (4 - 16K)
  01) 256K RAM (4 - 64K)
  10) Reserved
  11) Reserved
CYC — This field specifies the memory speed
  00) 300 nsec
  01) 200 nsec
  10) Reserved
  11) Reserved
RESERVED — These bits are reserved for future use MODEL NUMBER—This field is set by the manufacturing process and is read only. It is used to distinguish different versions of the processor.

4) Processor Identification Register (P4, PI): The PI is set by the operating system at initialization and allows processors to identify themselves. The high order bit (31) indicates whether the processor is in the hypercube array (0) or on a System Control Board (1). The rest of the bits indicate the address or position of the processor in the array or on an Interface Board.

5) Timeout Register (P5, TR): Approximately every 100 microseconds the unsigned value in this register is decremented. Thus it can count for about 5.1 days. If the Timeout Register is zero an interrupt is generated whenever it is enabled. Decrementing stops when the value in the Timeout reaches zero.

6) Output Ready (P6, OR): There is a Ready flag for each output channel. When the flag is set to one it indicates that the count register for that channel is zero and the channel is ready to transmit more data. The format of the register is

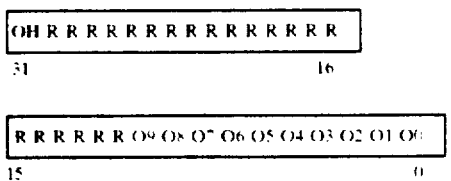

where OH means Output Host, R is Reserved for future expansion and Oi is the Output port number i. The OR register is read only.

7) Input Ready (P7, IR): For each input port there is a flag which when set indicates that the corresponding count register has gone to zero, the channel has completed its DMA function and is now ready to receive more data. The format of the register is the same as the Output Ready register except I (Input) is substituted for O (Output). The IR register is read only.

8) Output Enable (P8, OE): This register has the same format as the Output Ready register but the meaning of the flag is different. If a flag is set to one an interrupt is generated when the corresponding output channel is ready to transmit. The interrupt is suppressed if the flag is zero or if the Output enable (OI) flag in the Program Status register is zero.

9) Input Enable (P9, IE): When an input count register has become zero and the channel is ready to receive, an interrupt is generated if the corresponding flag in this register is set to one. If the flag is zero or the Input enable (II) flag in the Program Status register is zero the interrupt is suppressed.

10) Input Pending (P10, IP): if the count register of an input port is zero but there is a halfword in the port that has not been stored in memory, the corresponding bit in this register is set to one. This register is read only.

11) Input Parity Error (P11, PE): Every halfword received is checked for parity. If an error is detected then after the transmission is complete (the count register becomes zero) instead of generating a "ready" interrupt, the corresponding flag in this register is set and an "input error" interrupt is generated. This register is read only.

12) Input Overrun Error (P12, IO): If a halfword is received and overwrites a previously received halfword before is can be stored in memory an error is noted. After the count goes to zero instead of signaling a "ready" interrupt, the corresponding flag is set to one and an "input error" interrupt is generated. This register is read only.

4.5 Interrupts and Exceptions

The processor has a powerful vectored interrupt facility and generates several kinds of interrupts: program exceptions, software facilities, I/O signals and hardware errors. The program exceptions include integer overflow and zero divide, the floating point exceptions, stack overflow and address and reserved opcode faults. The software facility interrupts are trap, breakpoint and trace. The Input Ready, Output Ready, Input Parity and Input Overrun interrupts are the I/O signals. And the hardware errors are Corrected and Uncorrectable memory errors and Processor Self Test errors.

All interrupts (including the TRAP and breakpoint (BKPT) instructions) have the same convention. There is an unsigned number associated with the new interrupt (the argument of the trap instruction) that is multiplied by eight to give the absolute location in low memory of the interrupt vector. Each vector is eight bytes; the first four bytes contain the absolute address vector (VA) of the interrupt handing routine and the next four bytes are a new Program Status (NPS) value. When an interrupt is generated the processor pushes the Program Counter (PC) and the Program Status (PS) on the stack, sets the Program Status register to NPS and the Program Counter register to VA. If the interrupt is signaling a program exception (interrupts 3 through 12, see below) instead of saving the PC, the processor pushes the address of the offending instruction ("previous PC") on the stack so that the exception handler can decode the instruction. One reason decoding may be necessary is because the IEEE Floating Point Standard requires the ability to construct a result, store it where the instruction would have and then continue the computation. When the interrupt handler is finished it executes a Return from Interrupt (REI) instruction that pops the old PS and PC values off the stack and into their respective registers. A TRAP instruction with the appropriate number as its argument can simulate any interrupt (except that the PC is always pushed on the stack with TRAP regardless of its argument).

All interrupts are defined below. The number at the left is the interrupt number.

4.5.1 Interrupt Definitions

0) RESERVED

1) T: Trace-at the end of the current instruction interrupt 1 is generated in order to facilitate single step debugging.

2) BK: Breakpoint—when the one byte instruction BKPT is executed an interrupt 2 is generated: this is used for breakpoint debugging.

3) IV: Integer Overflow—when the result is too large in magnitude for the destination format.
add/substract: when the carry does not equal the sign bit
multiply: when the high order half of the product is not equal to the sign extension of the result
divide: when the most negative number is divided by −1

The interrupt can be disabled but in either case the result stored in the destination is the low order part of the result (in divide it is the divident).

4) IZ: Integer Zero Divide—when the denomintor of an integer divide or remainder is zero this interrupt is generated and no result is stored.

5) IX: Inexact Result—when a real result must be rounded the flag is set in the PS and if not disabled the interrupt is generated. In either case the correctly rounded result is first stored at the destination. Inexact Result may occur at the same time as either Overflow or Underflow. If this occurs the Inexact flag is set but the interrupt is suppressed and either the Overflow or the Underflow interrupt is generated.

6) Underflow—if a real result is not zero but is smaller in magnitude then the format's smallest normalized number then the UFflagisset in the PS and an interrupt generated. However, an encoded result (the offset is added to the exponent) is first stored at the destination.

7) FZ: Floating Zero Divide—when division of a nonzero real number by zero is attempted no result is stored. the FZ flag is set in the PS and an interrupt is generated.

8) OF: Overflow—if a real result is larger in magnitude than the largest normalized number then an encoded result (the offset is subtracted from the exponent) is stored and an interrupt is generated.

9) IN: Invalid Operation—the conditions that cause the IN flag in the PS to be set and interrupt 9 to be generated are:
 a) if a real operand is a Nan (except for branch on unsigned comparison or branch on equal or unequal)
 b) if both operands of a floating point divide are zero
 c) if the "divisor" in a floating point remainder operation is zero
 d) if the operand of square root is negative 10) UC: Unimplemented Opcode—when one of the reserved opcodes is used this interrupt is generated.

11) AE: Address Error—if an address is larger than $2^{**}17-1$ then interrupt 11 is signaled.

12) SO: Stack Overflow—when the stack pointer becomes less than 2048 this interrupt is generated. This keeps the stack from growing into the interrupt vector area in low memory.

13) TO: Time Out—when the Time Out Register is decremented to zero interrupt 13 is generated.

14) CE: Corrected Memory (ECC) Error—if a memory error is corrected during the execution of an instruction, at the end of the instruction this interrupt is generated. This is useful for logging memory errors.

15) UE: Uncorrectable Memory (ECC) Error—if a memory error occurs that cannot be corrected this interrupt is generated. Since this could occur at many points during the execution of an instruction, the state of the machine is undefined after this error. If this error recurs before the previous one is handled then the internal ERROR flag is set and the ERROR pin is set high. This is to warn of a potentially fatal condition.

16) OE: Operand Error—if a literal or immediate is used as the destination of a result or any mode other than Register Direct is used with a Repeat instruction then interrupt 16 is generated.

17-31) RESERVED 32-42) OR: Output Ready—when the count register of an output port has gone to zero and the channel is ready to send another message, the corresponding bit in the OR register is set and an interrupt generated if it is not suppressed either in the ps (Program Status) register or the OE (Output Enable) register.

43-62) RESERVED

63) ORH: Output Ready Host—this is the interrupt that is used with the output port that is normally used for communicating with the host (i.e. the various interface boards).

64-74) IR: Input Ready—these are the interrupts used to signal that an input channel is ready to receive a message.

75-94) RESERVED

95) IRH: Input Ready Host—this interrupt is used with the input channel that is usually used for communicating with the host.

96-106) IE: Input Error—if either a parity or an overrun error is detected while receiving a message, after the completion the appropriate one of these interrupts is generated.

107-126) RESERVED

127) IEH: Input Error Host—if an error is detected on the channel used for host communication this interrupt is generated.

4.5.2 Error Flag

There is an internal Error flag that is tied to the Error pin that indicates that the processor is in an unknown, inconsistent or failure state. On resetting the processor the Error flag is initialized to one and if the on-chip initialization sequence and subsequent diagnostic software run successfully it can be cleared by software (EROF). It is also set by consecutive unserviced Uncorrectable ECC errors. The Error flag and pin can also be set and reset by the ERON and EROF instructions respectively.

4.6 Communication

There are 22 unidirectional direct memory access (DMA) I/O channels on each processor, 11 for input and 11 for output. The Input ports are numbered 0,1, . . .,9 and 31; while the Output ports are numbers 32,33, . . .,41 and 63. The input and output ports are normally used in pairs to form 11 full duplex I/O channels are shown below:

{(0,32),(1,33), . . . ,(9,41),(31,63)}

Ports 31 and 63 are normally used for communicating with the Host (on any System Control Board). Ports 0 to 9 and 32 to 41 are used to build the hypercube interconnection network. Numbers 10 to 30 and 42 to 62 are reserved for future expansion.

Each of the I/O channels has an address register, a count register, a "ready" flag and an interrupt enable flag. In addition each input channel has a parity error flag, an overrun error flag and a "DMA pending" flag. Besides the enable for each channel there are two global enable flags in the Program Status (PS) register. The II flag disables all input interrupts (including errors) even if the corresponding channel flag is enabled and the IO flag disables all output interrupts.

In order to send a message from a memory buffer on a given output channel one first either checks its ready flag or enables its interrupt and waits for a "ready" interrupt. As soon as the channel indicates that it is ready (idle), the address register is set to point to the first (low) byte of the message, which must begin on an even boundary, by executing a LPTR (Load Pointer) instruction. The source operand of this instruction is the address of the message buffer and the destination operand is an integer whose value determines which of the channel registers is to be loaded:

0.1, ... ,9,31 are input channels (10,11, ... 30 are reserved)

32,33, ... , 41,53 are output channels (42,43, ... , 62 are reserved).

In order to start the automatic message output, the corresponding count register must be set to the number of bytes in the message. (In this version of the processor the low order bit is forced to zero in both the address and the count registers; thus the message buffer must start on an even byte boundary and be an even number of bytes long. No error is signaled if a program violates this requirement.) This is done by executing a LCNT (Load Count) instruction. The destination operand indicates the register to be loaded as explained above for the LPTR instruction and the source operand is the count value (an unsigned 32 bit integer). The LCNT instruction also resets the parity and overrun error flags when setting up an input port. The message transmission is automatic and as data is sent the address register is incremented and the count is decremented by the number of bytes transferred. When the count becomes zero the output stops, the ready flat is set and if enabled the ready interrupt is generated.

In addition to sending a message on a single channel, the processor has a powerful BROADCAST facility. In order to send a message over several channels at once, one must first ensure that the desired output channels are ready. Then a BPTR (Broadcast Pointer) instruction is executed. Its source operand is the address of the message as in LPTR but its destination operand is a 32 bit mask. Every bit position that is set to one will cause the corresponding output channel address register to be loaded. (Bit position 0 corresponds to output channel 32, position 1 to channel 33, etc.) The message broadcast is started by executing a BCNT (Broadcast Count) instruction whose destination operand is a mask as explained above for the BPTR instruction and whose source operand is an unsigned 32 bit integer equal to the number of bytes in the message. The major advantage of broadcasting is that the sending processor only has to access each transmitted datum once thus reducing the memory bandwidth used by the DMA facility. The processor can only handle one broadcast at a time so if a subsequent broadcast is attempted, even on different channels, before the current one is finished the results will be undefined.

In order for a message to be transmitted successfully the corresponding input channel of the receiving processor must first be set up with an address to an input buffer and the same count as the output channel. One way this can be accomplished is by using a software protocol that always sends a single halfword as the length of the desired message and waiting for the receiving processor to respond with a halfword code that indicates "ok to send message". This protocol will work because the last halfword that is sent remains available for DMA even if the receiving processor's input channel is uninitialized (count = zero). The presence of this data in the input channel is indicated by the corresponding bit in the INPUT DATA PENDING register (which can be tested by software) being set. Thus as soon as the count register is set to one, the halfword (either the length or on "ok to send") is stored in memory.

Before attempting to DMA the data to memory that is in an uninitialized input port the error (Overrun and Parity) flags must first be checked or they will be lost. This is because the Load Count instruction clears the error flags.

The processor recognizes two types of errors in communication. Each halfword is sent with a parity bit and on reception a parity check is made. Also if a halfword is received into a DMA channel before the precious one is stored in memory an input overrun error is detected. (Overrun can occur when the input count goes to zero before the output count—a software error, or when too many messages are being sent to the processor at the same time.) If either type of error occurs the corresponding flat is set and when the input count reaches zero instead of "ready", an "input error" interrupt is generated (if II is set). A software error that is not detected by the processor occurs when the output count is smaller than the input. In that case, after the message is sent the input channel will simply hang. This condition can be avoided by correct software or by setting up timeout conditions using the Timeout Register.

4.7 Instruction Formats and Addressing Modes

The processor is designed to be as simple and symmetric as possible. Most instructions work on all supported data types; the General registers are interchangeable in all operations; all address modes work with all instructions including Branches. An instruction consists of an operation code (opcode) followed by zero, one or two address fields. The representation of a two address instruction in memory is illustrated below:

| OPCODE | REFERENCE 1 | REFERENCE 2 |
|---|---|---| low address                          high address

In the physical representation shown above REFERENCE 2 is both one of the operands and the result. For example, if the OPCODE indicated Subtract then the operation performed would be:

REFERENCE 1—REFERENCE 2→REFERENCE 2

The assembly language operand ordering convention is the same. Thus, if a Subtract operation is written

SUBW A,B the operation performed is (A − B)→B

The order of address evaluation is from the low address so that the address for A is evaluated before the address for B.

4.7.1 Opcode Formats

All opcodes are one byte long and each operation type group has at least one reserved code for future expansion. The byte is divided into two fields of four bits each. The first field, TP, specifies the length and type of the operands (e.g. 8 bit integer, 32 bit real) and the second field, OP, determines the operation and number of operands (e.g. Add—2 operands, Call—one operand). Each of the operations is described in detail in chapter 4.8 but most are evident from their name in the opcode table below. The first field is represented horizontally with the even values above the odd values. The second field is displayed vertically and is repeated twice.

| OPERATIONS | OPERANDS. (#, TYPE) | COLUMNS |
|---|---|---|
| Special | 0 | 11 |
| Special | 1. Byte or Halfword | 14 |
| Branch | 1. Word (Address) | 15 |
| Conversion | 2. Mixed | 9 |
| Byte | 2. Byte | 0,1 |
| Halfword | 2. Halfword | 2,3 |
| Word | 2. Word | 4,5 |
| Reserved for Double word | *,* | 6,7 |
| Real | 2. Real | 8 |
| Longreal | 2. Longreal | 10 |
| Reserved for Tempreal | *,* | 12 |
| Reserved (Arbitrary) | *,* | 13 |

4.7.2 Addressing Modes

If an instruction has operands, the address fields always have at least one byte. The first byte, called the Mode Specifier, encodes the addressing mode and for most of the instructions the first four bits specify the general register to be used in the address evaluation while the next four bits indicate the mode. The format is as shown below:

Opcode: | OP | TP |
         7        0

OPCODE MAP

TP

| OP \ TP | B 0 | B 2 | H 4 | W 6 | R 8 | L A | C | E |
|---|---|---|---|---|---|---|---|---|
| 0 | MOVB | MOVH | MOVW | RES | MOVR | MOVL | RES | RES |
| 1 | NEGB | NEGH | NEGW | RES | NEGR | NEGL | RES | REP |
| 2 | SBRB | SBRH | SBRW | RES | SBRR | SBRL | RES | REPZ |
| 3 | CMPB | CMPH | CMPW | RES | CMPR | CMPL | RES | REPNZ |
| 4 | ADDB | ADDH | ADDW | RES | ADDR | ADDL | RES | TRAP |
| 5 | ADCB | ADCH | ADCW | RES | SQTR | SQTL | RES | RES |
| 6 | SUBB | SUBH | SUBW | RES | SUBR | SUBL | RES | RES |
| 7 | SBBB | SBBH | SBBW | RES | SGNR | SGNL | RES | RES |
| 8 | MULB | MULH | MULW | RES | MULR | MULL | RES | RES |
| 9 | DVRB | DVRH | DVRW | RES | DVRR | DVRL | RES | RES |
| A | REMB | REMH | REMW | RES | REMR | REML | RES | RES |
| B | DIVB | DIVH | DIVW | RES | DIVR | DIVL | RES | RES |
| C | BITB | BITH | BITW | RES | RES | RES | RES | RES |
| D | RES | RES | RES | RES | RES | RES | RES | RES |
| E | RES | RES | RES | RES | RES | RES | RES | RES |
| F | RES | RES | RES | RES | ESC | ESC | ESC | RES |

| OP \ TP | 1 | 3 | 5 | - | 9 | B | D | F |
|---|---|---|---|---|---|---|---|---|
| 0 | SFTB | SFTH | SFTW | RES | CVBR | NOP | RES | BG |
| 1 | SFAB | SFAH | SFAW | RES | CVHR | CLC | RES | BLE |
| 2 | ROTB | ROTH | ROTW | RES | CVWR | STC | RES | BGU |
| 3 | FFOB | FFOH | FFOW | RES | CVLR | CMC | RES | BLEU |
| 4 | ANDB | ANDH | ANDW | RES | CVBL | ERON | RES | BGE |
| 5 | ORB | ORH | ORW | RES | CVHL | EROF | RES | BL |
| 6 | XORB | XORH | XORW | RES | CVWL | BKPT | RES | BGEU |
| 7 | NOTB | NOTH | NOTW | RES | CVRL | RSET | RES | BLU |
| 8 | ADCD | RES | LDPR | RES | CVBW | EI | RES | BNE |
| 9 | SBBD | RES | STPR | RES | CVHW | DI | RES | BE |
| A | RES | RES | LCNT | RES | CVWB | RES | RES | BNV |
| B | RES | RES | LPTR | RES | CVWH | RES | RES | BV |
| C | RES | RES | BCNT | RES | CVRW | RETI | RES | CALL |
| D | RES | RES | BPTR | RES | CVLW | WAIT | RES | JMP |
| E | RES | RES | MOVA | RES | RES | RET | RES | RETP |
| F | ESC | ESC | ESC | ESC | ESC | ESC | ESC | ESC |

The Opcode Map illustrates a number of symmetries that are explained in the table below.

MODE SPECIFIER: | MD | REG |

The modes are listed below with their encodings and mnemonics.

Addressing Mode Table

| Mode Name | Encoding | | Mnemonic |
|---|---|---|---|
| Literal | 0,1,2,3 | literal | #n |
| Register Direct | C | Rn | Rn |
| Register Indirect | 4 | Rn | (Rn) |
| Autodecrement | D | Rn | −(Rn) |
| Autoincrement | 6 | Rn | (Rn)− |

-continued

Addressing Mode Table

| Mode Name | Encoding | | Mnemonic |
|---|---|---|---|
| Autoincrement Indirect | 7 | Rn | @(Rn)+ |
| Autoskip | 5 | Rn | (Rn)+ + |
| Offset - Register Indirect | | | |
| Byte Offset | 8 | Rn | A(Rn) |
| Halfword Offset | 9 | Rn | A(Rn) |
| Word Offset | A | Rn | A(Rn) |
| (Word Offset - Register)Indirect | B | Rn | @A(Rn) |
| RESERVED | E | | |
| Special Modes, no General Register | | | |
| Offset - PC | | | |
| Byte Offset - PC | F | 0 | S(PC) |
| Halfword Offset - PC | F | 1 | A(PC) |
| Word Offset - PC | F | 2 | S(PC) |
| (Word Offset - PC)Indirect | F | 3 | @A(PC) |
| Offset - SP | | | |
| Byte Offset - SP | F | 4 | S(SP) |
| Halfword Offset - SP | F | 5 | S(SP) |
| Word Offset - SP | F | 6 | A(SP) |
| (Word Offset - SP)Indirect | F | 7 | @A(SP) |
| Direct | | | |
| Byte Offset | F | 8 | A |
| Halfword Offset | F | 9 | A |
| Word Offset | F | A | A |
| (Word)Indirect | F | B | @A |
| Push, Pop | F | C | STK |
| Immediate | F | D | #n |
| RESERVED | F | E | |
| ESCAPE | F | F | |

The assembler will chose the shortest reference form possible. The addressing modes are described in detail below. First note the following:

1) addresses of multibyte operands refer to the low order byte of the operand.

2) offsets are sign-extended to 32 bits before being used in effective address calculation 3) for Branch and Call instructions in Literal or Immediate mode the value is added to the PC; for Register Direct mode the register contents are added to the PC; for all other modes the address of the operand simply replaces the PC.

LITERAL    00xxxxxx    (Mode=0,1,2,3)

Since the encoding for literal includes modes 0,1,2,3, there are six bits for the definition of the literal value. When an integer operand is expected the six bits are treated as a standard 2's complement integer between −32 and +31. And when the instruction indicates that the literal is a real value, the integer value is converted implicitly (without round off error) to the equivalent floating point value.

If a literal is used in a Branch, Call or Move Address instruction, the literal is added to the PC (i.e. a relative Branch or Call results). If a literal (or immediate) is used as a destination an Operand Error is signaled.

Register Direct  | C Rn |

In this mode the operand is contained in the indicated register. The value is interpreted according to the instruction: real for floating point instructions, integer for integer operations and bit string for logical instructions. If a longreal operand is expected the low order part is in Rn and the high order part in Rn+1. When a byte or halfword is moved to a register it is sign-extended.

Register Indirect  | 4 Rn |

The indicated register contains the address of the low order byte of the operand.

Autodecrement  | D Rn |

The indicated register is decremented by the length in bytes of the operand and then the contents becomes the address of the operand. This mode can be used to build a software stack or to access consecutive array elements.

Autoincrement  | 6 Rn |

The data addressed by Rn is first accessed and then Rn is incremented by the number of bytes in the operand. This mode is used to step through arrays and, with Autodecrement, to build software stacks.

Autoincrement Indirect  | 7 Rn |

The register Rn points to a 32 bit value that is the address of the operand. After the operand is accessed Rn is incremented by four, since addresses are four bytes long.

Autoskip  | 5 Rn |

After the operand addressed by the contents of Rn is fetched, the value in Rn+1 is added to Rn. (If n=15 then n+1=0.) This mode allows for automatically skipping through an array by an amount (in Rn+1) that can be calculated during program execution. For example if a matrix is stored by columns this mode permits automatic references to successive row elements.

Offset + Register  | 8,9,A Rn |  A=byte, B=halfword, C=word

This mode calculates the address of the operand by adding the value in Rn to the offset which is a signed integer whose length is determined by the mode setting (A=byte, B=halfword, C=word). The offset immediately follows the mode indicator and is sign- extended for the effective address calculation. These modes are also available for the PC and SP in place of a general register (see below).

(Offset + Register) Indirect  | B Rn |  Word Offset

The contents of Rn are added to the offset (in this mode only a 32 bit offset is allowed) and the 32 bit value at that address is the address of the operand. This mode is also available with either PC or SP instead of a general register (see below).

Offset - PC | F 0,1,2 | 0 = byte, 1 = halfword, 2 = word

The address is calculated by adding the address of the instruction (the value of PC before the current instruction is executed) to the sign-extended value of the offset which can be a byte, halfword or word. This mode is used to access operands relative to PC and with branch instructions to jump relative to PC. (The Literal mode with branch instructions also is relative to PC.) This permits compiling position independent code.

(Offset - PC) Indirect | F 3 | Word Offset

The address of the instruction (the contents of PC) is added to the word offset and the 32 bit value at that address is the address to the operand.

Offset - SP | F 4,5,6 | 4 = byte, 5 = halfword, 6 = word

The address is calculated by adding the SP and the sign extended offset. The offset can be a byte, halfword, or word. This mode is often used to access local variables in an activation record on the stack.

(Offset - SP) Indirect | F 7 | Word Offset

The SP and the word offset are added together and the 32 bit value at that address is the address of the operand.

Direct | F 8,9,A | 8 = byte, 9 = halfword, A = word

The address is the unsigned value of the offset (byte, halfword or word depending on the mode) that follows the mode specifier.

Indirect | F B | Word Offset

The word that follows the mode specifier points to a 32 bit value that is the address of the operand.

Immediate | F C | Value

In this mode the operand follows the mode specifier for arithmetic and logical operators the length and type of the value is indicated by the instruction. Thus, ADDB (Add Byte) will assume an 8 bit signed integer while MULL (Multiply Longreal) will expect to find a 64 bit floating point operand as the "value". An immediate operand used with a branch or move address instruction causes an invalid operand fault. If this mode is used as the destination (the second address in a two address instruction) an Operand error is signaled.

Push Pop | F D |

When this mode is the first specifier it takes the operand from the top of the stack and the increments ("pops") SP by the length of the operand. So the instruction ADDR SP,mem will use a 32 bit real value from the top of the stack as the first operand, pop the stack and store the result as "mem". Similarly a MOVH SP,mem will move the halfword on the top of the stack to "mem" and pop the stack. When used as the second specifier, the second operand and the result come from the stack top. Thus with arithmetic and logical instructions there is no change in SP. However, MOVR mem,SP will decrement SP by four (the length of the operand) and move the real value at "mem" to the top of the stack. When this mode is used in both specifiers then the classical stack operations result; both operands are popped off the stack, the operation performed and the result is pushed back on the stack. In the case of Divide and Subtract the operand at the top of the stack is the dividend and subtrahend respectively. If both specifiers are SP for a Move instruction, only the flags are affected.

4.8 Instruction Set

4.8.1 Instruction Set Details

The instructions are listed alphabetically (by mnemonic) and are grouped according to operation (e.g. all the Ad instructions are grouped together).

The memory format of all of the instructions is shown below. The source and destination specifiers are optional. While most instructions have two addresses, there are a few with zero or one address.

| OPCODE REFERENCE 1 (src) REFERENCE 2 (dsrc, des) | low address in memory

The source (src) address is always evaluated first and all addressing operations (e.g. autodecrement) are performed before the destination (dsrc, des) address is evaluated. (In the above notation "dsrc" refers to the operand before the operation is performed and "des" refers to the contents of that address after the operation.) This does not apply to stack addressing modes where the SP at the beginning of the instruction is always used. Any addressing mode that refers to the PC or (SP) uses the value of the PC (opr SP) at the beginning of the instruction. The source operand is never changed except when using the stack addressing mode. If an instruction with byte or halfword operands references a general register, the high order part of the data is ignored if it is a source and if it is a destination the high order part is sign extended.

The unique exception conditions for each instruction are included in the information below. There are a set of exceptions that are independent of the particular instruction:

(1) Memory error (ECC or Correctable ECC)
(2) Timeout
(3) Operand error (reserved addressing mode, literal or immediates the destination)
(4) Address error (address value greater than 2**17−1)
(5) Stack overflow The result stored at the destination of a floating point instruction is described below. The result is stored before the exception is signaled by an interrupt (except for Zero Divide and Invalid).

(1) Inexact: the correctly rounded result
(2) Underflow: the correctly rounded fraction but with the exponent increased by the bias
(3) Zero Divide: no result is stored; the destination is not changed
(4) Overflow: the correctly rounded fraction but with the exponent decreased by the bias
(5) Invalid: no result is stored; the destination is not changed.

It is important to remember that the Negative (N) Flag is always set according to the sign of the correct result. Thus on integer overflow, the destination may appear positive even when N indicates negative.

4.8.2 Instruction Definitions

ADC - ADD WITH CARRY

| Opcodes | 50 | ADCB | ADd with Carry Byte |
|---|---|---|---|
| | 52 | ADCH | ADd with Carry Halfword |
| | 54 | ADCW | ADd with Carry Word |

Assembler
Syntax: ADC{B.H.W} src,des
Operation: src + dsrc + Carry → des
Flags: C - carry from most significant bit
N - des < 0
Z - des = 0
V - Integer overflow
U - 0
Description: The Carry and source values are added to the destination and the result replaces the destination
Exceptions: Integer overflow

ADCD - ADD WITH CARRY DECIMAL

| Opcode | 81 | ADCD | ADd with Carry Decimal |
|---|---|---|---|

Assembler
Syntax: ADCD src,des
Operation: src + dsrc + Carry → des
Flags: C - Carry out of high order digit
N ← 0
Z ← des = 0
V ← 0
U ← 0
Description: The Carry and source value (treated as a two decimal value) are added to the destination (also considered as a two decimal value) and the result replaces the destination. No check for invalid BCD encoding is made.
Exceptions: none

ADD - ADD

| Opcodes | 40 | ADDB | ADD Byte |
|---|---|---|---|
| | 42 | ADDH | ADD Halfword |
| | 44 | ADDW | ADD Word |
| | 48 | ADDR | ADD Real |
| | 4A | ADDL | ADD Longreal |

Assembler
Syntax: ADD{B.H.W.R.L} src,des
Operation: src + dsrc → des
Flags: (Integer Operations: ADDB,ADDH,ADDW)
C - carry from most significant bit
N - des < 0
Z - des = 0
V - Integer overflow
U - 0
Flags: (Floating Point Operations: ADDR,ADDL)
C - des < 0
N - des < 0
Z - des = 0
V - 0
U - 0
IX - des rounded
UF - des underflowed
FZ ← 0
OF - des overflowed
IN - dsrc or src = Nan
Description: The source is added to the destination and the result is stored at the address of the destination.
Exceptions: Integer overflow, Inexact, Underflow, Overflow, Invalid

AND - AND

| Opcodes: | 41 | ANDB | AND Byte |
|---|---|---|---|
| | 43 | ANDH | AND Halfword |
| | 45 | ANDW | AND Word |

Assembler
Syntax: AND{B.H.W} src,des
Operation: src AND dsrc → des
Flags: C - C
N - des < 0
Z - des = 0
V - 0
U - 0
Description: The destination operand is anded with the source and the result is stored at the destination address.
Exceptions: none

B - Branch

| Opcodes | DF | JMP | Unconditional | JuMP unconditional |
|---|---|---|---|---|
| | BF | BV | V = 1 | Branch on oVerflow |
| | AF | BNV | V = 0 | Branch on Not oVerflow |
| | 9F | BE | Z = 1 | Branch on Equal |
| | 8F | BNE | Z = 0 | Branch on Not Equal |
| | 0F | BG | (N or Z) = 0 | Branch on Greater |
| | 4F | BGE | N = 0 | Branch on Greater or Equal |
| | 5F | BL | N = 1 | Branch on Less |
| | 1F | BLE | (N or Z) = 1 | Branch on Less or Equal |
| | 2F | BGU | (C or Z) = 0 or U = 1 | Branch on Greater Unsigned |
| | 6F | BGEU | C = 0 or U = 1 | Branch on Greater or Equal Unsigned |
| | 7F | BLU | C = 1 or U = 1 | Branch on Less Unsigned |
| | 3F | BLEU | (C or Z) = 1 or U = 1 | Branch on Less or Equal Unsigned |

Assembler
Syntax: JMP src
B{V,NV,E,NE,GU,GE,L,LE,G,GEU,LU,LEU} src
Operation: If Condition is True then
Literal or Immmediate Mode: PC ← PC + src
Register Direct mode: PC ← PC - content
(reg)
Other Modes: PC ← address of (src)
Flags: No flags are changed except IN (INvalid exception). IN is set only when U = 1 on BG, BGE, BL, BLE. The Repeat Mode (REP) is reset (REP ← 00) after decrementing the counter and checking the condition (see below).
Description: The Branch instructions are relative in the literal immediate and register direct modes and use the value of the PC at the beginning of the instruction. In all other modes the address of the source operand replaces the PC. The Invalid exception results when comparison accesses at least one Nan and a signed branch is performed on the result. The unsigned branches should be used for the predicates defined in the IEEE Floating Point Standard that must not fault. The Repeat Mode is reset after decrementing the counter and testing the termination condition so that if a REPeat instruction precedes a branch they act -continued Exceptions: Invalid (BG,BGE,BL,BLE when U = 1)
Illegal Address (Immediate mode)

BCNT - BROADCAST COUNT
Opcode: C5 BCNT Broadcast CouNT
Assembler
Syntax: BCNT src,des
Operation: src → des MASK (All Output Count Register #'s)
Flags: no changes
Description: The Output Count registers whose numbers correspond to bit positions in des that are set to one are loaded with the src value. The Output Count registers are numbered 32,33...41,63 so the bit positions in des are understood to be offset by 32. Both src and des are Word values.
Exceptions: none

BIT - BIT TEST
Opcodes:
 61 BITB BIT test Byte
 63 BITH BIT test Halfword
 65 BITW BIT test Word
Assembler
Syntax: BIT{B,H,W} src,dsrc
Operation: src AND dsrc
Flags: C - C
 N - (src AND dsrc) < 0
 Z - (src AND dsrc) = 0
 V - 0
 U - 0
Description: The Z Flag is set to 0 if all the bits of src that are masked by dsrc are 0. Neither src nor dsrc is changed.
Exceptions: none

BKPT - BREAKPOINT
Opcode: 6B BKPT BreaKPoinT
Assembler
Syntax: BKPT
Operation: generate interrupt 2
 stack - PS
 stack - PC
 PC - Word at location 16
 PS - Word at location 20
Flags: all flags set according to the new PS
Description: This one byte instruction is used by a debugger to set breakpoints in a user's program.
Exceptions: none

BPTR - BROADCAST POINTER
Opcode: D5 BPTR Broadcast PoinTeR
Assembler
Syntax: BPTR src,des
Operation: src → des MASK (All Output Register #'s)
Flags: no changes
Description: The Output Registers whose numbers correspond with the bit positions in des that are set are loaded with the src. This instruction sets up a group of Output Pointer registers to address a memory area containing a message to be broadcast. The Pointer registers should be set up before the Count registers (BCNT) are loaded. Both src and des are Word values.
Exceptions: none

CALL - CALL
Opcode: CF CALL CALL
Assembler
Syntax: CALL src
Operation: Literal or Immediate Mode: stack ← PC
 PC ← PC + src
 Register Direct Mode: stack ← PC
 PC ← PC + content (reg)
 Other Modes: stack ← PC
 PC ← address of (src)
Flags: no changes except REP ← 00 (see below)
Description: The current value of the Program Counter (PC) is pushed on the stack and by loading the PC with a new value a branch to a subroutine is taken. If the CALL is preceded by a REPEAT instruction the counter is decremented and the termination condition is checked. The Repeat Mode is reset (REP ← 00) and if termination is not reached then the return address that is pushed on the stack points to the REPEAT instruction. If termination is reached the CALL instruction is skipped. This enables the processor to execute multiple CALLs. If there is no preceding REPEAT then the saved return address points to the beginning of the instruction following the CALL. If the addressing mode is Literal, Immediate or Register Direct the call is relative and uses the value of PC at the beginning of the CALL instruction.
Exceptions: Illegal Address (Immediate mode)

CLC - CLEAR CARRY
Opcode: 1B CLC CLear Carry
Assembler
Syntax: CLC
Operation: C ← 0
Flags: C ← 0
 no other changes
Description: The Carry Flag is set to zero.
Exceptions: none

CMC - COMPLEMENT CARRY
Opcode: 3B CMC CoMplement Carry
Assembler
Syntax: CMC
Operation: C ← not(C)
Flags: C ← not(C)
 no other changes
Description: The Carry Flag is reversed.
Exceptions: none

CMP - COMPARE
Opcodes:
 30 CMPB CoMPare Byte
 32 CMPH CoMPare Halfword
 34 CMPW CoMPare Word
 38 CMPR CoMPare Real
 3A CMPL CoMPare Longreal
Assembler
Syntax: CMP{B,H,W,R,L} src,dsrc
Operation: src - dsrc → tem
Flags: (Integer Operations: CMPB,CMPH,CMPW)
 C ← src < (unsigned) dsrc
 N ← tem < 0
 Z ← tem = 0
 V ← 0
 U ← 0
Flags: (Floating Point Operations: CMPR,CMPL)
 C ← tem < 0
 N ← tem < 0
 Z ← tem = 0
 V ← 0
 U ← src or dsrc = Nan
 IX ← 0
 UF ← 0
 FZ ← 0
 OF ← 0
 IN ← 0
Description: The value src is compared to dsrc and the appropriate flags are set for subsequent conditional branching. Neither src nor dsrc is changed. The Carry flag is set by the Floating Point comparisons so that the Unsigned branches can be used for the Unordered predicates defined in the IEEE Floating Point Standard. Also if either src or dsrc is Nan the appropriate Invalid exception is signaled by the branch instruction.
Exceptions: none

CV - CONVERT
Opcodes:
 09 CVBR ConVert Byte to Real
 19 CVHR ConVert Halfword to Real
 39 CVLR ConVert Longreal to Real
 49 CVBL ConVert Byte to Longreal
 59 CVHL ConVert Halfword to Longreal
 69 CVWL ConVert Word to Longreal
 79 CVRL ConVert Real to Longreal
 89 CVBW ConVert Byte to Word
 99 CVHW ConVert Halfword to Word
 A9 CVWB ConVert Word to Byte
 B9 CVWH ConVert Word to Halfword
Assembler
Syntax: CV{BW,BR,BL,HW,HR,HL,WL,WB,WH,RL,LR} src, des
Operation: CONVERT (src) → des Flags (All Operations)
    C - C (when des is INTEGER)
    C - des < 0 (when des is FLOATING POINT)
    N - des < 0
    Z - des = 0
    V - Integer overflow (when des is INTEGER)
    V - 0 (when des is FLOATING POINT)
    U - 0
    IX - des rounded
    UF - des underflowed
    FZ - 0
    OF - des overflowed
    IN - src = Nan Description: The source operand is converted to the type and length indicated by the destination specifier and stored at the address of the destination.

Exceptions: Integer overflow [CVWB,CVWH,CVRW,CVLW], Inexact [CVLR]. Underflow [CVLR]. Overflow [CVLR]. Invalid [CVRL,CVLR]

DI - DISABLE INTERRUPTS
Opcode: 9B DI     Disable Interrupts
Assembler
Syntax: DI
Operation: 0 → IE (flag in Program Status register)
Flags: IE - 0
    no other changes
Description: The Interrupt Enable (IE) flag in the Program Status register is set to zero. This disables all interrupts that can be disabled.
Exceptions: none

DIV - DIVIDE
Opcodes:
    A0  DIVB  DIVide Byte
    A2  DIVH  DIVide Halfword
    A4  DIVW  DIVide Word
    A8  DIVR  DIVide Real
    AA  DIVL  DIVide Longreal
Assembler
Syntax: DIV{B,H,W,R,L} src,des
Operation: dsrc / src → des
Flags: (Integer Operations: DIVB,DIVH,DIVW)
    C - C
    N - des < 0
    Z - des = 0
    V - Integer overflow
    U - 0
Flags: (Floating Point Operations: DIVR,DIVL)
    C - des < 0
    N - des < 0
    Z - des = 0
    V - 0
    U - 0
    IX - des rounded
    UF - des underflowed
    FZ - (src = 0 and des <> 0)
    OF - des overflowed
    IN - (src of dsrc = Nan) or (src and dsrc = 0)
Description: The destination is divided by the source and the result is stored at the destination address.
Exceptions: Integer overflow (dsrc = largest negative value, src = -1). Integer Zero Divide, Inexact, Underflow, Floating Zero Divide, Overflow, Invalid

DVR - DIVIDE REVERSE
Opcodes:
    B0  DVRB  DIVide Reverse Byte
    B2  DVRH  DIVide Reverse Halfword
    B4  DVRW  DIVide Reverse Word
    B8  DVRR  DIVide Reverse Real
    BA  DVRL  DIVide Reverse Longreal
Assembler
Syntax: DVR{B,H,W,R,L} src,des
Operation: src / dsrc → des
Flags: (Integer Operations: DVRB,DVRH,DVRW)
    C ← C
    N ← des < 0
    Z ← des = 0
    V ← Integer overflow
    U ← 0
Flags: (Floating Point Operations: DVRR,DVRL)
    C ← des < 0
    N ← des < 0
    Z ← des = 0
    V - 0
    U - 0
    IX - des rounded
    UF - des underflowed
    FZ - (des = 0 and src <> 0)
    OF - des overflowed
    IN - (src or dsrc = Nan) or (src and dsrc = 0)
Description: The source operand is divided by the destination operand and the result is stored at the address of the destination.
Exceptions: Integer overflow (src = largest negative value, dsrc = -1). Integer Zero Divide, Inexact, Underflow, Floating Zero Divide, Overflow, Invalid

EI - ENABLE INTERRUPTS
Opcode: 8B EI     Enable Interrupts
Assembler
Syntax: EI
Operation: 1 → IE (Interrupt Enable flag in Program Status register)
Flags: IE ← 1
    no other changes
Description: The Interrupt Enable (IE) flag in the Program Status register is set to one. This enables all interrupts that have not been otherwise disabled.
Exceptions: none

ER - ERROR
Opcodes:
    4B  ERON  ERror ON
    5B  EROF  ERror OFf
Assembler
Syntax: ER{ON,OF}
Operation: ERROR pin ← 1 (ERON)
    ERROR pin ← 0 (EROF)
Flags: no changes
Description: Error on and off are used to set a pin level in order to indicate a potentially fatal condition (see 4.5).
Exceptions: none

FFO - FIND FIRST ONE
Opcodes:
    31  FFOB  Find First One Byte
    33  FFOH  Find First One Halfword
    35  FFOW  Find First One Word
Assembler
Syntax: FFO{B,H,W} src,des
Operation: location of first one (src) → des
Flags: C - C
    N - 0
    Z - src = 0
    V - 0
    U - 0
Description: If the source is zero the destination is set to 8 (FFOB), 16 (FFOH) or 32 (FFOW) and the Z Flag is set to one. Otherwise, Z is zero and the destination is set to the bit position of the first one bit in the source, scanning from the right (e.g. if the least significant bit is one the destination is set to zero). The destination is a Byte even though the source can be a Byte (FFOB), Halfword (FFOH) or Word (FFOW).
Exceptions: none

LCNT - LOAD COUNT
Opcode: A5 LCNT     Load CouNT
Assembler
Syntax: LCNT src,des
Operation: src → I/O Count Register #(des)
Flags: no changes
Description: The I/O Count Register designated by the destination is loaded with the source operand. The Input Registers are numbered 0,1,...,9,31 and the Output Registers are 32,33,...,41,63. The least significant bit of the Count Register is always zero but no error is signaled if an attempt is made to load an odd number. Also no error is signaled if des is greater than 63 but the result is undefined. The source operand is a Word and the destination is a Byte.
Exceptions: none

LDPR - LOAD PROCESSOR REGISTERS
Opcode: 85 LDPR     LoaD Processor Register
Assembler
Syntax: LDPR src,des -continued

| Operation | src → Processor Register #(des) |
|---|---|
| Flags | no changes |
| Description | The source value is loaded into the Processor Register designated by the destination. The Processor Registers are listed below. No operation is performed if a "read only" register is designated by des. The source is a Word and the destination operand is a Byte value indicating one of the Processor Registers |

| | P0 | SP | Stack Pointer |
|---|---|---|---|
| | P1 | PS | Program Status |
| | P2 | FR | Fault Register |
| | P3 | CR | Configuration Register |
| | P4 | PI | Processor I D |
| | P5 | OR | Output Ready (read only) |
| | P6 | IR | Input Ready (read only) |
| | P7 | OE | Output Enable |
| | P8 | IE | Input Enable |
| | P9 | IP | Input Pending (read only) |
| | P10 | PE | Parity Error (read only) |
| | P11 | IO | Input Overrun (read only) |

Exceptions: none

LPTR - LOAD POINTER

| Opcode | B5 | LPTR | Load PoinTeR |
|---|---|---|---|

Assembler
Syntax: LPTR src,des
Operation: src → I/O Address Register #(des)
Flags: no changes
Description: The I/O Address Register designated by the destination is loaded with the source operand. The Input Registers are numbered 0,1,...,9,31 and the Output Registers are 32,33,...,41,63. The least significant bit of the Address Register is always zero but no error is signaled if an attempt is made to load an odd address. Both operands are Words.
Exceptions: none

MOV - MOVE

| Opcodes: | 00 | MOVB | MOVe Byte |
|---|---|---|---|
| | 02 | MOVH | MOVe Halfword |
| | 04 | MOVW | MOVe Word |
| | 08 | MOVR | MOVe Real |
| | 0A | MOVL | MOVe Longreal |

Assembler
Syntax: MOV{B,H,W,R,L} src,des
Operation: src → des
Flags: no changes
Description: The source value is moved to the destination address
Exceptions: none

MOVA - MOVE ADDRESS

| Opcode: | E5 | MOVA | MOVe Address |
|---|---|---|---|

Assembler
Syntax: MOVA src,des
Operation: Literal or Immediate Mode: src + PC → des
Register Direct Mode: content (reg) + PC → des
Stack Mode: content (SP) → des
Other Modes: address of (src) → des
Flags: no changes
Description: The address specifier of the source operand is evaluated and stored at the destination location. If the addressing mode of the source is Literal, Immediate or Register Direct the PC is first added to the source value. The value of PC used is that at the beginning of the instruction. If the source addressing mode is Stack mode then the contents of the Stack Pointer are moved to the destination.
Exceptions: Illegal Address

MUL - MULTIPLY

| Opcodes: | 80 | MULB | MULtiply Byte |
|---|---|---|---|
| | 82 | MULH | MULtiply Halfword |
| | 84 | MULW | MULtiply Word |
| | 88 | MULR | MULtiply Real |
| | 8A | MULL | MULtiply Longreal |

Assembler
Syntax: MUL{B,H,W,R,L} src,des
Operation: src * dsrc → des
Flags: (Integer Operations: MULB,MULH,MULW)
C - C
N ← des < 0
Z ← des = 0

-continued

V - Integer overflow
U - 0

Flags: (Floating Point Operations: MULR,MULL)
C ← des < 0
N ← des < 0
Z ← des = 0
V - 0
U - 0
IX - des rounded
UF ← des underflowed
FZ ← 0
OF ← des overflowed
IN ← dsrc or src = Nan Description: The source and destination are multiplied and the result is stored at the address of the destination. Integer overflow occurs when the high order half of the product is not the sign extension of the low order half. This is true even when the operands are bytes or halfwords in registers.

Exceptions: Integer overflow, Inexact, Underflow, Overflow, Invalid

NEG - NEGATE

| Opcodes: | 10 | NEGB | NEGate Byte |
|---|---|---|---|
| | 12 | NEGH | NEGate Halfword |
| | 14 | NEGW | NEGate Word |
| | 18 | NEGR | NEGate Real |
| | 1A | NEGL | NEGate Longreal |

Assembler
Syntax: NEG{B,H,W,R,L} src,des
Operation: -(src) → des
Flags: (Integer Operations: NEGB,NEGH,NEGW)
C - borrow from most significant bit
N - des < 0
Z - des = 0
V - Integer overflow
U - 0

Flags: (Floating Point Operations: NEGR,NEGL)
C - des < 0
N - des < 0
Z - des = 0
V - 0
U - 0
IX - 0
UF - 0
FZ - 0
OF - 0
IN - src = Nan Description: The source operand is negated and the result is stored at the address of the destination.
Integer overflow occurs when the source is the largest negative number.
Exceptions: Integer overflow, Invalid

NOP - NO OPERATION

| Opcode | 0B | NOP | NO oPeration |
|---|---|---|---|

Assembler
Syntax: NOP
Operation: nothing
Flags: no changes
Description: This instruction does nothing.
Exceptions: none

NOT - NOT

| Opcodes: | 71 | NOTB | NOT Byte |
|---|---|---|---|
| | 73 | NOTH | NOT Halfword |
| | 75 | NOTW | NOT Word |

Assembler
Syntax: NOT{B,H,W} src,des
Operation: NOT(src) → des
Flags: C ← C
N ← des < 0
Z ← des = 0
V ← 0
U ← 0

Description: The source is complemented and the result is stored at the destination location.
Exceptions: none

OR - OR

| Opcodes: | 51 | ORB | OR Byte |
|---|---|---|---|
| | 53 | ORH | OR Halfword |
| | 55 | ORW | OR Word |

Assembler

| | -continued |
|---|---|
| Syntax | OR{B,H,W} src,des |
| Operation | src OR dsrc → des |
| Flags | C - C |
| | N - des < 0 |
| | Z - des = 0 |
| | V - 0 |
| | U - 0 |
| Description | The destination and source are "ored" together and the result is stored at the address of the destination |
| Exceptions | none |

REM - REMAINDER

| Opcodes | 90 | REMB | REMainder Byte |
|---|---|---|---|
| | 92 | REMH | REMainder Halfword |
| | 94 | REMW | REMainder Word |
| | 98 | REMR | REMainder Real |
| | 9A | REML | REMainder Longreal |

| Assembler Syntax | REM{B,H,W,R,L} src,des |
|---|---|
| Operation | dsrc REM src → des |
| Flags | (integer Operations REMB,REMH,REMW) |
| | C - C |
| | N - des < 0 |
| | Z - des = 0 |
| | V - 0 |
| | U - 0 |
| Flags | (Floating Point Operations REMR,REML) |
| | C - des < 0 |
| | N - des < 0 |
| | Z - abs(des) < abs(src) |
| | V - 0 |
| | U - 0 |
| | IX - 0 |
| | UF - des underflowed |
| | FZ - 0 |
| | OF - 0 |
| | IN - (dsrc or src = Nan) or (src = 0) |
| Description | The remainder of the destination divided by the source replaces the destination. The following point instruction is used for argument reduction and is always exact. However, it is only a partial remainder, the instruction must be repeated until Z becomes one (that is the reason for the unusual definition of the Z flag) |
| Exceptions | Integer Zero Divide, Underflow, Invalid |

REP - REPEAT

| Opcodes | 1E | REP | REPeat while Count not Zero |
|---|---|---|---|
| | 2E | REPZ | REPeat while Zero flag set |
| | 3E | REPNZ | REPeat while zero flag Not set |

| Assembler Syntax | REP{,Z,NZ} src |
|---|---|
| Operation | REP: PS(30,31) ← 01; Count = REG#(src) |
| | REPZ: PS(30,31) ← 10; Count = REG#(src); Z = 1 |
| | REPNZ: PS(30,31) ← 11; Count = REG#(src); Z = 0 |
| | for all PS(26,27,28,29) ← Count |
| | after repeat condition satisfied (on REPZ and RPNZ the Z flag is checked before the Count) |
| | PS(30,31) ← 00 |
| Flags | no changes |
| Description | A REPeat instruction may precede and other instruction. It causes bits 26 to 31 in the Program Status register to be set as shown above. The instruction following the repeat is reexecuted and the indicated count register (src must be a general register designator) is decremented until the repeat condition is satisfied. One of the conditions for all three instructions is that the count register becomes zero. But if the Z flag becomes zero (REPZ) or one (REPNZ) then the condition is also satisfied and the repeat is terminated by setting bits 30 and 31 in the PS register to 0. The Z flag is checked (for REPZ and RPNZ) before the Count register is decremented so that it will correctly count the number of times the following instruction is executed. If the Count is initially zero the following instruction is skipped. If a repeat is used with a branch instruction it has the effect of a "loop" instruction. If an addressing mode other than register direct is used, an address error is signaled. Also, if the designated Count register is used in the following instruction in an addressing mode or as an operand the results are undefined. |

As examples of the use of Repeat assume that R4 and R5 point to two vectors of real numbers, that R15 contains the length of the vectors and that R10 is zero. The

REP R15
    ADDR (R4)+,R10 will accumulate in R10 the summation of the vector elements pointed to by R4 and

L: MOVR (R4)+,R9
    MULR (R5)+,R9
    ADDR R9,R10
    REP R15
    JMP L will compute the inner product of the two vectors.

Exceptions: address

RET - RETURN

| Opcode | EB | RET | RETurn |
|---|---|---|---|

| Assembler Syntax | RET |
|---|---|
| Operation | PC - stack |
| Flags | no changes (the Repeat Mode is reset) |
| Description | The contents of the stack top (assumed to be a return address) are popped into the Program Counter |
| Exceptions | none |

RETI - RETURN FROM INTERRUPT

| Opcode | CB | RETI | RETurn from Interrupt |
|---|---|---|---|

| Assembler Syntax | RETI |
|---|---|
| Operation | PC - stack |
| | PS - stack |
| Flags | All flags set according to the new PS |
| Description | The top of stack (assumed to contain the PC in effect before the current interrupt) is popped into the PC register and then the next value on the stack is popped into the Program Status (PS) register. |
| Exceptions | none |

RETP - RETURN AND POP

| Opcode | EF | RETP | RETurn and Pop |
|---|---|---|---|

| Assembler Syntax | RETP src |
|---|---|
| Operation | PC - stack |
| | SP - SP - src |
| Flags | no changes (the Repeat Mode is reset) |
| Description | The top of stack is popped into the Program Counter and then the source (Word) value is added to the Stack Pointer in order to pop a set of local variables off the stack. |
| Exceptions | none |

ROT - ROTATE

| Opcodes | 21 | ROTB | ROTate Byte |
|---|---|---|---|
| | 23 | ROTH | ROTate Halfword |
| | 25 | ROTW | ROTate Word |

| Assembler Syntax | ROT{B,H,W} src,des |
|---|---|
| Operation | dsrc ROTATE BY src → des |
| Flags | C - if src = 0 then the least significant bit of des, otherwise the last bit shifted out |
| | N - des < 0 |
| | Z - des = 0 |
| | V - 0 |
| | U - 0 |
| Description | If the source is zero the destination is not changed but the Carry flag is set to the least significant bit of dsrc. Otherwise dsrc is rotated (left if src < 0; right of src > 0) and the Carry flag is set to the value of the last bit shifted out. The source is always a Byte operand even though the destination can be a Byte (ROTB), Halfword (ROTH) or Word (ROTW). |
| Exceptions | none |

RSET - RESET

| Opcode | 7B | RSET | ReSET processor |
|---|---|---|---|

| Assembler | | |
|---|---|---|
| Syntax | RSET | |
| Operation | The processor is initialized | |
| Flags | no changes | |
| Description | RSET causes the Integer and Floating point Execution units to be initialized and all pending interrupts to be reset. All I/O activity is aborted. The serial channel "ready" flags are set to one (ready) and all other I/O registers are cleared including error flags | |
| Exceptions | none | |

SBB - SUBTRACT WITH BORROW

| Opcodes: | 70 | SBBB | SuBtract with Borrow Byte |
|---|---|---|---|
| | 72 | SBBH | SuBtract with Borrow Halfword |
| | 74 | SBBW | SuBtract with Borrow Word |

| Assembler | |
|---|---|
| Syntax | SBB{B,H,W} src,des |
| Operation | dsrc - src - Carry → des |
| Flags | C ← borrow from most significant bit |
| | N ← des < 0 |
| | Z ← des = 0 |
| | V ← Integer overflow |
| | U ← 0 |
| Description | The Carry (borrow) and source values are subtracted from the destination and the result replaces the destination |
| Exceptions | Integer overflow |

SBBD - SUBTRACT DECIMAL

| Opcode: | 91 | SBBD | SuBtract with Borrow Decimal |
|---|---|---|---|

| Assembler | |
|---|---|
| Syntax | SBBD src,des |
| Operation | dsrc - src - Carry → des |
| Flags | C ← borrow from most significant digit |
| | N ← 0 |
| | Z ← des = 0 |
| | V ← 0 |
| | U ← 0 |
| Description | The Carry value (borrow) and source (Byte) value treated as a two BCD digit value are subtracted from the destination considered similarly. The result replaces the destination. The operands are not checked for invalid BCD format |
| Exceptions | none |

SBR - SUBTRACT REVERSE

| Opcodes: | 20 | SBRB | SuBtract Reverse Byte |
|---|---|---|---|
| | 22 | SBRH | SuBtract Reverse Halfword |
| | 24 | SBRW | SuBtract Reverse Word |
| | 28 | SBRR | SuBtract Reverse Real |
| | 2A | SBRL | SuBtract Reverse Longreal |

| Assembler | |
|---|---|
| Syntax | SBR{B,H,W,R,L} src,des |
| Operation | src - dsrc → des |
| Flags | (Integer Operations: SBRB,SBRH,SBRW) |
| | C ← borrow from most significant bit |
| | N ← des < 0 |
| | Z ← des = 0 |
| | V ← Integer overflow |
| | U ← 0 |
| Flags | (Floating Point Operations: SBRR,SBRL) |
| | C ← des < 0 |
| | N ← des < 0 |
| | Z ← des = 0 |
| | V ← 0 |
| | U ← 0 |
| | IX ← des rounded |
| | UF ← des underflowed |
| | FZ ← 0 |
| | OF ← des overflowed |
| | IN ← src or dsrc = Nan |
| Description | The destination value is subtracted from the source and the result replaces the destination |
| Exceptions | Integer overflow, Inexact, Underflow, Overflow, Invalid |

SFA - SHIFT ARITHMETIC

| Opcodes: | 11 | SFAB | ShiFt Arithmetic Byte |
|---|---|---|---|
| | 13 | SFAH | ShiFt Arithmetic Halfword |
| | 15 | SFAW | ShiFt Arithmetic Word |

| Assembler | |
|---|---|
| Syntax | SFA{B,H,W} src,des |
| Operation | dsrc SHIFT ARITHMETIC BY src → des |
| Flags | C ← if src = 0 then least significant bit (dsrc) otherwise last bit shifted out |
| | N ← src < 0 |
| | Z ← des = 0 |
| | V ← Integer overflow |
| | U ← 0 |
| Description | If the source is zero the destination is unchanged and the Carry flag is set to the least significant bit of the destination. Otherwise, the operand at the destination address is shifted by the number of places equal to the value of the source. If the source is positive the shift is to the left and if negative it is to the right. Left shifts cause zero to be shifted in from the right and right shifts cause the sign to be copied from the left. In both cases the Carry flag is set to the last bit shifted out. If the shift is right Integer overflow cannot occur but left shifts cause Integer overflow if the bits shifted out are not all equal to the resulting sign bit. The source operand is always a Byte operand even though the destination can be a Byte (SFAB), Halfword (SFAH) or Word (SFAW). |
| Exceptions | Integer overflow |

SFT - SHIFT LOGICAL

| Opcodes | 01 | SFTB | ShiFT logical Byte |
|---|---|---|---|
| | 03 | SFTH | ShiFT logical Halfword |
| | 05 | SFTW | ShiFT logical Word |

| Assembler | |
|---|---|
| Syntax | SFT{B,H,W} src,des |
| Operation | dsrc SHIFT LOGICAL BY src → des |
| Flags | C ← if src = 0 then least significant bit (dsrc) otherwise last bit shifted out |
| | N ← des < 0 |
| | Z ← des = 0 |
| | V ← 0 |
| | U ← 0 |
| Description | If the source is zero the destination is unchanged and the Carry flag is set to the least significant bit of the destination. Otherwise, the operand at the destination address is shifted by the number of places equal to the value of the source. If the source is positive the shift is to the left and if negative it is to the right. Left shifts cause zero to be shifted in from the right and right shifts cause zero to be shifted in from the left. In both cases the Carry flag is set to the last bit shifted out. The source operand is always a Byte operand even though the destination can be a Byte (SFTB), Halfword (SFTH) or Word (SFTW). |
| Exceptions | none |

SGN - SET SIGN

| Opcodes: | 78 | SGNR | Set siGN Real |
|---|---|---|---|
| | 7A | SGNL | Set siGN Longreal |

| Assembler | |
|---|---|
| Syntax | SGN{R,L} src,des |
| Operation | SIGN (src) → SIGN (des) |
| Flags | C ← des < 0 |
| | N ← des < 0 |
| | Z ← des = 0 |
| | V ← 0 |
| | U ← 0 |
| | IX ← 0 |
| | UF ← 0 |
| | FZ ← 0 |
| | OF ← 0 |
| | IN ← src or dsrc = Nan |
| Description | The sign of the destination is set to the sign of the source. |
| Exceptions | Invalid |

SQT - SQUARE ROOT

| Opcodes: | 58 | SQRT | SQuare rooT Real |
|---|---|---|---|
| | 5A | SQTL | SQuare rooT Longreal |

| Assembler | |
|---|---|
| Syntax | SQT{R,L} src,des |
| Operation | SQUARE ROOT (src) → des |
| Flags | C ← 0 |
| | N ← 0 |
| | Z ← des = 0 |
| | V ← 0 |
| | U ← 0 |
| | IX ← des rounded |

-continued

```
              UF - 0
              FZ - 0
              OF - 0
              IN - (src < 0) or (src = Nan)
Descrip-      The square root of the source replaces the
tion          destination. The square root is correctly
              rounded and cannot overflow or underflow.
Exceptions    Inexact, Invalid
```

STC - SET CARRY
```
Opcode        2B    STC            SeT Carry
Assembler
Syntax        STC
Operation     1 -- Carry
Flags         C - 1
              no other changes
Descrip-      The Carry flag is set to one
tion
Exceptions    none
```

STPR - STORE PROCESSOR REGISTERS
```
Opcode        95    STPR           STore Processor Registers
Assembler
Syntax        STPR src,des
Operation     PROCESSOR REGISTER # (src) -- des
Flags         C - C
              N - des < 0
              Z - des = 0
              V - 0
              U - 0
Descrip-      The contents of the Processor Register whose
tion          number corresponds with the value of the source
              replaces the destination. The destination is a
              Word and the source is a Byte value designating
              a Processor Register. The Processor Registers
              are listed below
                      P0 SP  Stack Pointer
                      P1 PS  Program Status
                      P2 FR  Fault Register
                      P3 CR  Configuration Register
                      P4 PI  Processor I D
                      P5 OR  Output Ready   (read only)
                      P6 IR  Input Ready    (read only)
                      P7 OE  Output Enable
                      P8 IE  Input Enable
                      P9 IP  Input Pending  (read only)
                      P10 PE Parity Error   (read only)
                      P11 IO Input Overrun  (read only)
Exception     none
```

SUB - SUBTRACT
```
Opcodes       60    SUBB           SUBtract Byte
              62    SUBH           SUBtract Halfword
              64    SUBW           SUBtract Word
              68    SUBR           SUBtract Real
              6A    SUBL           SUBtract Longreal
Assembler
Syntax        SUB{B,H,W,R,L} src,des
Operation     dsrc - src -- des
Flags         (Integer Operations  SUBB,SUBH,SUBW)
                      C -- borrow from most significant bit
                      N -- des < 0
                      Z -- des = 0
                      V -- Integer overflow
                      U -- 0
Flags         (Floating Point Operations  SUBR,SUBL)
                      C -- des < 0
                      N -- des < 0
                      Z -- des = 0
                      V -- 0
                      U -- 0
                      IX -- des rounded
                      UF -- des underflowed
                      FZ -- 0
                      OF -- des overflowed
                      IN -- src or dsrc = Nan
Descrip-      The source is subtracted from the destination
tion          and the result is stored at the address of the
              destination
Exceptions    Integer overflow, Inexact, Underflow, Overflow,
              Invalid
```

TRAP - TRAP
```
Opcode        1E    TRAP           TRAP
Assembler
Syntax        TRAP src
```

```
Operation     generate interrupt # (src)
                      stack - PS
                      stack - PC
                      PC - Word at location (8 * src)
                      PS - Word at location (8 * src + 4)
Flags         all flags set according to the new PS value
Descrip-      The current values of PS and PC are pushed on the
tion          stack and the value at location (8 * src) replaces
              the PC while the value at location (8 * src + 4)
              replaces the PS. The source operand is an
              unsigned Byte.
Exceptions    none
```

WAIT - WAIT
```
Opcode        DB    WAIT           WAIT
Assembler
Syntax        WAIT
Operation     wait for interrupt
Flags         no changes
Descrip-      This instruction causes the processor to idle
tion          until it receives an interrupt.
Exceptions    none
```

XOR - EXCLUSIVE OR
```
Opcodes       61    XOBR           eXclusive OR Byte
              63    XORH           eXclusive OR Halfword
              65    XORW           eXclusive OR Word
Assembler
Syntax        XOR{B,H,W} src,des
Operation     src XOR dsrc -- des
Flags         C - C
              N - des < 0
              Z - des = 0
              V - 0
              U - 0
Descrip-      The destination is set to the exclusive or of the
tion          source and the operand at the destination
              location
Exceptions    none
```

4.9 Processor Initialization

A processor can be initialized by either asserting the reset pin or by executing a RSET instruction. The resulting initialization is significantly different in the two cases. They are both described below.

4.9.1 Hardware Initialization

Hardware initialization is done by asserting the reset pin and proceeds in several steps:

0) External requests are ignored.
1) The ERROR/ pin is latched into bit 31 (the mode flag) of the ID processor register which indicates whether it is an I/O processor (0) or an array processor (1). If the ERROR/ pin is grounded, bit 31 is set to 1 indicating that the processor is on an I/O board. A floating ERROR/ pin will cause bit 31 to become 0 which implies that the processor is on an array board. The mode flag is latched when the reset goes away.
2) The processor performs self tests on the various internal units and sets memory locations 4 to 2048 to zero. Location 0 is set to 1 (Word) if the processor passed its tests and −1 if it failed.
3) The processor state is set to zero except for
   a) bit 31 in the ID register (see above)
   b) bits 24-31 of the Configuration register are set by the manufacturing process
   c) the stack pointer (SP) and the fault register (FR) which are undefined
   d) input and output ready bits are set to 1 and interrupts are disabled.
4) The "shadow" ROM on the processor is activated and the procedure listed below is executed. Its function is to a) determine whether it is an I/O or array processor
b) if it is an array processor then
   1) it waits to receive a value (halfword) which is the length of the actual message (see 3)
   2) it replies with a status message indicating that it is ready to receive the full message
   3) it receives the message (the full software initialization software), loads it starting at location 0 and jumps to location 1024
c) if it is an I/O processor it waits until the central processor writes a nonzero value in location 0 and then jumps to location 1024 where the I/O initialization software would have been placed.
d) a JMP (jump) to the initialization software is executed (the jmp disables the shadow ROM until it is enabled by another reset signal). The functions performed by the initialization software should include a full set of diagnostics.

4.9.2 Initialization Procedure (shadow ROM)

The code in the on-chip shadow ROM is listed below with comments.

! During shadow ROM execution all interrupts are disabled including interrupts that are not normally maskable;
RSET ;
! The RAM chips need 8 refresh cycles to initialize themselves. The refresh rate starts at one refresh every 8 cycles since the Configuration register is set to zero on reset. We idle for the required 64 cycles by looping on RSET 10 times. Each loop takes 7 cycles (3 for the RSET and 4 for the REP);
MOVW #11,R0;
REP R0;
RSET;
! The refresh rate is lowered to every 40 cycles by writing a 4 in the Configuration register. This is conservatively high but the operating system can lower it further if the processor clock rate justifies it;
LDPR #4,#CONFIG;
! Memory is now initialized with correct ECC bits by writing zero to every location. Since the Configuration register is initialized to assume 16k × 4 memories, only the first quarter of memory is initialized by writing 8191 words. If the operating system changes the Configuration to 64k × 4, then it should initialize the last ¾ of memory;
MOVW #8191,R0;
MOVW #0,R1;
REP R0;
MOVW #0,(R1)+
! A self test belongs here. The result is encoded and stored in memory at location 4. A −1 means everything is fine;
MOVH #−1,4;
! Bit 31 of the ID Register is initialized when the reset pin is asserted with a one if the processor is an I/O processor or a zero is the processor is an array processor. I/O processors are initialized from memory while array processors are initialized by the serial ports;
STGPR #IDREG,R0;
BL IOINIT;
! Array processor initialization waits for a port to receive a message. The code below assumes that only one port will try to initialize the processor. If messages come in at two ports exactly at the same time, the code may not work;

```
PROCINIT:  STPR #INPEND,R0.   ! Are any incoming
                                messages pending?;
           BF PROCINIT.        ! No, try again.
           FFOW R0,R1.         ! Yes, R1 gets the port
                                number.
```

! Initialize the port so DMA transfer of a two byte message to location 2 will occur;
LPTR #2,R1;
LCNT #2,R1;
! Compute in R3 the corresponding output port for a reply;
MOVW R1,R3;
ADDW #R2,R3;
! Wait for incoming message DMA to complete;

```
INWAIT1:  STPR #INRDY,R2;  ! Store Input Ready flags in R2;
          BITW R2,R0.      ! Test the appropriate flag;
          BE INWAIT1;      ! Loop until port is ready;
```

! Start the output port DMA. The message will be the two byte self test status in location 4;
LPTR #4,R3;
LCNT #2,R3;
! Reinitialize the same input port to receive the contents of memory;

```
LPTR #8,R1;   ! The message will start at
              location 8.
LCNT 2,R1;    ! for the number of bytes indicated
              by the first message;

INWAIT2  STPR #INRDY,R2;  ! Wait for input DMA to
                          complete by;
         BITW R2,R0;      ! testing the appropriate
                          ready flag;
         BE INWAIT2;      ! and looping back until
                          ready (done);
```

! Jump to a preset location (1024) to begin execution from memory. The JMP resets the "shadow ROM active" flag;
JMP 1024;
! I/O processor initialization. Wait for memory location 0 or 1 to go nonzero. The external processor that loads the memory image must wait at least xxx cycles after the RESET signal has gone away;

```
IOINIT:  BITH #−1,0.   ! Test halfword at location 0;
         BE IOINIT;    ! Loop back until it becomes nonzero;
```

! Jump to a preset location (1024) to begin execution from memory. The JMP resets the "shadow ROM active: flag;
JMP 1024;
! End of shadow Rom code;

| MEMORY | ADDRESS |
|---|---|
| 0 | 0 |
| Initial message length | 2 |
| test results | 4 |
| reserved | 6 |
| DMA (Int 1 vector | 8 | etc

5 THE SOFTWARE

5.1 Introduction

There are two levels of operating software in the system: the Monitor (in EPROM) and the Operating System. The monitor is a simple, single user system that is in effect when the system is powered on. The Monitor uses terminal 0 and provides extensive diagnostic and management functions. The Operating System, IX TM (IX is a trademark of NCUBE Corporation), is automatically invoked if the system is in Normal mode and passes the diagnostic tests. IX TM is a fully protected multiuser, multitasking operating system with complete resource management including memory, main array, graphics and file system. The file system has a hierarchical structure and is distributed across all the disk drives in the system. Thus, a user can access his files regardless of which terminal (or Peripheral Controller) he uses.

In may ways the Operating System is similar to UNIX TM (UNIX is a Bell Laboratories trademark), and therefore will not be described in detail herein. The IX TM System does, however, have additional facilities including:

1) system temperature sensing
2) distributed file system
3) array management
4) uniform file protection The IX System is described in section 5.3.

5.2 The Monitor

5.2.1 Introduction

The Monitor is contained in the system EPROM and is invoked when the system is powered on. The Monitor always communicates with Terminal 0 on Peripheral Controller 0 (the System Console) for displaying messages and receiving commands. When the system mode switch on the front panel is in the "Normal" position, the Monitor runs the diagnostics and boots the Operating System (if the diagnostics run successfully). If the mode switch is set to "Diagnostic", the Monitor goes into a single user system after successfully running the diagnostics. The Monitor system provides a large range of offline diagnostic and backup facilities.

The Monitor consists of two parts: the ROM Monitor and the RAM Monitor. They are both in the system EPROM but the ROM Monitor uses no RAM even for stack space while the RAM Monitor, when invoked, is copied to RAM and uses RAM for data. The ROM Monitor starts the system and executes the diagnostics up to the memory test phase. If memory test passes, the RAM Monitor is automatically invoked; but if it fails, the system stays in the ROM Monitor and a few simple commands are available (see 5.2.3).

5.2.2 Monitor Diagnostics

The facilities tested by the Monitor diagnostics are listed below in order.

1) The two front panel LEDs are turned on and the ROM Monitor is started
2) The EPROM contents are verified (a checksum is computed)
3) All I/O devices except the disk controller are initialized.
4) The Serial Channel for Terminal 0 is tested
5) If (2) or (4) fail, the LEDs remain on and the system hangs indicating that Peripheral Controller board 0 is bad.
6) If (2) or (4) pass, then the LED labeled "STATUS 2" is turned off, appropriate characteristics are set for Terminal 0 (19200 baud rate, etc) and the system startup message, " Parallel Processor Peripheral Subsystem", is displayed.
7) System memory (RAM) is tested and any errors (including corrected ECC errors) are displayed. If there are memory errors or the Diagnostic Mode is on, the system stays in the ROM Monitor, prints "ROM-Only Diagnostic Monitor" followed by a "S" prompt and waits for user commands. If there are no memory errors and the system is in Normal Mode, the RAM Monitor is invoked and the diagnostics proceed.
8) The Disk Controller is tested if any disks are connected.
9) Power Supply status ad control signals are checked.
10) The Printer state is checked.
11) The System ID and slot numbers are checked.
12) All Temperature Sensors are tested and the temperature is displayed. If the temperature is above 38 degrees C, the system is shut down.
13) The Real Time Clock state and operation are checked.
14) All Interrupt Controllers are tested for state and response.
15) The remaining Serial Channels are tested.
16) The Timer (8253) is tested.
17) The Floating Point Processor (80287) is tested.
18) The DMA controller is checked.
19) Any SBX Modules connected to the system (as indicated by an EPROM table) are tested.

If the system is in Normal Mode and a disk is connected then

20) The disks are started and the controller is tested.
21) The disks are checked and fixed if a system crash was the cause of the last shutdown.
22) The Operating System is booted.

Otherwise

20) The system stays int eh RAM Monitor, a ">" prompt is displayed and the system waits for a command.

5.2.3 ROM Monitor Commands

Since the ROM Monitor does not use RAM, its commands are few and simple. They are listed below and are invoked by typing the first letter in the command name. A "return" causes a new "S" prompt to be displayed. A " t" can be typed at any time and whatever is happening will be aborted and a new prompt displayed. The operand specifications for the commands are defined as follows ADDR consists of two 4 digit hexadecimal numbers separated by a colon. The first number is the segment selector and the second is the offset.

LENGTH  
IOADDR    are 4 digit hexidecimal numbers.  
VALUE

SEG MAX is the number of 64 Kbyte segments of memory to be tested (starting from memory address 0).

COMMANDS continue

Restarts the disk operating system after a "debug" stop.

display <ADDR>,<LENGTH>

A section of memory from ADDR to ADDR-LENGTH-1 is displayed in the following format:

ADDR hhhh hhhh hhhh hhhh hhhh hhhh hhhh hhhh <ascii> where ADDR is the beginning address, "hhhh" represents a 16 bit word in hex and the ASCII equivalent of the 8 words is also displayed ("." represents unprintable characters).

goto ram monitor

The RAM Monitor is booted.

help

The list of ROM Monitor commands and operands is displayed.

input <IOADDR>

The value at I/O address IOADDR is displayed. Typing a "line feed" repeats the command with the same operand and a "return" terminates it.

memory test <SEG MAX>

SEG MAX 64 Kbyte segments of memory are tested starting at memory address 0.

output <IOADDR>,<VALUE>

VALUE is written to I/O address IOADDR. A "line feed" repeats the command at the same address but allows a different VALUE to be typed and "return" terminates it.

power down

The system is powered down.

set <ADDR>

The value in memory at ADDR is displayed and can be altered by typing a new value. A "line feed" advances to the next word in memory and repeats the command. A "return" terminates it.

5.2.4 RAM Monitor Commands

The RAM Monitor is invoked automatically if the diagnostics pass the memory test or explicitly by typing "g" in response to the ROM Monitor prompt. The RAM Monitor Commands are of four types: general, debugging, disk control or tape control. The general commands are invoked by typing the first letter of the command name. The debugging, disk control and tape control command are invoked by first typing "y", "x" or "t" respectively, followed by the first letter of the specific command name. If "return" is the first character typed, a new monitor prompt, ">", is printed and the command analyzer is restarted. A " c" can be typed at any time and regardless of what is happening, it will be aborted and a new prompt will be displayed.

The operand specifications are the same as the ROM Monitor's (see 5.2.3) but with several additions.

5.3 The Operating System

3.3.1 Overview

The operating system, IX TM, is a high performance UNIX-style interface to the hardware. It supports multiple users, including password and billing, and multitasking. The editor, NMACS, is screen oriented and is similar to a simplified version of EMACS. The file system is the most prominent feature of the operating software because nearly every system resource is treated as a type of file. The file system is hierarchical like UNIX but has extensive mechanisms for file protection and sharing. The operating system treats memory as a collection of segments that can be allocated and shared. Processes are created and scheduled (priority, round robin) by the system and provide part of the protection facility. There is a debugger and a linking loader. One of the unique facilities of the IX TM system is the management of the main processing array. It is managed as a device and each process requests subsets of the array which are allocated according to availability. Fault tolerance is supported by the system it periodically runs diagnostics on the array and if any nodes fail, they are mapped out of the allocatable resource and the operator is informed of the fault. Only the facilities listed above which are essential to an understanding of the present invention are described in more detail below.

5.3.2 File System

The file system is the user's uniform interface to almost all of the system resources. The two main entities in the file system are directories which provide the structure and files which contain the data. Most resources (e.g. printers, terminals, processing array) are treated as devices which are simply one type of file. A file has a name which both uniquely identifies it and indicates its position in the file structure. Files have a set of operations defined that can be performed by a user having the requisite privileges.

5.3.3 Editing

There are three editors in the IX TM system. One is a line editor called "ed". It is compatible with the "ed" line editor in UNIX. Another is a stream editor whose name is "sed". Sed is also compatible with the UNIX stream editor of the same name. For detailed information see the extensive literature on standard UNIX systems (e.g. B. W. Kernighan's books: "A Tutorial Introduction to the ED Text Editor" and "Advanced editing on UNIX").

The third editor is a screen editor called "nm" (NMACS). It is similar to the widely used screen editor EMACS.

5.3.4 Memory Management

The system of the present invention provides a segmented virtual memory environment. The virtual address space is $2^{30}$ bytes. Main memory is treated as a set of segments on 256 byte boundaries. The operating system provides allocation, deallocation, extension (segments can grow to 64 Kbytes), compaction and swapping functions. The system relies on the Intel 80286 memory management hardware. Memory is allocated and deallocated with the system call "core".

5.3.5 Process Management

Processes are managed by the operating system as the fundamental units of computation. They are created, scheduled, dispatched and killed by the system in a uniform way for all processes. When the operating system is booted the primary, highest priority system process, called the MCP (Master Control Program), is dispatched. It initializes the system including dispatching background system processes (like a print spooler) that it gets from a system initialization file, watches terminals and creates processes. It also cleans up and shuts down the system when power failure or overheating is detected.

Whenever a user logs on the system, the MCP checks his name and password. If he is an authorized user and the password is correct, the MCP creates a process for him. The parameters of the process are taken from his "log on" file that is created by the system administrator. These parameters include the priority, the initial program (usually the shell), the preface (user's root directory) and billing information. The logon file for "user1" is named /sys/acct/user1.

A process is represented by a data structure in memory. This structure, called a process object, has the following entries:

state: This is the area where register values including segment pointers are saved when the process is not executing.

condition: The conditions that a process can be in are
  runnable
  waiting for memory allocation
  waiting for array allocation
  waiting for a message
  waiting for error handling
  etc code and data: These entries point to the code and data for the process program.

preface: This is the name of the root directory of the process.

directory: This is the name of the current working directory priority: A number between 1 and 255 indicating the relative priority of the process (255 is the highest priority).

time: The maximum number of clock ticks this process can run before it must be rescheduled.

rights: A process can be granted (1) or denied (0) various rights according to the setting of the flags listed below
  create links
  delete links
  create processes
  kill processes
  superuser owner: Name of the user who created the process.

open files: This is a table of descriptors for each or the open files of the process. When a process is created the first three entries (channel numbers 0,1 and 2) are initialized to the following:
  0: standard input file
  1: standard output file
  2: standard error file When a new process is created, its owner, priority and rights are either initialized by the logon file or are inherited from the creating process. The priority and rights can be reduced or restricted but not increased or expanded.

All processes in the system are linked together in the process list. When it is time to dispatch a new process the list is searched starting from the process that was most recently running. The search finds and dispatches the highest priority process that is in runnable condition. If there is more than one the last one found is dispatched. The process runs until one of three events occurs:

1) the process time slice is exhausted
2) the process must wait for some event such as a message or disk operation
3) another higher priority process becomes runnable.

Thus, the process management system implements preemptive, priority, round robin scheduling.

There are a set of operations for process management. These system calls are:

Process System Calls frun: run a file
getpcs: get priority, rights, time, condition, owner, etc
chprot: change protection or rights
alarm: set process alarm clock
endpcs: terminate a process
endump: terminate and dump
pause: suspend a process
psend: send a message or signal
vector: set interrupt vector

5.3.6 Device Management

The system treats almost all resources as devices which are simply a special type of file. The devices include disk drives, tape drives, printers, graphics hardware, interboard bus, SBX interfaces and the hypercube array. Devices are managed as are other files with open, close, read and write calls. For special operations that do not fall easily in those categories, the operating system supports a "special operation" call. These special operations are things such as setting terminal parameters and printer fonts.

5.3.6.1 Hypercube Array

The system treats the hypercube array as a device type file. Consequently, it is allocated with an "open" command, deallocated with "close" and messages are sent and received with "write" and "read" respectively. One of the powerful features of the hypercube is that it is defined recursively and so all orders of cube are logically equivalent. When allocation is requested the user specifies in the "open" call the subcode order (N) he needs. If a subcode of that order is available, it is initialized and the nodes are numbered from 0 to $2^{N-1}$. The subcube is allocated as close as possible to the Peripheral Controller that the user's terminal is connected to. If no subcube of that size is available, the "open" returns an error condition. This allows the user to either wait for a subcube of order N to become available or to request a smaller one. Once allocated the user owns the subcude until his process terminates or he explicitly deallocates (closes) it. A degree of fault tolerance is achieved in the system because the operating system periodically runs diagnostics on the Hypercube Array and if a node fails, it is mapped out of the allocatable resource. However, the rest of the nodes are available for use. (A faulted node also causes the LED attached to its Array board to be turned off indicating a condition requiring service.)

5.3.6.2 Graphics System

The graphics boards are also treated as device files and are allocated and managed by each user with file system calls. The special operations that are defined for the graphics devices are the graphics operations that the hardware itself supports such as line and circle drawing, fill-in, panning, etc.

5.3.6.3 SBX Interface

Each System Control board in a system has three SBX connectors. One is used for the cartridge tape controller and another is dedicated to providing the Interboard Bus (a bus for moving data between Peripheral Controllers). The last SBX connector is available for custom parallel I/O applications. There are many potential uses for the SBX Interface including networking. 9 track tape drive controller, etc. Regardless of what it is used for, it will be treated as a device by the operating system. Consequently, it is only necessary to write the appropriate device driver in order to use the standard file system calls for device management.

5.3.7 Initialization

The first level initialization is accomplished by simply turning on the system in Normal mode. When the operating system is booted, it looks for a configuration file called /sys/startup If the "startup" file exits, a shell is created that runs it as a command file. One example of a command that would very likely be found in the startup file is /sys/bin/spool > /sys/spool.log and which causes the print spooler to be run as a parallel process.

In addition, the system administrator must perform certain functions such as creating logon files for each user.

In addition to initializing the operating system, the hypercube array must be initialized. The initialization of individual processors is discussed in section 4.9. In this section an algorithm for initializing the system is described. The algorithm is based on a tree structure and can be more easily illustrated than described. The diagram below shows the initialization responsibility for each processor assuming there are 16 processors. The binary numbers are the processor ID's and the decimal numbers represent the stage in time of the initialization.

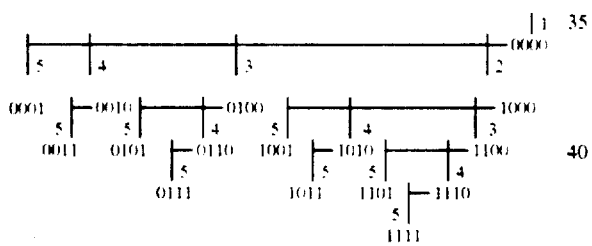

The assembly language code that implements this algorithm is listed below.

```
        MOVW   ID,R1        ;ID is memory location
                             ;containing the processor ID
        LDPR   R1,IDREG     ;the ID is loaded into the ID
                             ;processor register
        FFO    R1,R2        ;R2 = # of trailing zeros in ID
        SUBB   #1,R2        ;
        JL END               ;no trailing zeros = > this
                             ;processor is a leaf on the graph
LOOP:   MOVW   #1,R3        ;compute ID of neighbor by
                             ;complementing one of the
        SFTW   R2,R3        ;trailing zeros
        MOVW   R1,R4        ;
        XORW   R3,R4        ;R4 = new ID
        {send message length to port #(R2)}
        {receive status; use timeout}
           a. dead (timed out)
           b. failed self test
           c. parity error
           d. alive and well
        {if alive MOVW R4,ID;put new ID in memory}
        {send copy of code and new ID to R2}
        REPC   R2           ;
        JMP    LOOP         ;
END:
```

(look for responses and EROF)

5.3.8 Operating System Commands

This section specifies the commands in alphabetic order that are implemented in the operating system:

| | |
|---|---|
| ADB: | debugger |
| AS: | assembler (80286) |
| ASN: | assembler ( ) |
| AT: | later execution |
| CAT: | catenate and print |
| CD: | change directory |
| CHMOD: | change protection |
| CMP: | file compare |
| CN: | change name |
| CP: | copy |
| DATE: | print date |
| DC: | desk calculator |
| DF: | disk free space |
| DIFF: | diff. file compare |
| DU: | disk usage |
| ECHO: | echo arguments |
| ED: | line editor |
| ET: | terminal emulation |
| F77: | Fortran 77 (80286) |
| F77N: | Fortran 77 ( ) |
| GREP: | pattern search |
| HELP: | help |
| HD: | hex dump |
| KILL: | kill process |
| LN: | make a link |
| LS: | list directory |
| MAIL: | local mail |
| MAN: | print manual |
| MESG: | messages (yes/no) |
| MORE: | paged display |
| MOUNT: | mount file system |
| NM: | screen editor (NMACS) |
| NSH: | shell (see SH) |
| PASSWD: | change password |
| PR: | print file |
| PS: | process status |
| PSTAT: | system status |
| PWD: | working directory |
| RM: | remove file |
| RMLN: | remove link |
| ROFF: | text formatter |
| SA: | system accounting |
| SED: | stream editor |
| SH: | shell |
| SHUT: | invoke RAM Monitor |
| SLEEP: | suspend process |
| SORT: | sort or merge |
| SPLIT: | split a file |
| STTY: | set terminal |
| TEE: | pipe with file save |
| WAIT: | wait for completion |
| WALL: | write to all users |
| WHO: | display system users |
| WRITE: | send text |

5.3.9 File Formats and Conventions

In this section the data structures that are used in the operating system are specified. Most of the structures are used for managing

```
processes
    procobj
files
    cactab
    dir
    file
    opntab
system
    sysdata
    sysdev
```

To fully understand some of these structures it is necessary to have a working knowledge of the 80286 (see iAPX 286 Programmer's Reference Manual from Intel for details). Some of the important characteristics of the 80286 are:

1) Memory is treated as a set of variable length (up to 64 Kbytes) segments.
2) Each segment has a virtual address that consists of two parts (each part is two bytes)
   a) an index (segment selector) into one of two tables of segment descriptors: the Global Descriptor Table (GDT) and the Local Descriptor Table (LDT).
3) The hardware recognizes some special segments and has support for fast task switching. These include the GDT, the LDT and the Task State Segment (TSS).

In the specifications below the abbreviations have the following meanings: C=Constant, B=Byte, H=Halfword, W=Word, D=Double Word. If a Word is an address in memory then it consists of the two parts described above. If a Word is a disk address then it has three parts that designate cylinder, head and sector.

```
CACTAB(5)                                    CACTAB(5)
NAME
cactab - format of the sector buffer cache table
```

DESCRIPTION

The file system maintains a cache of buffers for disk sectors to minimize the actual disk traffic. The number of buffers is set by the system variable "cacent". When the buffers are all full and a sector must be read that is not in a buffer, the least recently used buffer is used for the new sector. Therefore, the buffers are arranged in a linked list with a system variable "lruptr" pointing to the least recently used buffer. The entries in the sector buffer cache table (which is located at "cactab") are called sector buffer descriptors ("sucbufdes") and are specified below.

```
secbufdes -- format of a sector buffer descriptor
    H   caclruf   ;least recently used link forward
    H   caclrup   ;least recently used link backward
    B   cacst     ;buffer status (see below)/access count
    B   cacmod    ;buffer modified
    H   cacchn    ;lock chain for buffer
    H   cacchne   ;
    H   cacdev    ;device number (*2) for buffer
    W   cacadr    ;disk address of buffer
    bufst
    C   unchanged = 0   ;buffer not saved on swap ????
    C   modified  = 1   ;buffer modified (saved on swap)
SEE ALSO
sysdata(5)
DIR(5)                                               DIR(5)
NAME
dir -- format of a directory
```

DESCRIPTION

Each node in the file system hierarchy is a directory. A directory contains pointers to files or other directories. The first name in every directory is "." and refers to itself. Names of files and directories can have at most 24 characters from the set (a-z,0-9,$,_,.). A directory is made of one or more directory sectors ("dirsec"). A directory sector contains up to 32 entries, each of which is 32 bytes. The first entry contains defining information about the directory. The rest of the entries, called directory pointers ("dirptr"), are pointers to files or other directories. The structure of directory sectors and directory pointers are specified below.

```
dirsec -- format of a directory sector
    H    dirid     ;non-ASCII magic number (F4F1) that is
                   ;checked on every reference to the dirsec
    B    level     ;level of directory in hierarchy
    W    nxtdir    ;disk address of next dirsec in this node
    W    dirdate   ;creation date of directory
    H    dirown    ;directory owner number
    B(18) res      ;reserved
    W(8) dirptr    ;first of variable number (up to 31) of
                   ;pointers to files or directories
dirptr -- format of a directory pointer
    B(24) name     ;24 character name of file or directory
    H    rights    ;rights associated with name (see below)
    H    ddirdev   ;device for ddir pointer (if not null
                   ;dirptr points to device root)
    W    nodptr    ;disk address of next node or file
rights -- rights (and type) associated with name
           (0 = granted, 1 = denied)
    bit 0:  ⎫   type of object named (00 = file/device,
    bit 1:  ⎭   01 = link, 10 = ddir, 11 = directory)
    bit 2:  change rights
    bit 3:  reserved
    bit 4:  delete file
    bit 5:  execute file
    bit 6:  write file
    bit 7:  read file
    bit 8:  change names in directory
    bit 9:  create and change links
    bit 10: use directory for file lookup
    bit 11: delete entry in directory
    bit 12: delete directory
    bit 13: execute from directory
    bit 14: create file in directory
    bit 15: read contents of directory
SEE ALSO
file(5)
FILE(5)                                              FILE(5)
NAME
file -- format of a data file
```

DESCRIPTION

A data file consists of one fails descriptor sector ("fildessec") and as many file pointer sectors ("filptrsec") as necessary. A file descriptor sector contains a 32 byte header and up to 248 pointers to sectors containing data. A file pointer sector contains a 12 byte header and up to 252 pointers to data.

```
fildessec -- format of a file descriptor sector
    H    fildid    ;non-ASCII value (F9F1) used for validation
    B    filtyp    ;file type (see below)
    B    subtyp    ;file sub type (not interpreted by system)
    W    nxtptr    ;disk address of the next pointer sector
```

-continued

| H | filver | ;file version number |
|---|---|---|
| H | filock | ;file lock (1 = read, 2 = write) |
| W | fildate | ;file creation date |
| W | altered | ;date file last altered |
| W | acssed | ;date file last accessed |
| W | filsiz | ;file size (0 to 4294967295 bytes) |
| H | filown | ;file owner number |
| H | accent | ;file access count |
| W | fdatptr | ;first of up to 248 disk addresses of sectors containing data (fdatptr = 0 is an invalid pointer) | filtyp -- file type definitions (0 to 15 reserved for)
```
    C  nulfil  = 0 ;
    C  devfil  = 1 ;a device type file
    C  sysfil  = 2 ;a system file
    C  binfil  = 3 ;a binary file
    C  relfil  = 4 ;a relocatable object file type
    C  exefil  = 5 ;and executable file
    C  txtfil  = 6 ;a text (ASCII) file
```
FILE(5)                                                 FILE(5)

filptrsec -- format of a file pointer sector

| H | filpid | ;non-ASCII value (FAF1) used for validation |
|---|---|---|
| H | secbas | ;sector count base (number of data sectors in file behind those pointed to here) |
| W | nxtptr | ;disk address of next pointer sector |
| B(8) | res | ;reserved |
| W | fdatptr | ;first of up to 252 disk addresses of sectors containing data |

SEE ALSO
ed(1), dir(5), opntab(5)
OPNTAB(5)                                             OPNTAB(5)
NAME
opntab -- format of an open file table

DESCRIPTION

Whenever a file is opened an open file descriptor ("opfildes") is created and entered into the open file table ("opntab") of the process that invoked that "open file" call. The call returns the index, called the channel number or "fildes", of the descriptor in the open file table. Thereafter, file operations refer to the file through this channel number. There can be up to ??? open files in a process at one time. An open file table consists entirely of open file descriptors so it suffices to specify the format of the descriptors.

opfildes -- format of an open file descriptor

| B | opnst | ;open file status (see below) |
|---|---|---|
| B | opntyp | ;type of file (see below) |
| H | opndev | ;device table index for file |
| W | opnptr | ;disk address of first pointer sector for file |
| W | opncpt | ;disk address of pointer sector for current byte pointer |
| W | opnpos | ;current byte position in file |
| W | opnsec | ;disk address of sector for current byte position |
| H | opnrgt | ;access rights for open file |
| H | opninx | ;index into pointer sector for current sector |
| H | opndir | ;pointer to directory sector for file |
| H | opntem | ;temporary area |
| H | opntem2 | ;temporary area |
| B | opnsips | ;count of number of link jumps |
| B | opndpt | ;current depth of name search | opnst -- definition of open file status
```
    C  open     = 1 ;
    C  altered  = 2 ;
```
opntyp -- definition of open file type
```
    C  file   = 0 ;
    C  device = 1 ;
    C  pipe   = 2 ;
```
SEE ALSO
file(5), open(2)
PROCOBJ(5)                                           PROCOBJ(5)
NAME procobj -- format of a process object

DESCRIPTION

Each process in the system is represented by a data structure called a process object. The process object is represented by four entries in the Global Descriptor Table (GDT). These four entries are collectively called the process descriptor and all process descriptors are chained together. The first entry is an "invalid" segment descriptor that contains process information: a link to the next process descriptor in the chain, process id, priority and status. The other three entries are valid segment descriptors. The process descriptor and process object formats are defined below.

process descriptor

| H | proc link | ;offset in the GDT to next process descriptor |
|---|---|---|
| H | proc id | ;unique identifier for the process |
| B | proc priority | ;scheduling priority (1 is highest) |
| B | proc null | ;=0 for invalid segment descriptor |
| H | proc status | ;see below |
| W(2) | TSS desc | ;descriptor for Task State Segment |
| W(2) | LDT desc | ;descriptor for Local Descriptor Table |
| W(2) | procobj desc | ;descriptor for process object | proc status
```
    C  run     = 0  ;process is runnable
    C  newpcs  = 1  ;new process
    C  interr  = 2  ;process is stopped by error
    C  bufwat  = 20 ;waiting for memory buffer
    C  dacwat  = 21 ;waiting for device allocation
    C  secwat  = 22 ;waiting for sector buffer
    C  dskwat  = 23 ;waiting for disk operation
    C  endwat  = 24 ;waiting for process termination
    C  trdwat  = 25 ;waiting for tty read
    C  twrwat  = 26 ;waiting for tty write
    C  mcpwat  = 27 ;MCP idle
    C  ptrwat  = 28 ;waiting on printer
    C  cacwat  = 29 ;waiting for disk cache
    C  diverr  = 30 ;divide or overflow stop
    C  trderr  = 31 ;trace stop
    C  brkerr  = 32 ;breakpoint stop
    C  ovrerr  = 33 ;integer overflow stop
    C  ptrerr  = 34 ;protection error stop
```
PROCOBJ(5)                                           PROCOBJ(5)

procobj -- format of a processor object

| B(44) | TSS | ;Task State Segment | |
|---|---|---|---|
| W | strtim | ;process start time | |
| H | cpustt | ;time at start of time slice | |
| H | newsflg | ;new sector allocation flag | |
| W | cputim | ;execution time (.01 sec) | Process Statistics |
| W | dskrds | ;disk read count | |
| W | dskwrs | ;disk write count | |
| W | iocnt | ;other I/O count (bytes) | |
| W | corsiz | ;memory size (Kbytes) | |
| W | kcorsec | ;kilo-core-sec | |
| W | cortim | ;mem size start time | |
| H | pcsown | ;process owner | |
| H | parent | ;process parent | |
| H | filmax | ;max open files (*32) | |
| H | segmax | ;LDT size | Process Parameters |
| H | privlg | ;privilege bits (see below) | |
| H | ldtadr | ;offset of LDT | |
| B(24) | pcsnam | ;process program name | |
| B(256) | pcsdir | ;process preface | |
| B(256) | insdir | ;current working directory | |
| H | devchn | ;chain for device wait | |
| H | alrmchn | ;chain for alarm wait | System Work Area in Process |
| W | alrmtim | ;alarm time | |
| H | lckchn | ;chain for locks | |
| H | pcswatid | ;process being waited on | |
| B(36) | devsav | ;device I/O data area | |
| B(24) | namsav | ;name work area | |
| W | bkptvec | ;breakpoint | |
| W | trcvec | ;trace | |

-continued

| | | | |
|---|---|---|---|
| W | fpvec | ;floating point error | |
| W | intovec | ;integer error | Process |
| W | abrtvec | ;abort ( ) | Interrupt |
| W | killvec | ;kill process | Vectors |
| W | protvec | ;protection error | (can be |
| W | pipvec | ;pipe error | set by |
| W | msgvec | ;message from process | "signal" |
| W | intvec | ;interrupt | system |
| W | alrmvec | ;alarm | call) |
| W | illvec | ;illegal instruction | |
| W | resovec | ; | |
| W | res1vec | ; | |
| W | res2vec | ; | |
| W | res3vec | ; | |
| B(80) | stk287 | ;save area for 80287 stack | |
| B(16) | stat287 | ;save area for 80287 status | |
| B(??) | opntab | ;open file table | |
| B(??) | LDT | ;Local Descriptor Table | |

PROCOBJ(5)  PROCOBJ(5)
privlg (process privilege bits 0 = granted 1 = denied)
  bit 0:
  bit 1:
  :
  bit 12: change memory size
  bit 13: create directories
  bit 14: create links
  bit 15: superuser (all rights)

The process statistics can be used for billing and are accessed with the "getpcs" system call. The process parameters are set at process creation from the log on file or they are inherited from the creating process. The open file table contains open file descriptors. Whenever a file is opened a descriptor for it is entered in this table and its index (channel number) is returned. Whenever a new segment is allocated to a process, a descriptor for it is entered in the LDT.

There are several system variables that are used in process management. These include
  system state
  last process: a pointer to the last dispatched process; it is used to implement round robin scheduling
  process object: the segment selector for the current process object
  time left: the number of clock ticks left in the time slice of the current process.

SEE ALSO
alarm(2), frun(2), endpcs(2), endump(2), getpcs(2), psend(2), pause(2), vector(2), sysdata(5), files(5)

SYSDATA(5)  SYSDATA(5)
NAME
sysdata -- format of system data file

DESCRIPTION

The system data ("sysdata") defines the parameters statistics and variables of the system. The data can be read by invoking the system call "getsys". The format of the system data is given below.

sysdata -- format of the system data file

| | | | |
|---|---|---|---|
| H | sysid | ;sector id (F0F1) for validation | |
| H | basyr | ;base year for system date (1981) | |
| W | sysdate | ;system creation date | |
| H | memsize | ;main memory size (/256) | |
| H | timzon | ;time zone correction factor | System |
| H | crashf | ;system crash flag | Param- |
| H | maxtmp | ;maximum system temperature | eters |
| W | systemid | ;system and board id number | |
| H | sysbrd | ;bits for active system boards | |

-continued

| | | | |
|---|---|---|---|
| H | grphrd | ;bits for active graphics boards | |
| H | acctflg | ;accounting enable flag | |
| H | shut | ;system shutdown flag | |
| B(??) | res | ;reserved | |
| W | lastim | ;last system startup time | |
| W | stime | ;system startup time | |
| W | systim | ;system overhead time | |
| W | idltim | ;system idle time | |
| W | eccent | ;ecc error count | |
| W | arytim | ;array use time | |
| H | badcnt | ;number unknown interrupts encountered | |
| W | totsys | ;total system overhead time | System |
| W | totidl | ;total system idle time | Statis- |
| W | totecc | ;total ecc error count | tics |
| W | totary | ;total array use time | |
| H | totbad | ;total unknown interrupts encountered | |
| W(2) | totup | ;total system up time | |
| W | crhcnt | ;system crash count | |
| H | tmpin | ;current temp into system | |
| H | tmpout | ;current temp out of system | |
| B(??) | res | ;reserved | |
| H | state | ;current system state | |
| H | curpcs | ;pointer into GDT for current process | |
| H | pcsobj | ;current process obj seg selector | System |
| H | bufptr | ;pointer to start of memory buffers | Vari- ables |
| H | lruptr | ;pointer to sector buffer lru chain | |
| W | pcsptr | ;branch pointer for process switch | |
| H | pcsctr | ;id for next process to be created | |
| B(??) | res | ;reserved | |

SYSDEV(5)  SYSDEV(5)
NAME
sysdev -- device index definition

DESCRIPTION

Each device supported by the operating system has a set of device drivers to support it. These routines are accessed through call tables that are indexed by the a unique number for each device (see below). The basic system supports the disks, 8530's, 8259's, 8254, array interface, printer and an sbx connected to a 3M tape drive. Additional drivers may be added if other sbx interfaces are installed in the system.

The device calls are standardized for all devices. They are: init, open, read, write, alloc, special and seek. The device index definitions for the system are

| | |
|---|---|
| 0: | Null device |
| 1: | sbx0 (tape drive if any) |
| 2: | sbx1 (interboard bus if any) |
| 3: | sbx2 (not defined) |
| 4: | disk controller drive 0 |
| 5: | disk controller drive 1 |
| 6: | disk controller drive 2 |
| 7: | disk controller drive 3 |
| 8: | tty0 |
| 9: | tty1 |
| 10: | tty2 |
| 11: | tty3 |
| 12: | tty4 |
| 13: | tty5 |
| 14: | tty6 |
| 15: | tty7 |
| 16: | terminal broadcast |
| 17: | printer |
| 18: | hypercube array |

5.4 Node Nucleus

There is a small nucleus that runs in each node of the hypercube array. The main function of the nucleus is to provide communication and synchronization facilities. However, there is also a simple debugger and a program loader and scheduler.

5.4.1 Communication and Synchronization

The model of computation assumed by the system is that the user will explicitly separate a program and data into parts that run on separate processors. It is also assumed that any synchronization that is necessary will be accomplished by waiting on communication. Therefore, the key functions are the communication routines. Communication at the user level is done with two simple system calls: "send" and "receive". They both have three arguments: a set of nodes, a message and a message length. A message is a string of bytes and the set of nodes is the destination or origination of the message. Both routines are "blocking" functions and do not return until the message is sent or received. To avoid waiting when synchronization is unnecessary, there is a "test for message" function which returns immediately with a flag indicating whether there is a message waiting for reception. There are also timed versions of send and receive that have an additional "time-out" parameter. They return after the message is received (or sent) or time-out is reached, whichever comes first. They return a flag indicating which condition caused the return.

The underlying system level handshaking and buffer management breaks a message up into small blocks and sends (receives) one block at a time. For messages that must be routed through more than one node, this is much more efficient than trying to handle the whole message at once. Also, it prevents a "waiting for buffer" type of deadlock.

5.4.2 Debugging

There is a simple debugger that runs in each node. In response to messages from the Peripheral Controller that is managing the subcube, a node can set breakpoints and read and set memory and registers.

5.4.3 Program Loading and Scheduling

The node nucleus has system calls that, in response to messages from the Peripheral Controller currently managing the node, allows a node to load a program and its data and schedule it for execution.

5.4.4 Nucleus System Calls

This section specifies the calls that a program running in a node can make on the nucleus. It also shows how a program running in the Peripheral Controller that is managing a node can, through sending and receiving messages, access some of the system calls. The list of system calls includes send
receive
sendtimeout
receivetimeout
testformessage
processornumber
setbreakpoint
readmemory
readregisters
setmemory
setregisters
load
go

6 SYSTEM MANAGEMENT

In this section a method for initializing the system is presented, especially how to propagate the initializing software through the array. There is more than one acceptable algorithm. The one we present here is a very simple one with high efficiency. The algorithm is based on a tree structure. The diagram below shows the initialization responsibility for each processor assuming there are 16 processors. The binary numbers are the processor ID's and the decimal numbers represent the stage (in time) of the initialization.

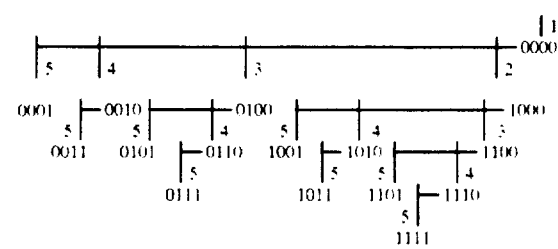

The assembly language code that implements this algorithm is:

```
        MOVW   ID,R1      ;ID is memory location containing the
                          ;processor ID
        LDPR   R1,IDREG   ;the ID is loaded into the ID processor
                          ;register
        FFO    R1,R2      ;R2 = # of trailing zeros in ID
        SUBB   #1,R2      ;
        JL     END        ;no trailing zeros → this processor is
                          ;a leaf on the graph
LOOP.   MOVW   #1,R3      ;compute ID of neighbor by complementing
        SFTW   R2,R3      ;one of the trailing zeros
        MOVW   R1,R4      ;
        XORW   R3,R4      ;R4 = new ID
        {send message length to port #(R2)}
        {receive status; use timeout}
             a.  dead (timed out)
             b.  failed self test
             c.  parity error
             d.  alive and well
        {if alive MOVW R4,ID,put new ID in memory}
        {send copy of code and new ID to R2}
        REPC   R2         ;
        JMP    LOOP       ;
END:
```

(look for responses and EROF)

7 USING THE SYSTEM

7.1 Introduction

In order to program the system effectively a user must think of a particular problem as a set of smaller problems. In some applications, particularly in the physical sciences, this is relatively easy. Most science problems involve solving equations in a 2 or 3 dimensional space and one can simply divide the space into pieces and solve the equations in these divided spaces, matching the solutions at the edges. In other applications dividing the problem into smaller pieces may not be as straight forward. However, almost all large problems must be subdivided, just to be manageable. A large proportion of important problems can be solved effectively on the system of the present invention.

One difference between the system of the present invention and the more traditional "pipelined" approach to high performance computing is that one must divide both the program and the data into smaller pieces. This is sometimes more difficult than having many programs working on a large shared memory, but it more accurately models the real physical world of local phenomena and it is the only way to overcome the memory speed bottleneck of shared memory systems.

Many problems will require a modification of the hypercube interconnection scheme. Therefore, the following section describes how to map the hypercube onto some of these different interconnection patterns.

7.2 Hypercube Mappings

The hypercube interconnection system was chosen for three main reasons:

1) It is a recursive scheme, so it will usually be easy to write programs that are independent of the order of the hypercube. This facilitates time and space sharing by the operating system.

2) It maps directly onto the most important common interconnection patterns (i.e. 1,2,3,4 dimensional lattices, "perfect shuffle" and trees).

3) It is so extensively interconnected that it gives a good approximation to maximal (every processor connected to all others) interconnection. Thus, if a problem does not have an obvious interconnection structure, it will normally be acceptable to assign subproblems arbitrarily to hypercube nodes and let the communication software take care of routing messages.

Since many physical problems split naturally onto lattices, algorithms for mapping the hypercube onto grids up to dimension 4 will be described.

7.2.1 Gray Code

All of the hypercube mappings are most easily described using some variant of Gray code. A gray code is a one-to-one mapping between integers such that the binary representations of the images of any two consecutive integers differ in exactly one place. The domain is assumed to be finite and the largest and smallest integers in the domain are "consecutive". One example of a gray code for three bit integers is

```
0  000  →  000  0
1  001  →  001  1
2  010  →  011  3
3  011  →  010  2
4  100  →  110  6
5  101  →  111  7
6  110  →  101  5
7  111  →  100  4
```

One may intuitively see that a gray code is important by realizing that in a hypercube, if processor x is connected to processor y, then the binary representations of x and y must differ in exactly one place. There is a unique gray code implemented with the following algorithm:

1) let x be a nonnegative number represented in binary
2) let y be x after a right shift by one place
3) then z = x XOR y is the gray code image of x The code to implement this algorithm is (X must be nonnegative):

```
MOVM X,R0
SFTW #-1,R0
XORW X,R0
MOVW R0,Z
```

As will be seen below, the inverse mapping is also needed In other words if z is a gray code image we will need to be able to calculate the value x whose gray code is z. The inverse mapping for the gray code algorithm given above is implemented in the following code:

```
MOVW   Z,R0
MOVW   R0,R1
MOVW   N,R2    ; N is the number of bits in the representation
                ; of Z

L: SFTW   #-1,R1
   XORW   R1,R0
   REP    R2
   JMP    L
```

Although the gray code above is unique, there are many mappings between integers that have the property of mapping consecutive integers to images that differ in one place. Any such mapping can be used in the algorithms described below.

7.2.2 One Dimensional Grid

A one dimensional grid (or ring) is simply a string of interconnected processors as shown

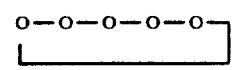

This interconnection is often useful when the problem does not have to solved in real time and can be broken down into steps that can be pipelined. Non-real-time filtering is an example. The mapping in this case is simply any gray code as described in section 7.2.1. Thus, if F is the gray code and G is its inverse then the neighbors of processor x are:

F(G(x)−1) and F(G(x)+1).

7.2.3 Two Dimensional Grid

Steady state problems involving two space dimensions (e.g. boundary value problems) map naturally onto a two dimensional grid. To define a two dimensional mapping, assume that the grid is $2^{}M$ in the x direction by $2^{}N$ in the y direction, then the processor number at location (x,y) is $$2^{**}M^*F(y)+F(x)$$

Also, if a processor number is $k=2^{**}M^*z+w$ then its neighbors are:

$$2^{**}M^*F(G(z)+F(w)-1)=2^{**}M^*z+F(G(w)-1)$$

$$2^{**}M^*F(G(z)+F(w)-1)=2^{**}M^*z+F(G(w)-1)$$

$$2^{**}M^*F(G(z)-1)+F(G(w))=2^{**}M^*F(G(z)-1)+w$$

$$2^{**}M^*F(G(z)-1)+F(G(w))=2^{**}M^*F(G(z)-1)+w$$

By using a slightly more complicated scheme where neighbors are determined by shuffling the bits of the images one has a mapping where the neighbors of k are fixed independent of the size of the hypercube.

7.2.4 Three Dimensional Grid

Many real physical problems are mapped onto three dimensional grids. An example is fluid flow whether in airplane wing design (turbulent, compressible flow) or oil reservoir modeling (incompressible flow). A three dimensional mapping is analogous to the two dimensional case except the processor ID numbers are divided into three parts instead of two and there are six neighbors instead of four.

7.2.5 Four Dimensional Grid

If a problem involves both time and space it may be conveniently mapped onto a four dimensional grid. In this case a processor ID number is divided into four parts and each processor has eight neighbors.

7.3 Computational Example (User Programming)

In this section programming to solve a typical problem is presented.

7.3.1 Simultaneous Linear Equations

Simultaneous linear equation problems are categorized according to the structure of the matrix representing the problem. The two main types are:

1) dense—where the matrix is mostly full of nonzero elements.
2) sparse—where the matrix is mostly zero. Within these categories matrices are further subdivided into:
   1) general—where the matrix elements have no perceivable structure.
   2) symmetric, positive definite—where the matrix elements are symmetric across the main diagonal and the determinants of all the principal minors are positive.

Below programming is shown for solving the dense matrix Gaussian elimination. The method involves computing factors of a matrix so that the problem is solvable in two steps. For example, suppose we want to solve $$Ax=b$$

where A is the matrix of coefficients, x is the unknown and b is the known vector. In the factorization methods we compute $$A=CD$$

where C and D have some special structure (orthogonal or triangular). Then the equations are solved by computing y and then x as shown $$Cy=b$$

$$Dx=y$$

The structure of C and D make the systems above easy to solve.

7.3.1.1 Hypercube Mapping

In the algorithms for dense matrices the matrix is broken up into equal rectangles (as close to squares as possible). Also the hypercube is mapped onto a two dimensional grid. Thus, in the ideal case where there are $M^{**}2$ processors and the matrix is N by N, then we would put subblocks of size N/M by N/M in each processor. The process is illustrated below where the subscripts refer to both the subblock of the matrix and to the processor.

$$A = \begin{bmatrix} A11 & A12 & \ldots & A1M \\ A21 & A22 & \ldots & A2M \\ \vdots & \vdots & \ldots & \vdots \\ \vdots & \vdots & \ldots & \vdots \\ AM1 & AM2 & \ldots & AMM \end{bmatrix} \begin{array}{l} \text{the processor Pij contains the} \\ \text{subblock Aij and the neighbors of} \\ \text{Pij are:} \\ \text{Pi-1j, Pi+1j, Pij-1, Pij+1} \end{array}$$

7.3.1.3 Gaussian Elimination

Gaussian elimination with partial pivoting is a relatively stable and fast method to solve a set of dense linear equations that have no special structure. This method computes a factorization of A called LU (i.e. $A=LU$ where L is lower triangular and U is upper triangular). Gaussian elimination can be used efficiently on the system of the present invention and pivoting does not slow the algorithm down appreciably.

The following user program computes L and U using partial pivoting with actual row interchanges. The elements of L and U replace the elements of A.

---

Given:
    M = Hypercube order
    PN = Processor Number
    N = Size of Aij subblock (N by N)
    A = subblock of coefficient matrix
Calculate:
    I = Row coordinate of processor and matrix subblock
    J = Column coordinate of processor and matrix subblock
    NN = North Neighbor (−1 if no neighbor)
    EN = East Neighbor (−1 if no neighbor)

```
-continued
          SN   = South Neighbor (-1 if no neighbor)
          WN   = West Neighbor (-1 if no neighbor)
Allocate
          RBMAX(N)    - Row buffer for maximum row
          RBTEM(N)      Row buffer for interchanges
Program:
          FOR X = 1 TO MIN(I,J)    ;the kth row and column of processors
                                   ;do k stages of elimination
                  FOR Y = 1 to N   ;N rows must be used for elimination
                                   ;at each stage
                      L = 1        ;from here to where noted below is for
                                   ;pivot selection and row interchange
                      IF (I = J) THEN L = Y   ;if the processor is on the
                                              ;diagonal and the last stage
                                              ;is reached, the loops must
                                              ;start at Y
                      IF (X = J) THEN    ;we are in the pivot column and
                                         ;K is calculated as the index of
                                         ;the row with the maximum pivot
                          T = 0
                          K = 1
                          FOR W = L TO N
                                  IF (ABS(A(W,Y) > T) THEN
                                          K = W
                                          T = ABS(A(W,Y))
                      ELSE RECEIVE(WN,K,1)   ;K is received by processors
                                             ;to the right of the pivot
                                             ;column
                      SEND(EN,K,1)   ;K is sent to the right after either
                                     ;being computed or received
                      IF (I = M) THEN   ;we are in the last row and must
                                        ;start the row selection by
                                        ;setting the buffer to the Kth
                                        ;row
                              FOR W = 1 TO N
                                      RBMAX(W) = A(K,W)
                      ELSE    ;if we are a row above the last then we
                              ;receive the maximum row from the processor
                              ;below us, compare it with our maximum row,
                              ;perform the exchange if necessary and send
                              ;the current maximum row up to the next row
                              ;of processors
                              RECEIVE(SN,RBMAX,N)
                              IF (X = J) THEN    ;EXCH is true if a row
                                                 ;interchange is necessary
                                      EXCH = (ABS(RBMAX(Y) > ABS(A(K,Y))
                              ELSE RECEIVE(WN,EXCH,1)
                              SEND(EN,EXCH,1)    ;if we are going to inter-
                              SEND(SN,EXCH,1)    ;change both the processors
                                                 ;to the right and below
                                                 ;must know
                              IF (EXCH) THEN
                                      FOR W = 1 TO N
                                              RBTEM(W) = A(K,W)
                                              A(K,W) = RBMAX(W)
                                      SEND(SN,RBTEM,N)
                              ELSE
                                      FOR W = 1 TO N
                                              RBMAX(W) = A(K,W)
                      IF (X >< 1) THEN   ;if we are not in the top row
                                         ;we must continue the process
                                         ;of selection by interchanging
                                         ;and sending the maximum row to
                                         ;the processors above
                              SEND(NN,RBMAX,N)
                              RECEIVE(NN,REPL,1)
                              IF (REPL) THEN
                                      RECEIVE(NN,RBTEM,N)
                                      FOR W = 1 TO N
                                              A(K,W) = RBTEM(W)
                              IF (X = 1) THEN SEND(SN,RBMAX,N)  ;if we are in
                                                                ;the top row we
                                                                ;only send a
                                                                ;row but
                              ELSE    ;otherwise we both send and receive a row
                                      RECEIVE(NN,RBMAX,N)
                                      SEND(SN,RBMAX,N)   ;this completes the section
                                                         ;of the program that
                                                         ;selects and interchanges
                                                         ;the pivot row
                              FOR Z = L to N   ;the rest of the program performs
                                               ;the decomposition using the row
```

-continued

```
            selected above
IF (X = J) THEN
        PIVOT = - (A(Z,Y) RBMAX(Y))
        A(Z,Y) = PIVOT
ELSE RECEIVE(WN,PIVOT,1)
    SEND(FN,PIVOT,1)
    IF (X = J) THEN L = L + 1
    FOR W = L TO N
        A(Z,W) = A(Z,W) - RBMAX(W) * PIVOT
```

PART II. DATA PROCESSOR IMPLEMENTATION

8.0 MAJOR COMPONENTS

FIG. 1 is a diagram of a multiprocessing system in which the present invention is embodied. A clock board (10), a number (1 to k) of processor array boards (12), and a number (1 to x) of system control boards (14), are plugged into slots (J1-J24) in a backplane (16). The backplane (shown in FIGS. 2A and 2B) is wired in such a way as to interconnect the k processors boards into an order P hypercube, where each processor board has m processor nodes connected in an order n hypercube, and where $K = 2^j$, $m = 2^n$, and $P = j + n$.

One of the processor array boards (12) is shown in more detail in FIG. 3, and is described in Section 8.1. One of the system control boards (14) is shown in FIG. 12, and is described in Section 8.9.

8.1 Processor Array Board

Refer to FIG. 3. Each processor array board is 16" by 21" and contains 64 processing nodes (i.e., m = 64) each processing node having 128K bytes of local memory and 11 I/O channels. The processing nodes are connected in an order 6 hypercube on the board (i.e. n = 6). This interconnection uses 6 of the 11 I/O channels on each processing node. The other 5 I/O channels are brought to the edge of the board for access to the backplane. 4 of these 5 channels are routed via backplane interconnections to other array boards to build larger hypercubes as described in Section 8.2 below.

The remaining one channel on each processing node is connected to one of the eight I/O slots in the backplane which receive eight system control boards. Thus each one of the eight system control boards (14) in the I/O slots of FIG. 1 is able to communicate directly with up to 128 processing nodes.

Figure 4:
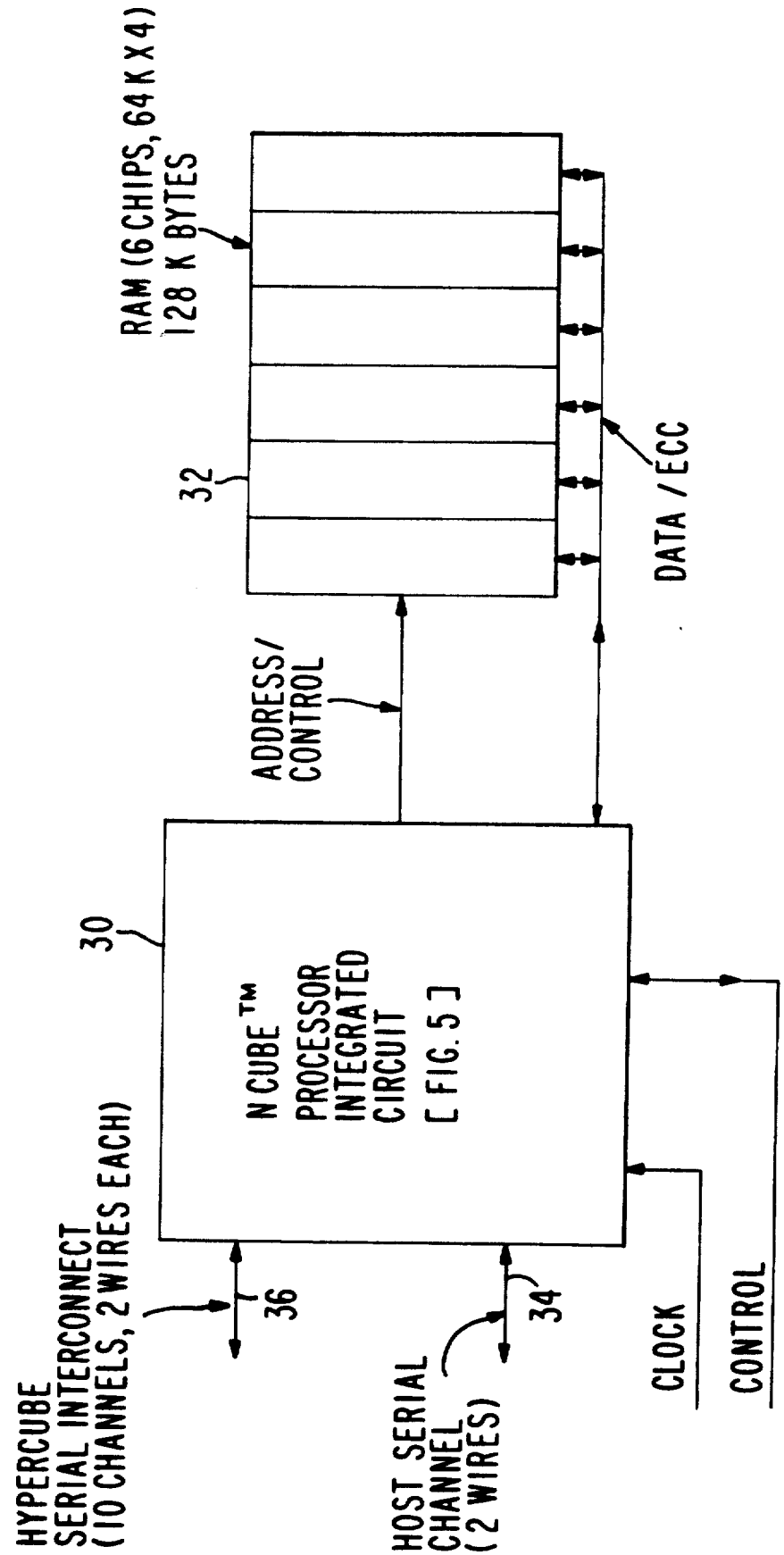
FIG. 4 is a detailed block diagram of a single processing node on the processor array board of FIG. 3.

One of the 64 processing nodes on the processor array board of FIG. 3 is shown in FIG. 4. Each one of the 64 processing nodes includes an Ncube TM processor integrated circuit (30), a local memory (32), a system host serial I/O channel (34), and 10 (i.e., p = 10) serial I/O channels (36). The wiring on the processor array board (shown in FIG. 3), interconnects the 64 nodes on the board in an order 6 (n) hypercube comprised of 64 ($2^n$ = m) processing nodes. In the illustrative embodiment shown, the wiring utilizes 6 (n) of the 10 (p) serial interconnect channels to effect the interconnections among the nodes.

The Ncube TM processor block (30) of FIG. 4 is shown in more detail in FIG. 5, and is comprised of Floating Point Unit (40), Address Unit and Instruction Cache (42), Instruction Decoder (44), Integer Execution Unit (46), I/O Ports (48), and Memory Interface (50), which are attached to either or both of a common address bus (52), and data bus (54). These units are described in sections 8.3 through 8.8 below.

8.2 Backplane Interconnections

FIG. 2a is a detailed diagram of the arrangement of the serial communications interconnect on the backplane of the multiprocessing system shown in FIG. 1. Processor array boards are inserted into one or more of the 16 slots 0 through F to form hypercube structures according to the following list:

1 board = order 6 hypercube (64 nodes)
 2 boards = order 7 hypercube (128 nodes)
 4 boards = order 8 hypercube (256 nodes)
 8 boards = order 9 hypercube (512 nodes)
16 boards = order 10 hypercube (1024 nodes).

The backplane wiring routes signal lines to connect groups of boards together as shown in FIG. 2A. For example, an order 7 hypercube is achieved by inserting 2 boards in slots 0 and 1, or 2 and 3, or 4 and 5, etc. An order 8 hypercube is achieved by inserting 4 boards in slots 0 through 3 or 4 through 7, etc. An order 9 hypercube is achieved by inserting 8 boards in slots 0 through 7 or 8 through 15. An order 10 hypercube is achieved by inserting 16 boards in slots 0 through 15.

The I/O interconnect wires are shown at the bottom of FIG. 2A. Each line includes 128 I/O channels which are connected from a system control board in an I/O slot and fan out to up to 8 processor array boards. 16 channels going to one of the 8 boards. Each one of the 16 channels go to the host serial channel (34), FIG. 4, on a processing node. Since there are a total of 64 such nodes on a processor array board, four system control boards in I/O slots 0 through 3 of FIG. 2A provide the 64 channels on each processor array board in array board slots 0-7, and four system control boards in I/O slots 4-7 of FIG. 2A provide the 64 channels on each processor array board in array board slots 8-15.

Figure 2B:
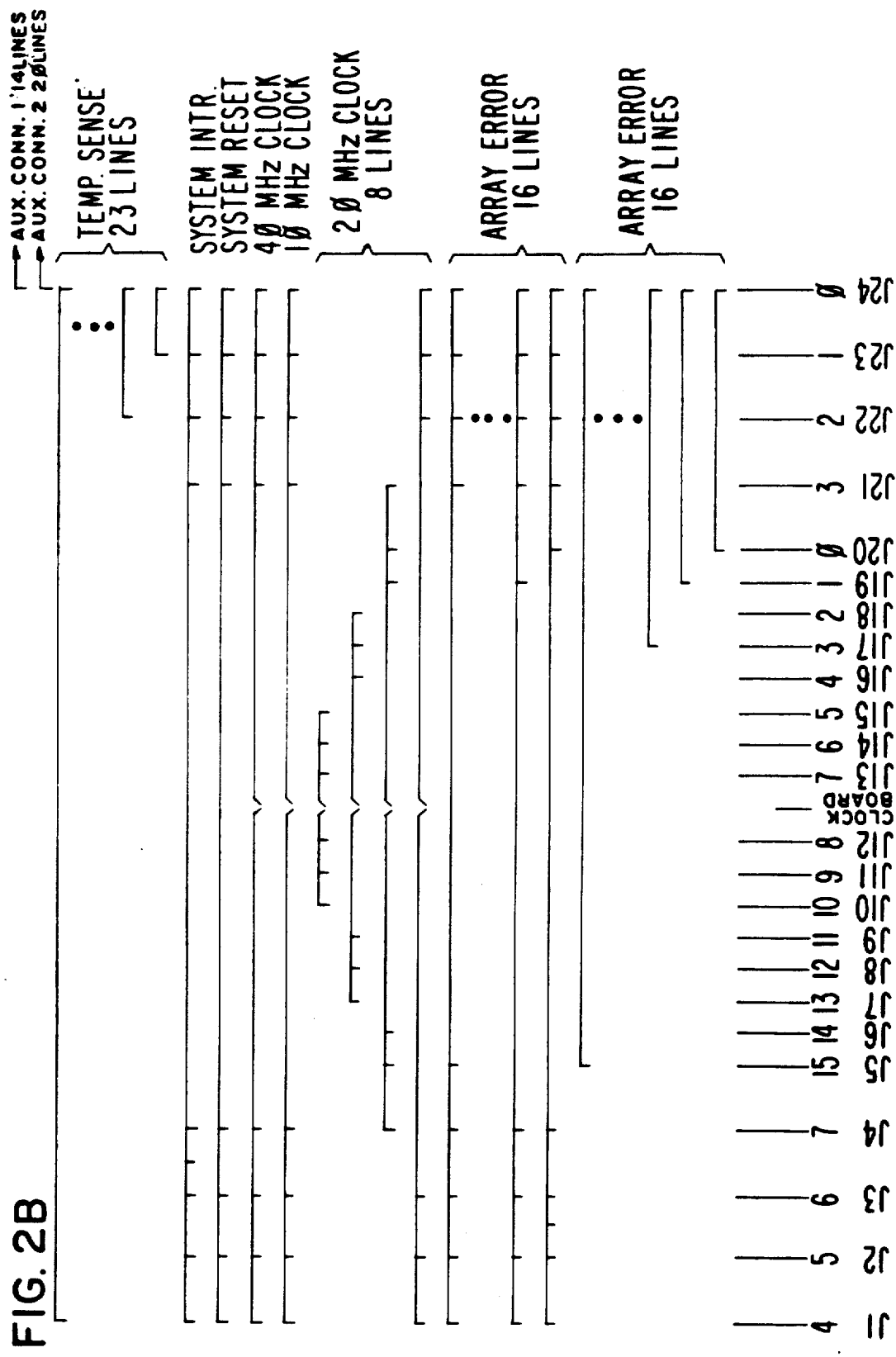
FIG. 2b is a detailed diagram of the signal control interconnect on the backplane of the multiprocessing system shown in FIG. 1.

FIG. 2b is a detailed diagram of the system control interconnect on the backplane of the multiprocessing system shown in FIG. 1. The control lines include system reset lines, clock lines, and array error lines. As shown, the clock board (10) of FIG. 1 is inserted in a slot between slots J12 and J13.

8.3 Floating Point Unit

Figure 6:
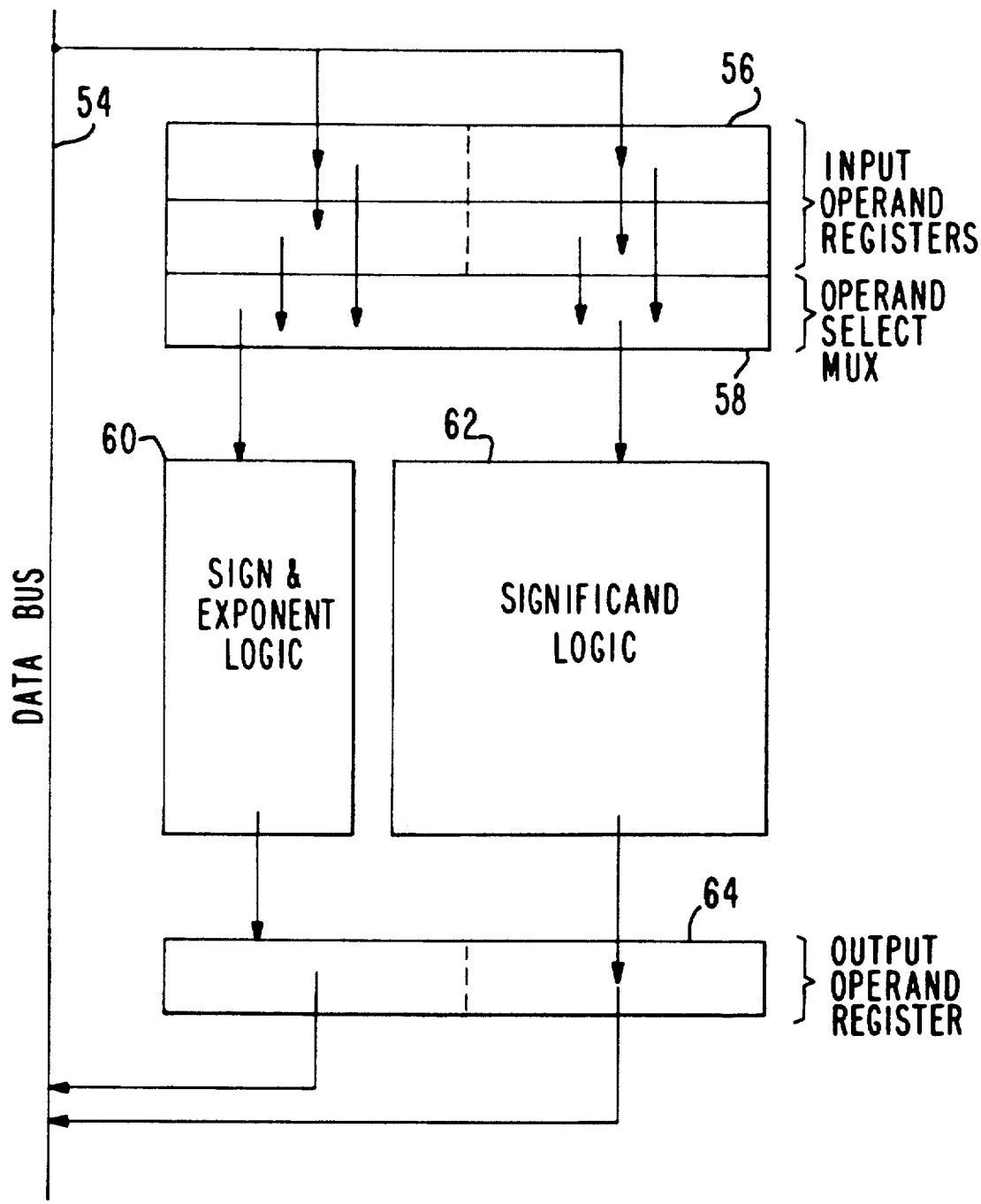
FIG. 6 is a detailed block diagram of the floating point unit shown in FIG. 5.

Refer to FIG. 6. The floating point unit (40) shown in FIG. 5 is comprised of four input operand registers (56) which receive data from the data bus (54). The operand select MUX (58) selects, from the appropriate input operand register, the sign and exponent portion and the significand portion. The sign and exponent portion is delivered to the sign and exponent logic (60). The significand portion is delivered to the significand logic (62). The logic blocks (60, 62) perform the floating point arithmetic specified by the instruction definition in Section 4.8. The sign and exponent logic (60) and the significand logic (62) outputs are connected to the operand register (64) which returns the data to the data bus (54).

8.4 Address Unit and Instruction Cache

Refer to FIG. 7 which is a detailed block diagram of the address unit and instruction cache (42) shown in FIG. 5.

The refresh address register (100) contains a pointer to memory which is the value of the address in memory which is to be refreshed next. After each refresh cycle is taken, this pointer is incremented. The Stack Pointer Register (102) contains a pointer which points to the top of the stack. The stack pointer register is described in Section 4.2.2 above, under General Registers. The operand address register (104) is an internal register to which computed effective addresses are transferred before a memory cycle is performed. The operand address register is connected to the address bus.

The program counter (106) points to the next instruction to be executed. It is incremented the appropriate number of bytes after the instruction is executed. It is also affected by call, return, and branch instructions which change the execution flow.

The program counter is connected to the instruction fetch address register (108) which is a pointer into the memory location from which instructions are currently being fetched. These instructions are loaded into the instruction cache (114). The instruction cache allows for fetching several instructions ahead of the instruction that is being executed.

The shadow ROM (110) is described in Section 4.9. It contains instructions that are executed prior to the transfer of control to user code upon system initialization. The instruction cache provides a buffer for data prefetch and before the actual execution of the stored instruction. It also provides some retention of the data after it has been executed. If a branch is taken back to a previous instruction for reexecution, and if that previous instruction is in within 16 bytes of the currently executing instruction, the data corresponding to that previous instruction will still be stored in the cache. Thus, a memory fetch cycle will not have to be taken. The instruction cache is both a look-ahead and look-behind buffer.

The MUX (112) is a multiplexer that multiplexes between instructions coming from the shadow ROM or coming from memory after initialization.

8.5 Instruction Decoder

Figure 8:
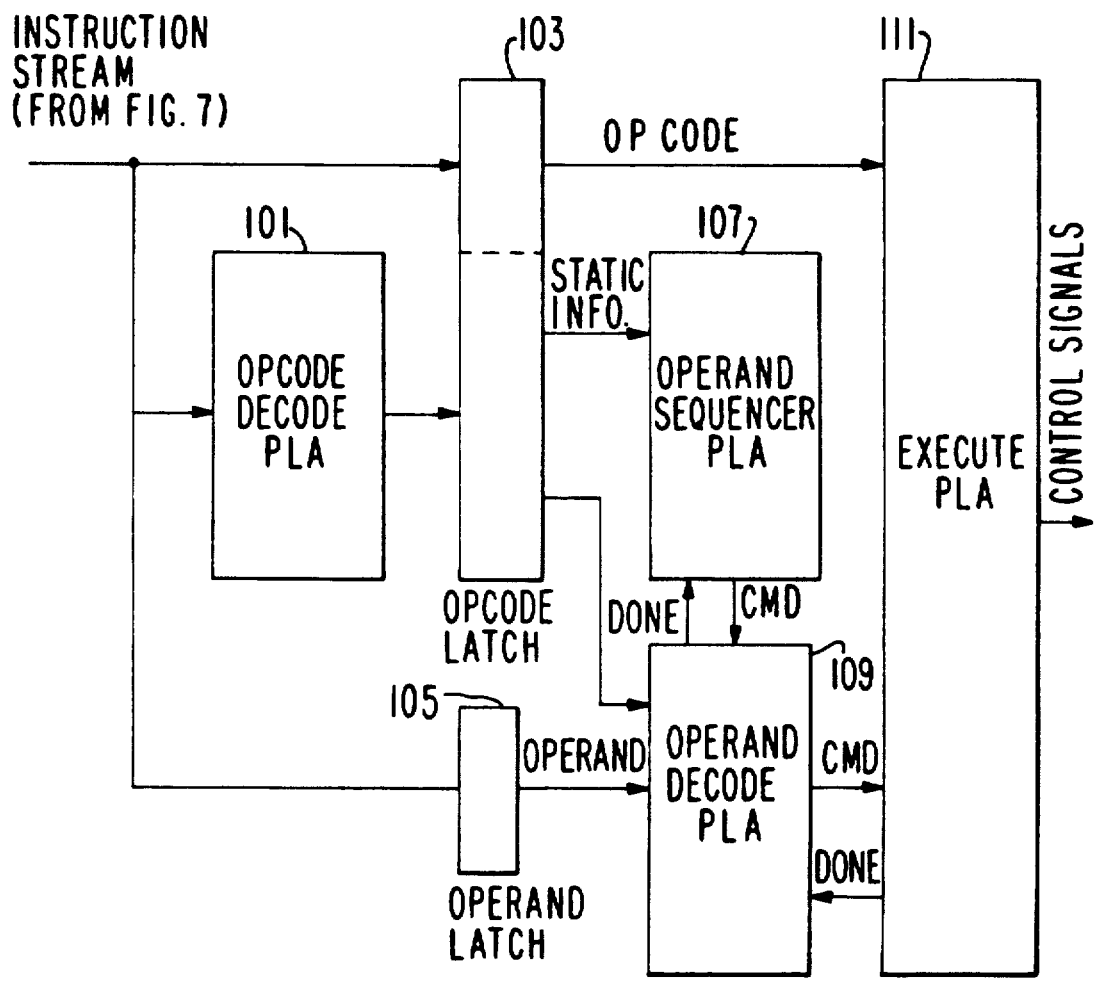
FIG. 8 is a detailed block diagram of the instruction decoder shown in FIG. 5.

Refer to FIG. 8. The instruction decoder (44) shown in FIG. 5 receives an instruction stream from the instruction cache of FIG. 7.

The instruction decoder includes an opcode PLA (101) which decodes static information in connection with the opcode of an instruction, such as number of operands, type of operands, whether the instruction is going to take a single cycle to execute or many cycles to execute, and what unit the instruction is going to execute in (the instruction execution unit or the floating point unit). This information is latched in the opcode latch (103). The operand itself is latched into the operand latch (105). The operand sequencer PLA (107) is a state machine whose main function is to supervise the decoding of operands. The operand decode PLA (109) is a state machine whose main function is to compute effective addresses for each of the addressing modes and to supervise the execution of instructions. The execute PLA (111) is a state machine whose main function is to execute the instruction in conformance with the definition of instructions as given in Section 4.8 above.

8.6 Integer Execution Unit

Refer to FIGS. 9A and 9B which together comprise a detailed block diagram of the integer execution unit shown in FIG. 5. The exact formats and detailed descriptions of the registers are given in section 4.4.3. The Processor Status Register (126) contains flags, interrupt controls and other status information. The Fault Register (124) stores the fault codes. The Configuration Register (120) stores the model number (read only) and the memory interface parameters. The Processor Identification register (122) contains a number that identifies the processor's location in the array. The Timer register (116) contains a counter that is decremented approximately every 100 microseconds and generates an interrupt (if enabled) when it reaches zero.

The refresh timer (118) is a time-out register used to time the period between refreshes. This register is initialized from eight bits out of the configuration register and it decrements those eight bits. When the timer goes to zero, a refresh is requested.

The register file (128) is described in Section 4.4.1 above. It includes 16 addressable registers that are addressable by the instruction operands.

The temporary register (130) is an internal register used during the execution of instructions. It is connected to the integer ALU (132) which is used during the execution of integer instructions. The sign extension logic (134) takes the result from the ALU block and, according to the data type of the result, extends the sign to a full 32-bit width. It also checks for conversion overflows.

The barrel shifter (136), the shift temporary register (134), and the shift count register (140) are used to execute the shift and rotate instructions. The port select register (142) is an internal register in which the register number of the serial I/O port to be selected for the next operation is stored.

The control register select register (144) is an internal register in which the address of the control register to be selected for the next operation is stored. The memory data register (146) is an internal register used for the temporary storage of data which is destined to be written into memory. It is an interface register between the instruction execution unit and the memory interface.

8.7 I/O Ports

Figure 10B:
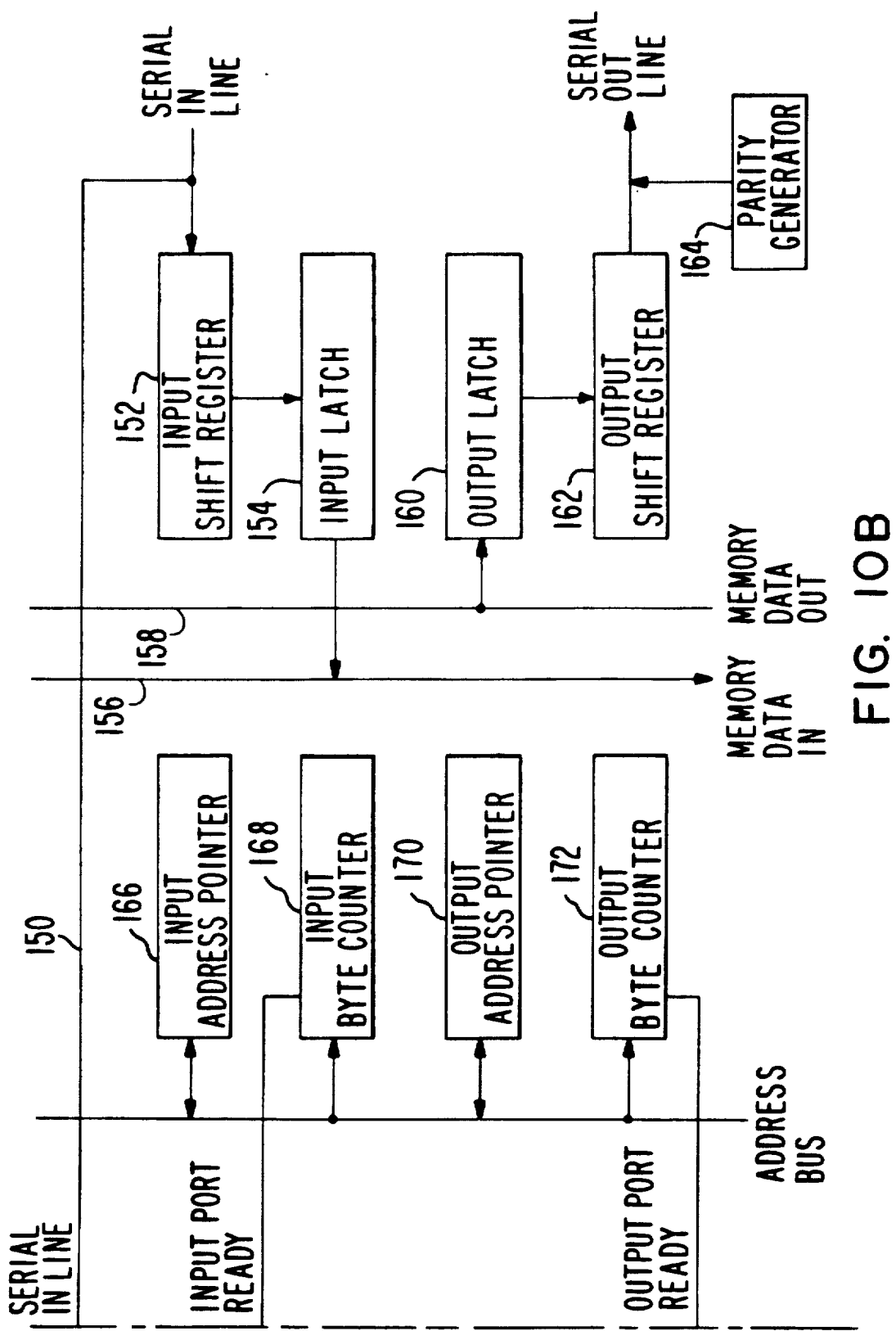
FIGS. 10a and 10b together is a detailed block diagram of the one of the eleven serial I/O ports shown in FIG. 5.
Figure 10A:
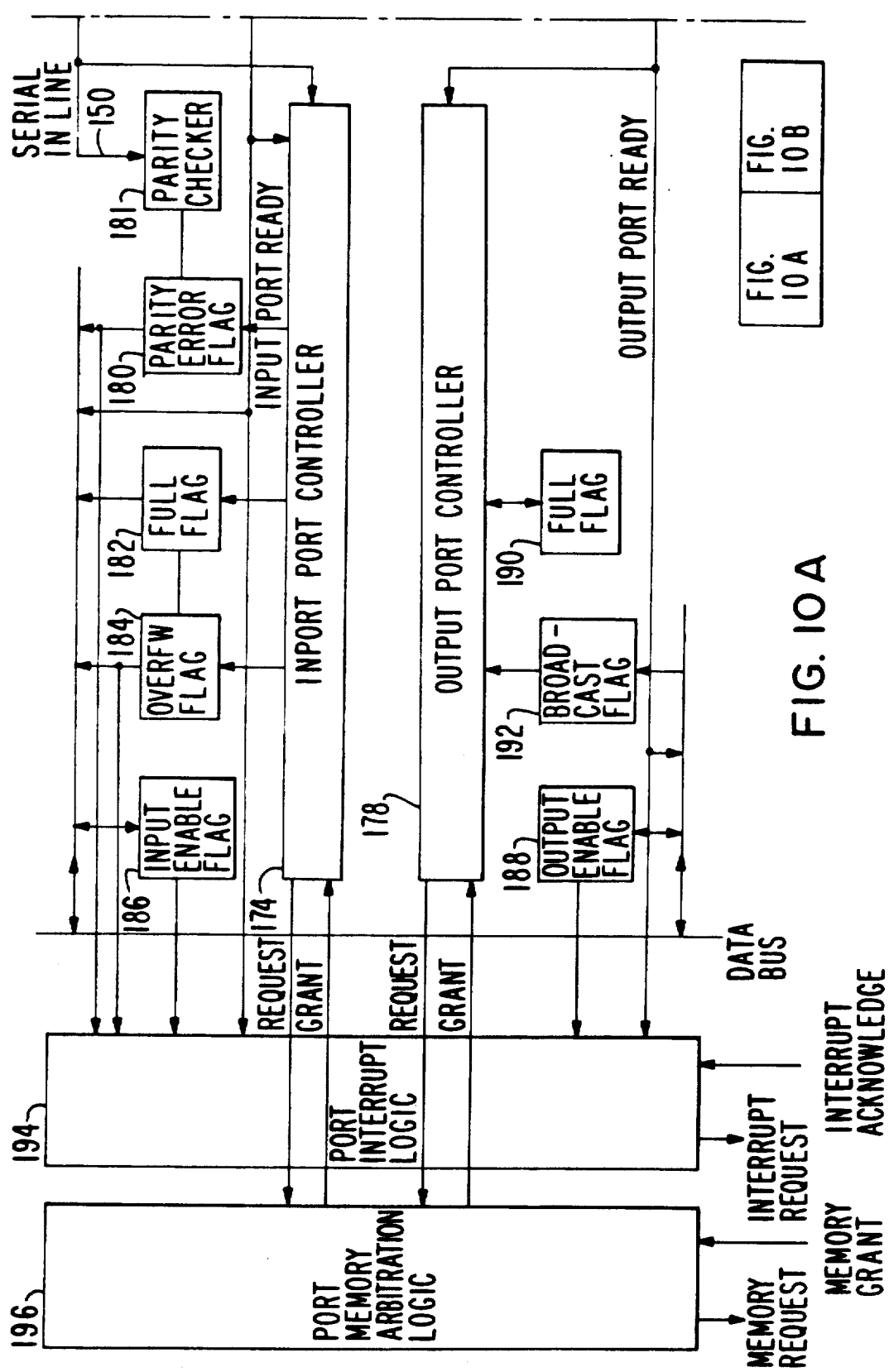

FIGS. 10A and 10B comprise a composite block diagram of a single I/O port representative of one of the 11 I/O ports (48) on each processor shown in FIG. 5. Each port has all the circuitry necessary to both receive and transmit serial messages. The format of the messages is described in Section 5.4.1 above. Data are received on the serial data in line (150) and are framed in the input shift register (152). The information is then transferred in parallel to the input latch (154) and is stored there until it is transferred to the memory on the memory data in lines (156). Similarly, data to be transmitted is brought in from the memory data out-lines (158), stored in the output latch (160), and then transferred to the output shift register (162), and transmitted serially on the serial out line and combined with parity bits from the parity-bit generator (164). The input port and the output port both contain an address pointer and a byte counter. The address pointers (166, 170) point to the locations in memory where the message will be written to or read from.

The input and output byte counters (168, 172) are utilized to specify the length of message to be sent or received. All of these four registers are initialized by the appropriate instruction: the load address pointer instruction, and the load byte counter instruction. After a message packet is received, the input address pointer (166) is incremented by two bytes and the input byte counter (168) is decremented by the two bytes. After a message packet has been sent, the output address pointer (170) is incremented by two bytes and the output byte counter (172) is decremented by two bytes.

The control portion of the serial port is shown in FIG. 10A. There is an input controller (174) and an output controller (178) which control the timing of the serial transmission. These controllers control the timing of when the parity bits is sent out and when the parity bits is to be checked on incoming data. They also control the various flags. The parity error flag (180) is set by the input controller when there is a parity error detected on an input message. The full flag (182) is set by the input controller during the time that the input latch (154) is buffering a message which has not yet been transferred into memory. The overflow flag (184) is set by the input controller when the input latch is holding a message to be sent to memory and the input shift register (152) finishes receiving a second message which overrides the first message before it is transferred to memory. The input enable flag (186) is a flag which is both readable and writable by the user to enable interrupts that occur when the input port becomes ready, i.e. when the byte count goes to zero. On the output port there is an output enable flag (188) which, when enabled, will generate an interrupt when the output port ready line becomes true, i.e., when the byte count goes to zero (when the message has been fully transmitted). This signals the user that it is necessary to reinitialize the port with a new message. The full flag (190) on the output port controller is set for the period of time when there is data in the output latch which has not been transferred to the output shift register. The broadcast flag (192) is initialized by the broadcast count instruction. When this flag is set, it indicates that this particular output port is a member of the current broadcast group. When an output port is a member of the current broadcast group, then any data coming over the memory data out bus (158) for broadcasting will be transmitted out of this port and simultaneously out of all other ports that have their broadcast flags on.

The port interrupt logic (194) generates interrupts if enabled when the input or output ports have finished transmitting or receiving messages, as signaled by the appropriate byte counter being decremented to zero.

The port memory arbitration logic (196) performs the function of arbitrating for memory with all the other I/O ports. The winner of this arbitration must again arbitrate with other units on the chip in the memory interface unit described in Section 8.8. When an arbitration is successful and a memory grant is given, the memory grant line indicates that data either has been taken from the memory data in bus or that the data is available on the memory data out bus shown in FIG. 10B.

8.8 Memory Interface

Figure 11:
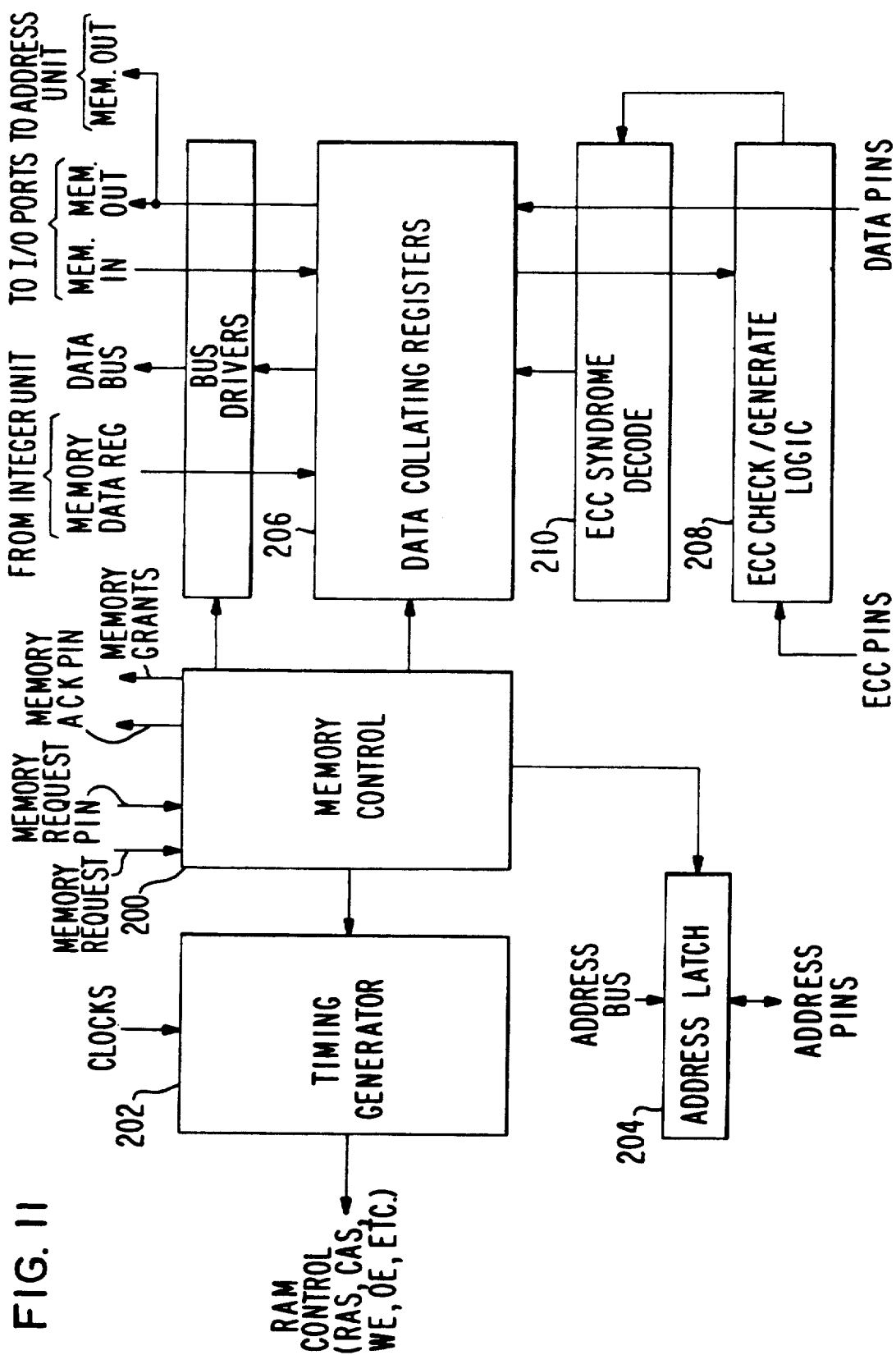
FIG. 11 is a detailed block diagram of the memory interface logic shown in FIG. 5.

Refer now to FIG. 11, which is a block diagram of the memory interface logic shown in FIG. 5. The memory interface logic interfaces between the several internal units which need to access memory and the memory itself. The memory control block (200) receives the memory request lines from the various internal parts of the chip and memory requests external to the chip via the memory request pin. (The memory request pin allows the Intel 20286 to request a memory cycle of a processor's memory in which case the memory interfaces logic performs the function of a memory controller providing the RAM control lines from the timing generator (202) while allowing the Intel 20286 to actually transfer the data in and out of the memory).

The memory control prioritizes these requests according to a given priority scheme and returns memory grants back to the individual requesting unit when it is that unit's turn to use the memory. The memory control specifies to the timing generator when access is to begin. The timing generator provides the precise sequence of RAM control lines as per the memory specifications for the particular RAM chip. The memory control also specifies when the address is to be transferred from the address bus through the address latch (204) to the address pins of the memory chip. The memory control also controls the transfer of information from the data collating registers (206) and the internal buses to and from which data is transferred internally. The data collating registers (206) perform two functions. First, they bring many pieces of a data transfer together, for example, for a double-word transfer the registers will collate the two single words into a double word. Second, the data collating registers align the data with respect to the memory, such that if data is being written to an odd location in memory the data collating registers will skew the data to line up with memory.

The ECC check/generate logic (208) is used to generate the ECC during a write operation and to check for errors during a read operation. The ECC syndrome decode (210) operates during a read operation to flag the bit position that is in error as determined by the ECC check logic. A single-bit error can be corrected by the error correction code and this bit position will be corrected automatically by the ECC syndrome decode logic.

8.9 System Control Board

FIG. 12 is a detailed block diagram of the system control board (14) shown in FIG. 1. It includes an array interface (212), shown in more detail in FIG. 13, a 2MB System RAM (214), SMD disk drive controller (216), parallel I/O interface (218), System I/O Interface (220), CPU and Control (222), Auxiliary I/O Interface (224), and SBX and EPROM (226).

The address buffers (354) and the data buffers (356) are connected via the data lines and the buffer lines to the local RAM (352). The SMD controller (216) is connected to the local memory (352) and is also connected to the system RAM (214) for the transfer of data from disk to memory.

8.10 System Array Interface

Figure 13:
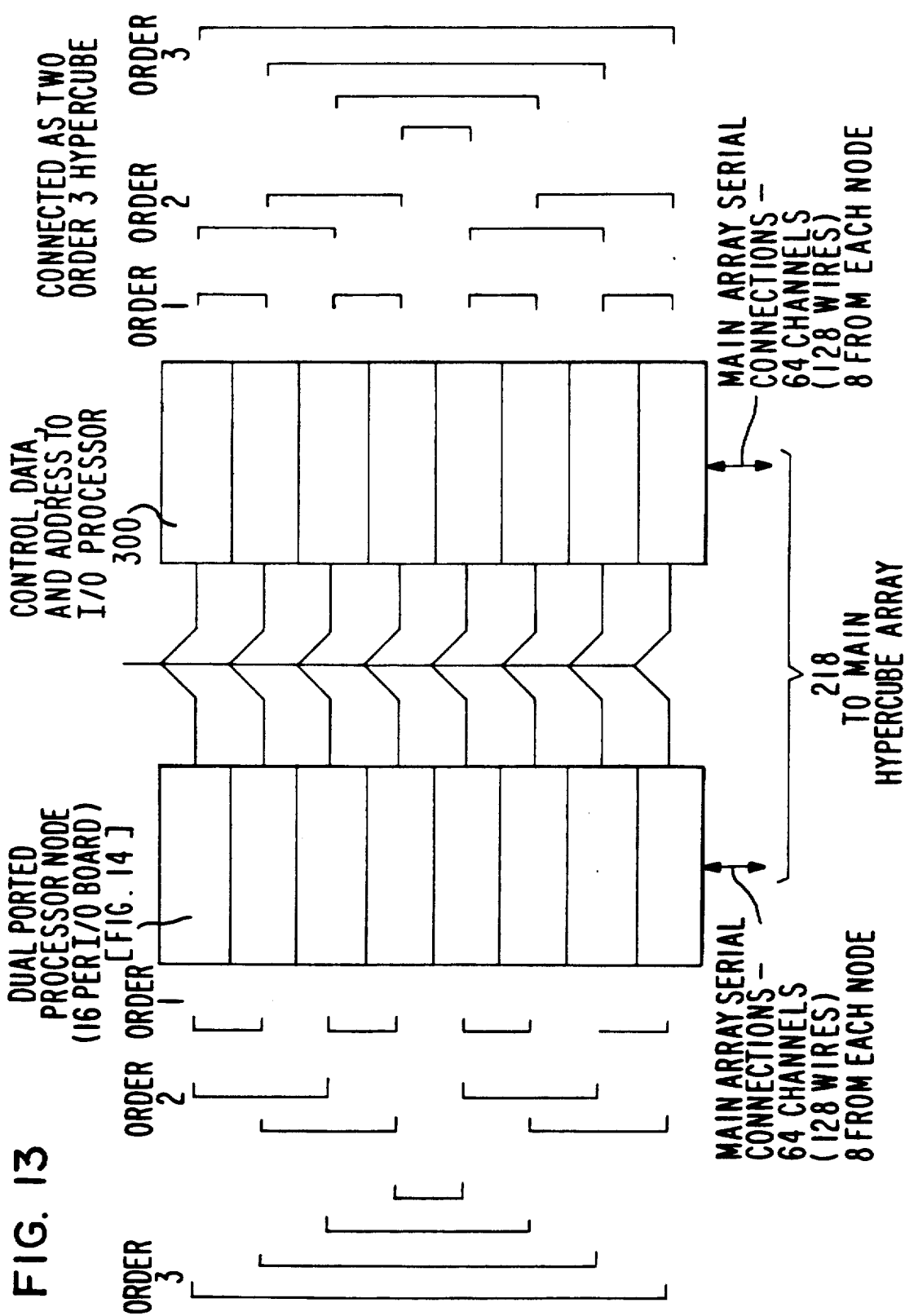
FIG. 13 is a detailed block diagram of the dual-ported processing nodes and serial communications interconnect on the system control board array interface shown in FIG. 12; and, FIG. 14 is a detailed block diagram of a single dual ported-processing node of the system control board interface shown in FIG. 13.

FIG. 13 is a detailed block diagram of the dual-ported processing nodes and serial communications interconnect on the system control board array interface shown in FIG. 12. The system control board includes r (r=16) dual-ported processing nodes (300), connected on the board as shown in FIG. 13.

As shown in FIG. 14, each dual-ported processing node includes a processor (350), a local dual-ported memory (352) and s (s=3) I/O channels. The channels are interconnected such that the s (s=3) channels (351) communicate with other nodes on the system control board through the order 1, order 2 and order 3 interconnect shown in FIG. 13 to form two order 3 hypercubes. The 16 (r) dual ported processing nodes on an I/O board are therefore connected as two order 3 hypercubes. The remaining v (v=8) serial I/O channels (353) communicate with processing nodes on array boards through host channels in the backplane I/O interconnect shown in FIG. 2A.

FIG. 14 is a detailed block diagram of one of the 16 dual ported-processing node of the system control board interface shown in FIG. 13. The dual-ported processing nodes use the same NCUBE TM processor integrated circuit as the array processor of FIG. 4.

8.11 System Node and Board Addressing

The System Control Boards (14) of FIG. 1 use the 8 I/O slots on the backplane. Through backplane wiring, these boards are allowed to access up to a 128 processor node subset of the array. Each System Control Board (FIG. 13) has 16 processing nodes (300) and each node has 8 of its I/O channels (0,1,...,7) dedicated to communicating with the Processing Array through the array interface (212).

Referring to FIG. 1, let each Processor board slot J1-J24 be numbered (xxxxx) in binary. Also assume that the board in that slot contains the hypercube (xxxx:yyyyy) where yyyyy is a binary number that can range from 0 to 63. (i.e. the ID's of the processors on board xxxx are xxxxyyyyy where xxxx is fixed.) Then the following diagram illustrates the mapping between the nodes in the Main Array and the nodes on a system control board.

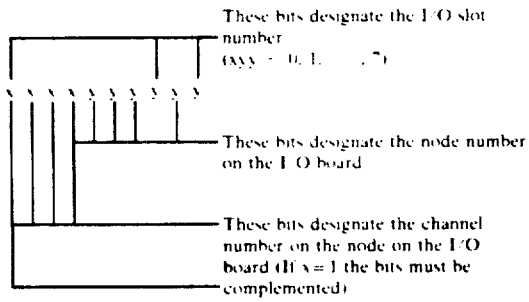

Note the following from with respect to the above chart:

1) I/O slots 0,1,2,3 are connected to Processor Array slots 0,1,....7 and I/O slots 4,5,6,7 are connected to Processor Array slots 8,9,..., 15.

2) A node on a System control Board is connected to one processor on each of the 8 Processor Array Boards that are on its side of the backplane. Furthermore, the array node numbers that it is connected to are the same modulo the board number. For example, node 1 on an I/O board in slot 3 is connected to processors numbered 0xxx000111; or processor 7 (node 7 on Array board 0, processor 71 hex (node 7 on Array board 1, etc).

3) A given channel number on all 16 nodes on a System Control Board is connected to the same Array board. For example, all channels numbered 2 on a System Control Board are connected to processors on Array board 2 if the System Control Board is in slot 0,1,2,3 or 13 if it is in slot 4,5,6,7. By being connected to 128 processing nodes, a system Control Board has a potential bandwidth of 280 Megabytes/sec.

8.12 Variable Meanings in Claims

In the following table, variables are defined for purposes of generic claim language. The actual number for the specific embodiment disclosed in this specification is shown in the table opposite the corresponding variable.

| Variable | Actual Value | Variable Definition |
|---|---|---|
| k | 16 | number of array boards in system |
| p | 10 | number of serial channels (excluding host) per processor node. Also order of hypercube of the overall system. |
| m | 64 | number of processing nodes per array board |
| n | 6 | order of hypercube on one array board |
| j | 4 | difference between order of hypercube on an array board and order of hypercube of an overall system; also the number of wires per processing node brought to backplane for purpose of connecting the hypercube. |
| x | 8 | number of system control boards in system |
| r | 16 | number of dual-ported processing nodes per system control board |
| s | 3 | number of serial channels per dual-ported processing node, also, order of largest hypercube of dual-ported processing nodes. |
| t | 2(3) | order of hypercube on one system control board |
| u | 0 | difference between order of hypercube on a system control board and order of hypercube of dual-ported processing of overall system; also the number of wires per dual-ported processing node brought to backplane for purpose of connecting the hypercube |
| v | 8 | number of system host channels per dual-ported processing node |

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A parallel processor comprising in combination:
   a plurality of first processing nodes;
   a single oscillator clock common to all of said first processing nodes; each of said first processing nodes including a processor and a memory, said memory having data and instructions stored therein, said processor including
   (1) executing means for executing said instructions,
   (2) fetching means connected to said execution means and to said memory for fetching said instructions from said memory, and,
   (3) internode communication means connected to said execution means and to said memory;
   said internode communication means comprising an asynchronous I/O channel for fetching data from said memory at an address supplied by said I/O channel and for sending said data to another one of said plurality of first processing nodes, said asynchronous I/O channel being connected to and driven by said single oscillator clock; and,
   first means, connected to each of said internode communication means of said first nodes, for interconnecting said first nodes in the structure of a first array of processing nodes, said first array having a hypercube topology.

2. The combination in accordance with claim 1 further comprising:

a system controller;

each of said first processing nodes further including system communication means connected to said execution means for providing system-controller-to-node communication, and, second means connected to each of said system communication means of said first nodes for interconnecting said first nodes to said system controller.

3. The parallel processor array in accordance with claim 1 further comprising:

a plurality of second processing nodes, each second processing node including a second-node processor and a second-node memory, said second-node memory having second-node data and second-node instructions stored therein, each of said second processing nodes including (1) second-node execution means for executing said second-node instructions, (2) second-node fetching means connected to said second-node execution means and to said second-node memory for fetching said second-node instructions from said second-node memory, and, (3) second-node internode communication means connected to said second-node execution means and to said second-node memory;

second means, connected to each of said second-node internode communication means, for interconnecting said second nodes in the structure of a second array of processing nodes, said second array having a hypercube topology;

said first and second arrays each being of order n; and third means, connected to each of said first and second nodes, for interconnecting said first array and said second array together to form an order n+1 array of which is first and second arrays are a subset, and wherein said order n+1 array is made up of said first and second arrays of order n, such that a parallel processor system is structured with a number of processors that is a power of two.

4. A parallel processor array comprising:

a plurality of array boards (1 to k); a first one of said array boards being comprised of m processing nodes, each one of said m processing nodes including a memory for storing data and instructions, means for fetching and executing said instructions, and p I/O channels, there being m such nodes on said first one of said array boards;

each of said p I/O channels at each one of said m processing nodes comprising an asynchronous I/O channel for fetching data from said memory to an address supplied by said I/O channel and for sending said data to another one of said m processing nodes; and, means for interconnecting said m nodes on said first board in an order n hypercube comprised of $2^n = n$ processing nodes;

said interconnecting means utilizing n of the p I/O channels to effectuate the interconnections among said nodes; and, a backplane;

said backplane including first means for receiving said processor boards;

said backplane including second means for interconnecting said K processors boards in an order P hypercube, where $K = 2^j$, $m = 2^n$, and $P = j + n$.

5. The parallel processor array in accordance with claim 4 wherein each one of said m processing nodes further includes a system host channel, said system host channel being made available at said backplane.

6. A parallel processor array comprising:

a plurality of array boards (1 to k);

a first one of said array boards being comprised of m processing nodes, each one of said m processing nodes including a local memory for storing data and instructions, means for fetching and executing said instructions, and p I/O channels, there being m such nodes on said first one of said array boards;

means for interconnecting said m nodes on said first board in an order n hypercube comprised of $2^n = m$ processing nodes;

said interconnecting means utilizing n of the p I/O channels to effectuate the interconnections among said nodes;

a backplane;

said backplane including first means for receiving said processor boards;

said backplane including second means for interconnecting said K processors boards in an order P hypercube, where $K = 2^j$, $m = 2^n$, and $P = J + n$;

a plurality of system control boards (1 to x);

each one of said system control boards being comprised of r dual-ported processing nodes, each one of said r dual-ported processing nodes including a processor, a local dual-ported memory, a plurality of system host channels (1 to v), and a plurality of I/O channels (1 to s); and, first means for interconnecting said r dual-reported processing nodes on said system control board in an order t hypercube comprised of $2^t = r$ dual-ported processing nodes on each system control board;

said interconnecting means utilizing t of the s I/O channels to effectuate the interconnections among said nodes;

said backplane including third means for receiving said system control boards;

said backplane including fourth means for interconnecting said x system control boards in an order s hypercube of dual-ported processing anodes, where $x = 2^u$, $r = 2^t$, and $s = t + u$;

said v system host channels being made available at said backplane for use in communication with said processing nodes on said array boards.

7. A parallel processor comprising in combination:

a plurality of first process nodes;

a plurality of second processing nodes;

a clock common to all of said first and second processing nodes;

each of said first and second nodes including a processor and a memory, each of said processors including (1) execution means for executing said instructions, (2) internode communication means connected to said execution means and to said memory;

said internode communication means comprising a data channel connected to and driven by said clock;

first means, connected to each of said internode communication means of said first nodes, for interconnecting said first nodes in the structure of a first array of processing nodes, said first array having a hypercube topology;

second means, connected to each of said internode communication means of said second nodes, for interconnecting said second nodes in the structure of a second array of processing nodes, said second array having a hypercube topology;

said first and second arrays each being of order n; and, third means, connected to each of said first and second nodes, for interconnecting said first array and said second array together to form an order n+1 array of which said first and second arrays are a subset, and wherein said order n+1 array is made up of said first and second arrays of order n, such that a parallel processor system is structured with a number of processors that is a power of two;

a first number of unidirectional direct memory access (DMA) output channels connected to said execution means on each of said processors;

a second number of unidirectional direct memory access (DMA) input channels connected to each of said execution means on each of said processor;

each of said DMA channels including two multibit registers, an address pointer register for a message buffer location in memory, and a byte count register indicating the number of bytes left to send or receive;

a first subset of said I/O channels being used for communicating with a host.

a second subset of said I/O channels being used for communicating within said order n+1 array;

each of said I/O channels having an address pointer register, a byte count register, and a "ready" flag;

means for transmitting a messages having a start bit, a message unit, and a parity bit.

said transmitting means including means in said execution means for executing a LPTR (Load Pointer) instruction having a first operand and a second operand, said LPTR instruction executing means further including means for setting said address pointer register to point to the low byte of the first message unit in said message buffer in said memory.

said first operand of said LPTR instruction being the address of said message buffer and the second operand of said LPTR instruction being an integer whose value determines which of said address registers is to be loaded;

means in said execution means for executing a LCNT (Load Count) instruction having a first operand and a second operand, said first operand of said LCNT instruction being an integer (the count value) equal to the number of bytes in said message and said second operand being a value that indicates which of said byte count registers is to be loaded;

means operative as each message is sent for incrementing said address register and decrementing said count; and, means operative upon the condition that said byte count is zero for stopping message transmission, and for setting said ready flag.

8. The combination in accordance with claim 7 further comprising:

means for ensuring that the desired output channels are ready;

means in said execution means for executing a BPTR (Broadcast Pointer) instruction having a first operand and a second operand;

said first operand of said BPTR instruction being the address of a message.

said second operand of said BPTR instruction being a multibit mask in which every bit position of said mask that is set to one enables the corresponding output channel address pointer register to be loaded; and, means in said processor for executing a BCNT (Broadcast Count) instruction having a first operand and a second operand, said first operand of said BCNT instruction being the number of bytes in said message and, said second operand of said BCNT instruction being said multibit mask.

9. The combination in accordance with claim 8 wherein said processor includes means for operating all of said output ports initialized by said BPTR and BCNT instructions in synchronization such that when one output port reads a message unit from said memory, all output ports do so, there being a single message unit read from memory for all of said output ports to transfer out over their respective I/O lines.

10. For use in a parallel processor array comprising a plurality of processor array boards (1 to k), and a clock board having a single oscillator thereon for providing clock lines, said clock lines being driven by said single oscillator.

said processor array boards being comprised of m processing nodes, each one of said m processing nodes including a local memory for storing data and instructions, means for fetching and executing said instructions, and p I/O channels, there being m such nodes on said processor array boards;

each of said p I/O channels at each one of said m processing nodes comprising an asynchronous I/O channel for fetching data from said memory at an address supplied by said I/O channel and for sending said data to another one of said m processing nodes; and, p1 means for interconnecting said m nodes on said processor array board in an order n hypercube comprised of $2^n = m$ processing nodes;

said interconnecting means utilizing n of the p channels to effectuate the interconnections among said nodes, a backplane comprising:

first means for receiving said K processor array boards;

second means for interconnecting said K processor array boards in an order P hypercube, where n is the order of the hypercube on each of said array boards and where $K = 2^j$ and $P = n + j$;

third means for receiving said clock board; and fourth means for connecting said clock lines to said array boards.

11. For use in a parallel processor array comprising a plurality of processor array boards (1 to k), and a clock board for providing clock lines, said processor array boards being comprised of m processing nodes, each one of said m processing nodes including a local memory for storing data and instructions, means for fetching and executing said instructions, and p I/O channels, there being m such nodes on said array boards; and, means for interconnecting said m nodes on said processor array board in an order n hypercube comprised of $2^n = m$ processing nodes;

said interconnecting means utilizing n of the p channels to effectuate the interconnections among said nodes, a backplane comprising:

first means for receiving said K processor array boards;

second means for interconnecting said K processor array boards in an order P hypercube, where n is the order of the hypercube on each of said array boards and where $K = 2^j$ and $P = n + j$;

third means for receiving said clock board;

fourth means for connecting said clock lines to said array boards;

said parallel processor array further including a plurality of system control boards, (1 to x)

fifth means for receiving said x system control boards; and, sixth means for interconnecting said x system control boards into an order s hypercube, where t is the order of the hypercube on each of said system control boards and where $x = 2^k$ and $s = t + u$.

12. The backplane as set forth in accordance with claim 13 wherein said processing nodes on said processor array boards each include a system host channel, and wherein said system control boards are comprised of r dual-ported processing nodes, each one of said r dual-ported processing nodes on said system control boards including v system host channels, said backplane further comprising:

seventh means for interconnecting said system host channels on said k array boards to said system host channels on said x system control boards.

* * * * *